US012780589B2

(12) United States Patent
Nunokawa et al.

(10) Patent No.: US 12,780,589 B2
(45) Date of Patent: Nov. 3, 2026

(54) MEDIUM PROCESSING APPARATUS AND IMAGE FORMING SYSTEM

(71) Applicants: Atsushi Nunokawa, Kanagawa (JP); Kei Sasaki, Kanagawa (JP); Sachika Tamaki, Kanagawa (JP); Keisuke Sugiyama, Kanagawa (JP)

(72) Inventors: Atsushi Nunokawa, Kanagawa (JP); Kei Sasaki, Kanagawa (JP); Sachika Tamaki, Kanagawa (JP); Keisuke Sugiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 200 days.

(21) Appl. No.: 18/906,625

(22) Filed: Oct. 4, 2024

(65) Prior Publication Data

US 2025/0128903 A1 Apr. 24, 2025

(30) Foreign Application Priority Data

Oct. 18, 2023 (JP) ................................ 2023-179770

(51) Int. Cl.
*B65H 37/04* (2006.01)
*B41J 3/44* (2006.01)
(Continued)

(52) U.S. Cl.
CPC ................ *B65H 37/04* (2013.01); *B41J 3/44* (2013.01); *G03G 15/6544* (2013.01);
(Continued)

(58) Field of Classification Search
CPC ........... G03G 15/6541; G03G 15/6544; G03G 2215/00852; H05B 1/0244; B31F 5/02; B31F 2201/0754; B31F 2201/0784; B65H 37/04; B65H 2301/43822; B65H 2301/43828; B65H 2301/5142;
(Continued)

(56) References Cited

U.S. PATENT DOCUMENTS 8,303,229 B2 * 11/2012 Sunada ................ B42C 9/0025 412/37
8,442,422 B2 * 5/2013 Takagi .............. G03G 15/6544 412/18
(Continued)

FOREIGN PATENT DOCUMENTS

JP 2014-148398 A 8/2014
JP 2014-201432 A 10/2014
JP 2019-010811 A 1/2019

OTHER PUBLICATIONS

U.S. Appl. No. 18/606,287, filed Mar. 15, 2024.
(Continued)

*Primary Examiner* — Leslie A Nicholson, III
(74) *Attorney, Agent, or Firm* — PUSA, PLLC

(57) ABSTRACT

A medium processing apparatus includes a liquid applier, a post-processing device, and circuitry. The liquid applier applies liquid to a part of a medium. The liquid applier includes a liquid storage to store the liquid to be applied to the part of the medium. The post-processing device binds a media bundle including the medium to which the liquid has been applied by the liquid applier. The circuitry is to restrict a temperature decrease of the liquid in a liquid temperature restricting mode.

14 Claims, 33 Drawing Sheets

(51) Int. Cl.
*G03G 15/00* (2006.01)
*H05B 1/02* (2006.01)

(52) U.S. Cl.
CPC . *H05B 1/0244* (2013.01); *B65H 2301/43828* (2013.01); *B65H 2301/5142* (2013.01); *B65H 2301/5143* (2013.01); *B65H 2551/14* (2013.01)

(58) Field of Classification Search
CPC .. B65H 2301/5143; B65H 2301/51432; B65H 2301/5162; B65H 2301/51614; B65H 2301/51616
USPC ............................................ 270/58.07, 58.08
See application file for complete search history.

(56) References Cited

U.S. PATENT DOCUMENTS

| | | | | |
|---|---|---|---|---|
| 9,217,977 | B2 * | 12/2015 | Takahashi | B26F 1/12 |
| 12,043,508 | B2 * | 7/2024 | Oikawa | B31F 1/36 |
| 12,044,998 | B2 * | 7/2024 | Fukasawa | B65H 37/04 |
| 2014/0219747 | A1 | 8/2014 | Takahashi et al. | |
| 2022/0394145 | A1 | 12/2022 | Seto et al. | |
| 2023/0108507 | A1 * | 4/2023 | Fukasawa | G03G 15/6544 399/408 |
| 2023/0234322 | A1 | 7/2023 | Fukuchi et al. | |
| 2023/0234804 | A1 | 7/2023 | Suzuki et al. | |
| 2023/0241859 | A1 | 8/2023 | Jun et al. | |
| 2023/0242370 | A1 * | 8/2023 | Oikawa | B42C 1/12 270/58.08 |
| 2023/0271804 | A1 | 8/2023 | Abe et al. | |
| 2023/0294950 | A1 | 9/2023 | Hitoshi et al. | |
| 2023/0399191 | A1 | 12/2023 | Akamatsu et al. | |
| 2023/0416040 | A1 | 12/2023 | Sasaki et al. | |

OTHER PUBLICATIONS

U.S. Appl. No. 18/612,207, filed Mar. 21, 2024.
U.S. Appl. No. 18/613,845, filed Mar. 22, 2024.
U.S. Appl. No. 18/755,172, filed Jun. 26, 2024.
U.S. Appl. No. 18/636,689, filed Apr. 16, 2024.
U.S. Appl. No. 18/774,781, filed Jul. 16, 2024.

* cited by examiner

MEDIUM PROCESSING APPARATUS AND IMAGE FORMING SYSTEM

CROSS-REFERENCE TO RELATED APPLICATIONS

This patent application is based on and claims priority pursuant to 35 U.S.C. § 119 (a) to Japanese Patent Application No. 2023-179770, filed on Oct. 18, 2023, in the Japan Patent Office, the entire disclosure of which is hereby incorporated by reference herein.

BACKGROUND

Technical Field

Embodiments of the present disclosure relate to a medium processing apparatus and an image forming system.

Related Art

There is known a medium processing apparatus that performs a "binding process" of binding a bundle (media bundle) formed by use of sheet-like media. Furthermore, there is known an image forming apparatus that forms an image on a sheet-like medium and includes a medium processing apparatus such as the medium processing apparatus described above.

It is conceivable that sheet-like media may be made of various materials. In the present specification, a "sheet" that is generally and widely used for image formation is cited as an example of the sheet-like medium. In addition, a "sheet bundle" of a plurality of stacked sheets is used as an example of a bundle of multiple sheet-like media.

Some medium processing apparatuses include a crimper that can perform so-called "crimp binding" without metal staples from a viewpoint of resource saving and reduction in environmental load. Specifically, the crimper sandwiches a sheet bundle with serrate binding teeth to press and deform the sheet bundle.

In the crimp binding, binding teeth are less likely to bite into a sheet bundle as the number of sheets of the sheet bundle increases. Therefore, a sheet may fall off a bundle after a large number of sheets are bound to form the bundle in the crimp binding. Thus, it is known that the crimp binding is disadvantageous in that it is difficult to maintain a binding state. Accordingly, in order to increase binding strength, some of medium processing apparatuses that perform crimp binding include a liquid applier that applies liquid in advance to a position on a sheet at which binding teeth come into contact with the sheet.

Applying liquid in advance by the liquid applier in the related art allows the binding teeth to easily bite into a sheet bundle. Thus, appropriate binding strength can be maintained. However, the liquid applier in the related art does not consider the effect of the temperature of a use environment of the configuration for applying liquid to a sheet. In other words, the technique disclosed in the related art does not eliminate the disadvantage of crimp binding in which binding failure occurs in a case where environmental temperature is low when the apparatus is used.

SUMMARY

Embodiments of the present disclosure described herein provide a novel medium processing apparatus including a liquid applier, a post-processing device, and circuitry. The liquid applier applies liquid to a part of a medium. The liquid applier includes a liquid storage to store the liquid to be applied to the part of the medium. The post-processing device binds a media bundle including the medium to which the liquid has been applied by the liquid applier. The circuitry is to restrict a temperature decrease of the liquid in a liquid temperature restricting mode.

Further, embodiments of the present disclosure described herein provide an image forming system including an image forming apparatus and the above-described medium processing apparatus. The image forming apparatus forms an image on each medium of multiple media. The medium processing apparatus binds the multiple media on which images are formed by the image forming apparatus.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
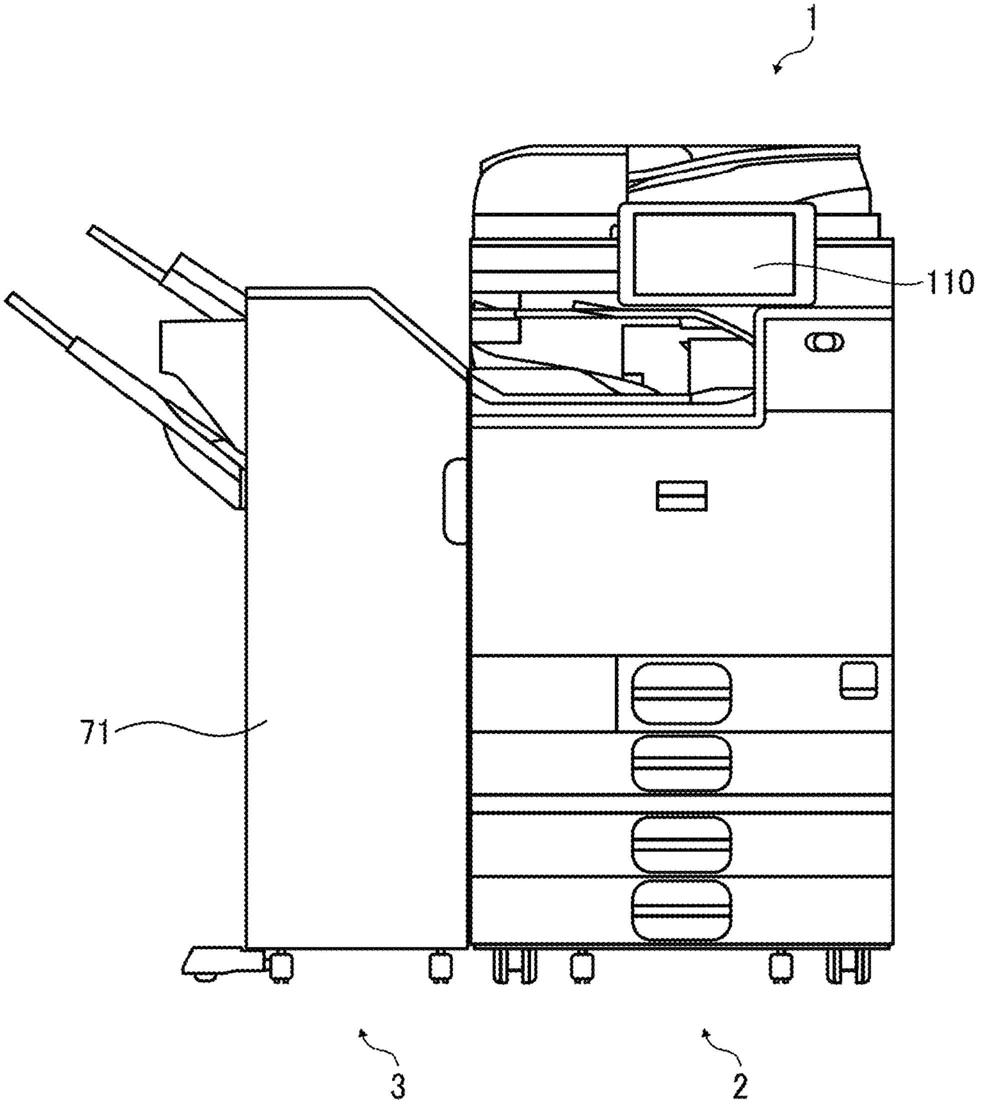
FIG. 1 is a diagram illustrating an overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure will be described with reference to the drawings.

First, a description is given of an embodiment of an image forming system.

FIG. 1 is a diagram illustrating an overall configuration of an image forming system 1 as an embodiment.

The image forming system 1 has a function of forming an image on a sheet P exemplifying a sheet-like medium and a function of performing post-processing on the sheet P on which the image has been formed. As illustrated in FIG. 1, the image forming system 1 includes an image forming apparatus 2 and a post-processing apparatus 3. The post-processing apparatus 3 corresponds to an embodiment of a medium processing apparatus according to the present disclosure.

The image forming apparatus 2 forms an image on the sheet P, and outputs the sheet P on which the image has been formed to the post-processing apparatus 3. The image forming apparatus 2 includes a tray, a conveyor, and an image former. The sheet P is stored in the tray. The conveyor conveys the sheet P stored in the tray. The image former forms an image on the sheet P conveyed by the conveyor. The image former may be an inkjet image former that discharges ink onto the sheet P to form an image, or may be an electrophotographic image former that causes toner to adhere to the sheet P to form an image. Since the image forming apparatus 2 has a typical configuration, a detailed description of the image forming apparatus 2 will be omitted unless otherwise required.

First Embodiment of Post-Processing Apparatus

Figure 2:
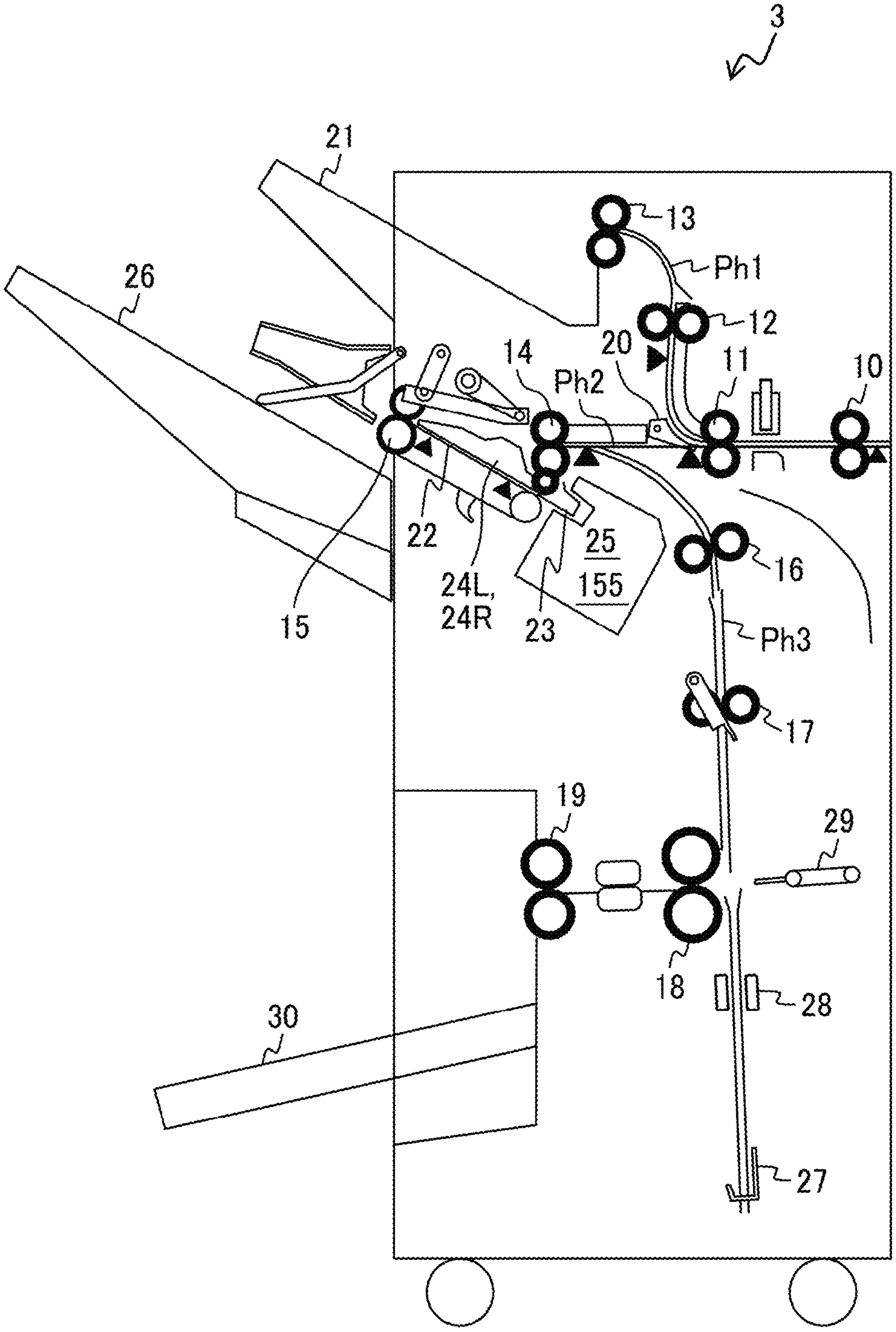
FIG. 2 is a diagram illustrating an internal configuration of a post-processing apparatus according to a first embodiment of the present disclosure.

FIG. 2 is a diagram illustrating an internal configuration of the post-processing apparatus 3 serving as a medium processing apparatus according to a first embodiment of the present disclosure.

The post-processing apparatus 3 performs post-processing on a sheet P on which an image has been formed by an image forming apparatus 2. An example of the post-processing according to the present embodiment is a binding process in which multiple sheets P with images formed thereon are bound into a bundle (sheet bundle) without staples. This binding process is referred to as "crimp binding". Another example of the post-processing according to the present embodiment is a binding process in which multiple sheets P with images formed thereon are bound into a bundle (sheet bundle) with staples. This binding process is referred to as a "stapling process". In the following description, a bundle (media bundle) containing a plurality of stacked sheets P is referred to as a "sheet bundle Pb".

More specifically, the "crimp binding" according to the present embodiment is a process of applying pressure to a binding position on the sheet bundle Pb to deform a part of the sheet bundle Pb corresponding to the binding position. In other words, the crimp binding is a process of pressing and deforming a part of the sheet bundle Pb to bind the sheet bundle Pb. A series of binding operations performed in the crimp binding process may be referred to as "crimp binding". The binding that can be executed by the post-processing apparatus 3 includes edge binding and saddle binding. The edge binding is a process to bind an end (including an edge) of the sheet bundle Pb. The saddle binding is a process to bind the center of the sheet bundle Pb.

The post-processing apparatus 3 includes conveyance roller pairs 10 to 19 each functioning as a conveyor, and a switching claw 20. The conveyance roller pairs 10 to 19 convey, inside the post-processing apparatus 3, the sheet P supplied from the image forming apparatus 2. More specifically, the conveyance roller pairs 10 to 13 convey the sheet P along a first conveyance passage Ph1. The conveyance roller pairs 14 and 15 convey the sheet P along a second conveyance passage Ph2. The conveyance roller pairs 16 to 19 convey the sheet P along a third conveyance passage Ph3.

The first conveyance passage Ph1 is a passage extending to a first output tray 21 from a supply port through which the sheet P is supplied from the image forming apparatus 2. The second conveyance passage Ph2 is a passage branching from the first conveyance passage Ph1 between the conveyance roller pairs 11 and 14 in a conveyance direction and extending to a second output tray 26 via an internal tray 22 serving as a receptacle. The third conveyance passage Ph3 is a passage branching from the first conveyance passage Ph1 between the conveyance roller pairs 11 and 14 in the conveyance direction and extending to a third output tray 30.

The switching claw 20 serving as a switcher is disposed at a branching position of the first conveyance passage Ph1 and the second conveyance passage Ph2.

The switching claw 20 can be switched between a first position and a second position. The switching claw 20 in the first position guides the sheet P to be output to the first output tray 21 through the first conveyance passage Ph1. The switching claw 20 in the second position guides the sheet P conveyed through the first conveyance passage Ph1 to the second conveyance passage Ph2. When a trailing end of the sheet P entering the second conveyance passage Ph2 passes through the conveyance roller pair 11, the conveyance roller pair 14 is rotated in reverse to guide the sheet P to the third conveyance passage Ph3. The post-processing apparatus 3 further includes a plurality of sensors that detects the positions of the sheet P in the first conveyance passage Ph1, the second conveyance passage Ph2, and the third conveyance passage Ph3. Each of the plurality of sensors is indicated by a black triangle mark in FIG. 2.

The post-processing apparatus 3 includes the first output tray 21. The sheet P output through the first conveyance passage Ph1 is placed on the first output tray 21. Among the sheets P supplied from the image forming apparatus 2, the sheets P that are not bound are output to the first output tray 21.

The post-processing apparatus 3 further includes the internal tray 22 serving as a receptacle, an end fence 23, side fences 24L and 24R, an edge binder 25, a stapling unit 155, and the second output tray 26. The internal tray 22, the end fence 23, the side fences 24L and 24R, the edge binder 25, and the stapling unit 155 perform the edge binding on the sheet bundle Pb constructed of the plurality of sheets P conveyed through the second conveyance passage Ph2. Among the sheets P supplied from the image forming apparatus 2, the sheet bundle Pb subjected to the edge binding is output to the second output tray 26.

The "edge binding process" includes a "parallel binding process," an "oblique binding process," and a "vertical binding process." The "parallel binding process" is a process of binding the sheet bundle Pb along one side of the sheet bundle Pb parallel to the main scanning direction. The "oblique binding process" is a process of binding a corner of the sheet bundle Pb. The "vertical binding process" is a process of binding the sheet bundle Pb along one side of the sheet bundle Pb parallel to the conveyance direction.

In the following description, the direction in which the sheet P is conveyed from the conveyance roller pair 15 toward the end fence 23 is defined as a "conveyance direction" of the sheet P. In other words, the "conveyance direction" corresponds to a direction in which the sheet P that has been output from the image forming apparatus 2 is moved toward the end fence 23 by the conveyance roller pair 15 after being moved toward the second output tray 26 by, for example, the conveyance roller pair 10. The direction that is orthogonal to the conveyance direction and a thickness direction of the sheet P is defined as a "main scanning direction" or a "width direction of the sheet P."

The sheets P that are sequentially conveyed through the second conveyance passage Ph2 are temporarily placed on the internal tray 22 serving as a receptacle. The end fence 23 aligns the position, in the conveyance direction, of the sheet P or the sheet bundle Pb placed on the internal tray 22. The side fences 24L and 24R align the position, in the main scanning direction, of the sheet P or the sheet bundle Pb placed on the internal tray 22. The edge binder 25 and the stapling unit 155 bind an end of the sheet bundle Pb aligned by the end fence 23 and the side fences 24L and 24R. Then, the conveyance roller pair 15 outputs the sheet bundle Pb subjected to the edge binding to the second output tray 26.

The post-processing apparatus 3 further includes an end fence 27, a saddle binder 28, a sheet folding blade 29, and the third output tray 30. The end fence 27, the saddle binder 28, and the sheet folding blade 29 perform the saddle binding on the sheet bundle Pb including the sheets P that are conveyed through the third conveyance passage Ph3. Among the sheets P supplied from the image forming apparatus 2, the sheet bundle Pb subjected to the saddle binding is output to the third output tray 30.

The end fence 27 aligns the positions of the sheets P that are sequentially conveyed through the third conveyance passage Ph3, in a conveyance direction in which the sheets P are conveyed. The end fence 27 can move between a binding position where the end fence 27 causes the center of the sheet bundle Pb to face the saddle binder 28 and a folding position where the end fence 27 causes the center of the sheet bundle Pb to face the sheet folding blade 29. The saddle binder 28 binds the center of the sheet bundle Pb aligned by the end fence 27 at the binding position. The sheet folding blade 29 folds, in half, the sheet bundle Pb placed on the end fence 27 at the folding position, and causes the conveyance roller pair 18 to nip the sheet bundle Pb. The conveyance roller pairs 18 and 19 output the sheet bundle Pb subjected to the saddle binding to the third output tray 30.

The post-processing apparatus 3 includes, in the edge binder 25, a first liquid-storage tank 43 serving as a first liquid storage and a first liquid supplier 45 as a part of a liquid applier. The first liquid-storage tank 43 and the first liquid supplier 45 are omitted in FIG. 2. The post-processing apparatus 3 further includes a second liquid supplier 54 as a part of a liquid supplier, a liquid supply pump 55 as a part of the liquid supplier, a second liquid-storage tank 53 as a part of a second liquid storage, and a second-liquid-storage-tank fixer 52 as a part of the second liquid storage, to replenish the first liquid-storage tank 43 with liquid. The liquid that is stored in the second liquid-storage tank 53 is supplied to the first liquid-storage tank 43 via the second-liquid-storage-tank fixer 52, the liquid supply pump 55, and the second liquid supplier 54.

A description is now given of a configuration of the edge binder 25.

Figure 3:
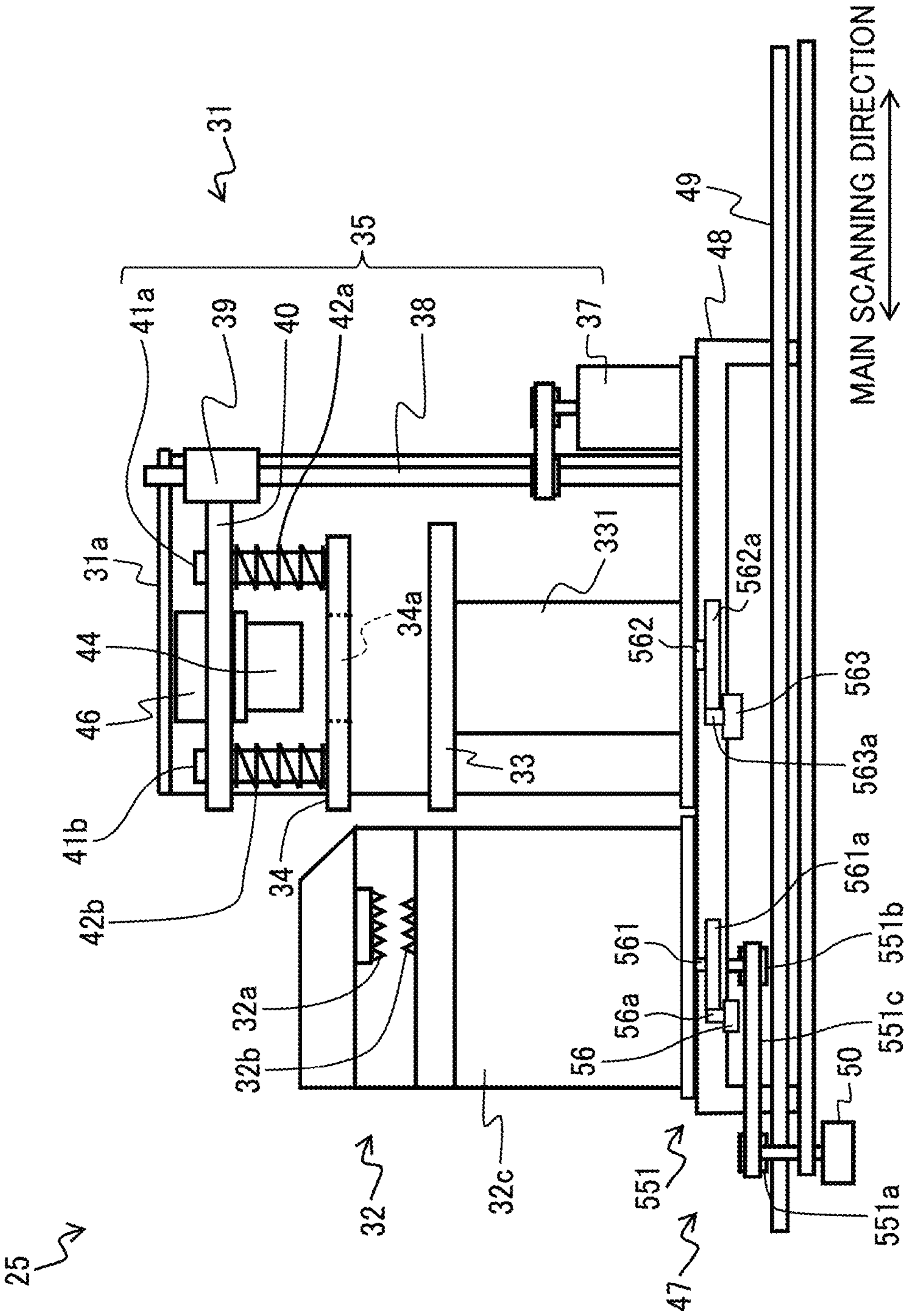
FIG. 3 is a schematic diagram illustrating an upstream side of an edge binder of the post-processing apparatus of FIG. 2 in a conveyance direction.

FIG. 3 is a schematic view of an upstream side of the edge binder 25 in the conveyance direction.

The edge binder 25 performs liquid application and crimp binding.

Figure 4:
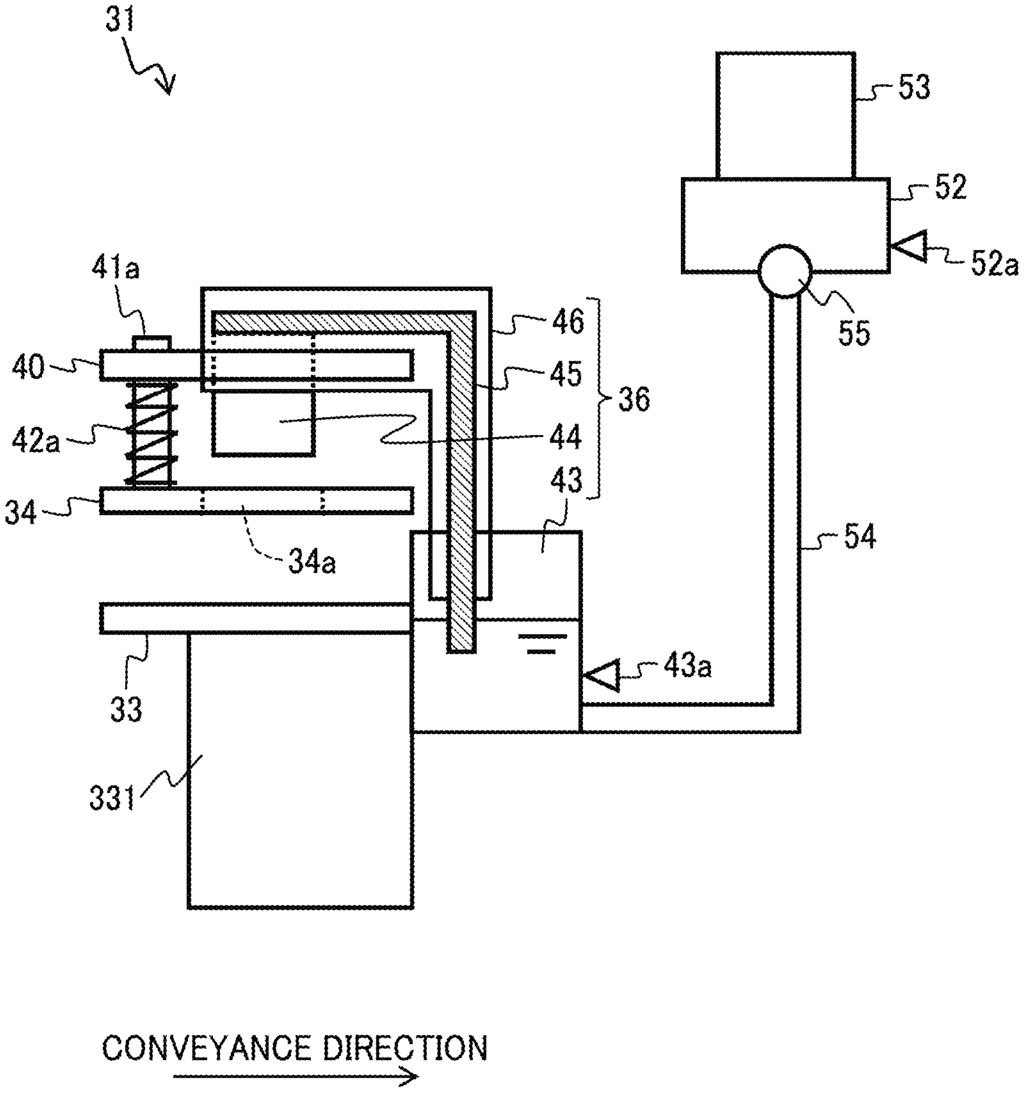
FIG. 4 is a schematic view of a liquid applier of the edge binder of FIG. 3 in a main scanning direction.

FIG. 4 is a schematic diagram illustrating a liquid applier 31 of the edge binder 25 viewed from the main scanning direction.

As illustrated in FIG. 3, the edge binder 25 includes the liquid applier 31 and a crimper 32. The liquid applier 31 executes a processing operation related to the liquid application. The crimper 32 serves as a post-processing device and executes the crimp binding. The liquid applier 31 and the crimper 32 are disposed downstream from the internal tray 22 in the conveyance direction and adjacent to each other in the main scanning direction.

The liquid applier 31 serving as a liquid applying device applies liquid that is stored in the first liquid-storage tank 43 to the sheet P or the sheet bundle Pb placed on the internal tray 22. In the following description, the application of liquid to the sheet P or the sheet bundle Pb may be referred to as "liquid application" whereas a process to apply liquid may be referred to as a "liquid application process."

More specifically, the liquid that is stored in the first liquid-storage tank 43 for the liquid application includes, as a main component, a compound of hydrogen and oxygen represented by the chemical formula $H_2O$ in a liquid state. The liquid hydrogen-oxygen compound is at any temperature. For example, the liquid hydrogen-oxygen compound may be so-called warm water or hot water. The liquid hydrogen-oxygen compound is not limited to pure water. The liquid hydrogen-oxygen compound may be purified water or may contain ionized salts. The metal ion content ranges from so-called soft water to ultrahard water. In other words, the liquid hydrogen-oxygen compound is at any hardness.

In addition, an additive may be added to the liquid to be used for liquid application, together with the main component exemplified above. The liquid that is stored in the first liquid-storage tank 43 may include residual chlorine used for tap water. Preferably, for example, the liquid that is stored in the first liquid-storage tank 43 may include, as an additive, a colorant, a penetrant, a pH adjuster, a preservative such as phenoxyethanol, or a drying inhibitor such as glycerin. It is desirable that a preservative, a drying inhibitor, or the like be added. Since water is used as a component of ink used for inkjet printers or ink used for water-based pens, such water or ink may be used for the "liquid application."

The water is not limited to the specific examples described above. The water may be water in a broad sense such as hypochlorous acid water or an ethanol aqueous solution diluted for disinfection. However, tap water may be used simply to enhance the binding strength after the binding process because tap water is easy to obtain and store. A liquid including water as a main component as exemplified above enhances the binding strength of the sheet bundle Pb, in comparison with a liquid of which the main component is not water (liquid).

The liquid applier 31 and the crimper 32 can be moved together in the main scanning direction by a driving force transmitted from an edge-binder movement motor 50. A liquid application position or a liquid application region to which the liquid is applied on the sheet P or the sheet bundle Pb by the liquid applier 31 corresponds to a crimp binding position or a crimp binding region on the sheet bundle Pb to be crimped and bound by the crimper 32. For this reason, in the following description, the liquid application position (or the liquid application region) and the crimp binding position (or the crimp binding region) are denoted by the same reference numeral.

A description is now given of a configuration of the liquid applier 31.

As illustrated in FIGS. 3 and 4, the liquid applier 31 can be moved in the main scanning direction together with the crimper 32 by the driving force transmitted from the edge-binder movement motor 50.

The liquid applier 31 includes a lower pressure plate 33 serving as a receptacle for the sheet P or the sheet bundle Pb, an upper pressure plate 34, a liquid-applier movement assembly 35, and a liquid application assembly 36. The components of the liquid applier 31 such as the lower pressure plate 33, the upper pressure plate 34, the liquid-applier movement assembly 35, and the liquid application assembly 36 are held by a liquid application frame 31*a* and a base 48.

The lower pressure plate 33 and the upper pressure plate 34 are disposed downstream from the internal tray 22 in the conveyance direction. The sheet P or the sheet bundle Pb that is placed on the internal tray 22 is also placed on the lower pressure plate 33. The lower pressure plate 33 is disposed on a lower-pressure-plate holder 331. The upper pressure plate 34 is movable in the thickness direction of the sheet P or the sheet bundle Pb at a position where the upper pressure plate 34 faces the sheet P or the sheet bundle Pb placed on the internal tray 22. In other words, the lower pressure plate 33 and the upper pressure plate 34 are disposed to face each other in the thickness direction of the sheet P or the sheet bundle Pb with the sheet P or the sheet bundle Pb placed on the internal tray 22 and interposed between the lower pressure plate 33 and the upper pressure plate 34. In the following description, the thickness direction of the sheet P or the sheet bundle Pb may be referred to simply as "thickness direction." The upper pressure plate 34 has a through hole 34*a* penetrating in the thickness direction at a position where the through hole 34*a* faces an end of a liquid application member 44, which is a part of the liquid applier 31, held via a holder 46 attached to a base plate 40.

The liquid-applier movement assembly 35 moves the upper pressure plate 34, the base plate 40, the holder 46, the liquid application member 44, the first liquid supplier 45, and the first liquid-storage tank 43 in the thickness direction of the sheet P or the sheet bundle Pb. The liquid-applier movement assembly 35 according to the present embodiment moves the upper pressure plate 34, the base plate 40, the first liquid-storage tank 43, the liquid application member 44, the first liquid supplier 45, and the holder 46 in conjunction with each other (in a unified way) by a single liquid-applier movement motor 37.

The liquid-applier movement assembly 35 includes, for example, the liquid-applier movement motor 37, a trapezoidal screw 38, a nut 39, the base plate 40, columns 41*a* and 41*b*, and coil springs 42*a* and 42*b*.

The liquid-applier movement motor 37 generates a driving force to move the upper pressure plate 34, the base plate 40, the holder 46, the liquid application member 44, the first liquid supplier 45, and the first liquid-storage tank 43. The trapezoidal screw 38 extends in the thickness direction of the sheet P or the sheet bundle Pb, and is supported by the liquid application frame 31*a* of the liquid applier 31 so as to be rotatable in the forward and reverse directions. The trapezoidal screw 38 is coupled to an output shaft of the liquid-applier movement motor 37 via, for example, a pulley and a belt. The nut 39 is screwed to the trapezoidal screw 38. The trapezoidal screw 38 is rotated in the forward and reverse directions by the driving force transmitted from the liquid-applier movement motor 37. The rotation of the trapezoidal screw 38 causes the nut 39 to reciprocate on the trapezoidal screw 38.

The base plate 40 is positioned apart from the upper pressure plate 34.

The base plate 40 holds the liquid application member 44 with the end of the liquid application member 44 projecting from the base plate 40 toward the upper pressure plate 34. The base plate 40 is coupled to the trapezoidal screw 38 via the nut 39 so as to reciprocate along the trapezoidal screw 38 when the trapezoidal screw 38 rotates in the forward and reverse directions. The position of the base plate 40 in the thickness direction of the sheet P or the sheet bundle Pb is detected by a position sensor 40*a* illustrated in FIG. 13.

The columns 41*a* and 41*b* project from the base plate 40 toward the upper pressure plate 34 around the end of the liquid application member 44. The columns 41*a* and 41*b* are movable relative to the base plate 40 in the thickness direction. The columns 41*a* and 41*b* hold the upper pressure plate 34 with the respective tip ends closer to the lower pressure plate 33 than the other ends of the columns 41*a* and 41. The other ends of the columns 41*a* and 41*b* opposite the ends closer to the lower pressure plate 33 are provided with stoppers that prevent the columns 41*a* and 41*b* from being removed from the base plate 40. The coil springs 42*a* and 42*b* are fitted around the columns 41*a* and 41*b*, respectively, between the base plate 40 and the upper pressure plate 34. The coil springs 42*a* and 42*b* bias the upper pressure plate 34 and the columns 41*a* and 41*b* toward the lower pressure plate 33 with respect to the base plate 40.

The liquid application assembly 36 applies liquid to the sheet P or the sheet bundle Pb placed on the internal tray 22. More specifically, the liquid applier 31 brings the liquid application member 44 into contact with the sheet P or the sheet bundle Pb to apply the liquid to at least one of sheets P of the sheet bundle Pb.

The liquid application assembly 36 includes a first liquid-amount sensor 43*a* serving as a first liquid detector, the first liquid-storage tank 43, the liquid application member 44, the first liquid supplier 45, and the holder 46. The first liquid-storage tank 43 stores the liquid to be applied to the sheet P or the sheet bundle Pb. The amount of liquid that is stored in the first liquid-storage tank 43 is detected by the first liquid-amount sensor 43*a*.

The first liquid-storage tank 43 is coupled to the base plate 40 via the holder 46.

The liquid application member 44 applies the liquid stored in the first liquid-storage tank 43 to the sheet P or the sheet bundle Pb. The liquid application member 44 and the first liquid supplier 45 disposed in close contact with the liquid application member 44 are both held by the holder 46. The holder 46 is held by the base plate 40. The holder 46 is an elongated cylindrical body (for example, a tube) that is fitted around the first liquid supplier 45. The holder 46 prevents the liquid absorbed by the first liquid supplier 45 from leaking or evaporating.

The first liquid supplier 45 has a first end in close contact with the liquid application member 44 and a second end immersed in the liquid stored in the first liquid-storage tank 43. In other words, the second end of the first liquid supplier 45 corresponds to an immersion portion that sucks up the liquid and supplies the liquid to the liquid application member 44. Each of the liquid application member 44 and the first liquid supplier 45 is made of a material having a relatively high liquid absorption such as an elastic resin formed of open cells. For example, the liquid application member 44 and the first liquid supplier 45 may be made of sponge or fiber. Accordingly, when the second end of the first liquid supplier 45 is immersed in the stored liquid, the liquid is sucked up by capillary action. As a result, the first liquid supplier 45 and the liquid application member 44 are filled with the liquid.

The liquid application member 44 according to the present embodiment has a planar end face. The liquid application member 44 according to the present embodiment is supported by the base plate 40 such that the end face is parallel to the sheet P or the sheet bundle Pb placed on the internal tray 22.

A liquid applier shaft 562 provided with a drive transmission gear 562*a* is fixed to a bottom face of the liquid application frame 31*a* that holds the components of the liquid applier 31. The liquid applier shaft 562 and the drive transmission gear 562*a* are held by the base 48 on which the liquid application frame 31*a* is disposed, so as to be rotatable in the forward and reverse directions. The drive transmission gear 562*a* meshes with an output gear 563*a* of a liquid-applier pivot motor 563. The liquid applier 31 can be rotated in the forward and reverse directions about the liquid applier shaft 562 on the base 48 by a driving force transmitted from the liquid-applier pivot motor 563 to the liquid applier shaft 562 via the output gear 563*a* and the drive transmission gear 562*a*.

A description is now given of the second liquid storage.

As illustrated in FIG. 4, the post-processing apparatus 3 includes the second-liquid-storage-tank fixer 52 as a part of the second liquid storage, the second liquid-storage tank 53 as a part of the second liquid storage, the second liquid supplier 54, and the liquid supply pump 55, to supply liquid to the first liquid-storage tank 43. For example, the liquid is supplied to the first liquid-storage tank 43 in a way described below. However, the way of supplying the liquid to the first liquid-storage tank 43 is not limited to the following example. Alternatively, for example, a user may directly replenish the first liquid-storage tank 43 with the liquid.

Figure 5A:
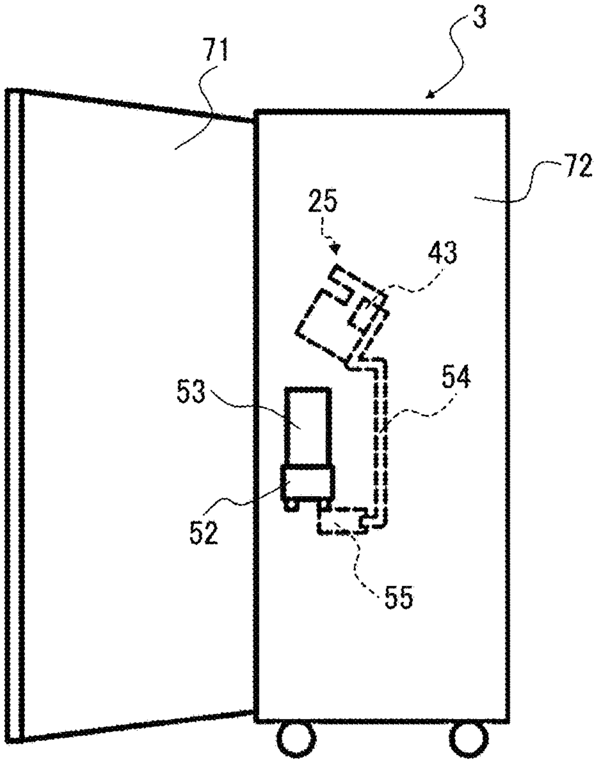
FIGS. 5A and 5B are diagrams illustrating an example location and configuration of a second liquid storage in the post-processing apparatus of FIG. 2.
Figure 5B:
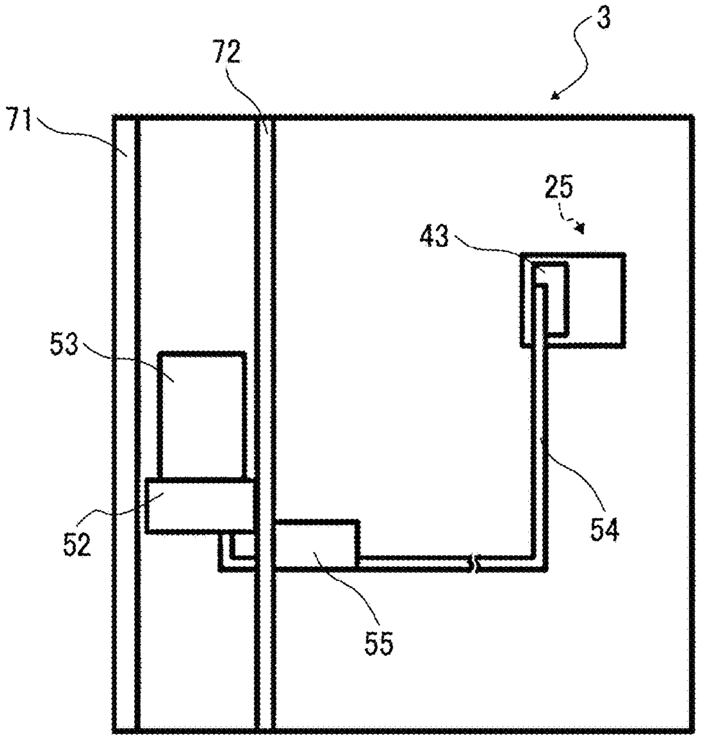
Figure 6:
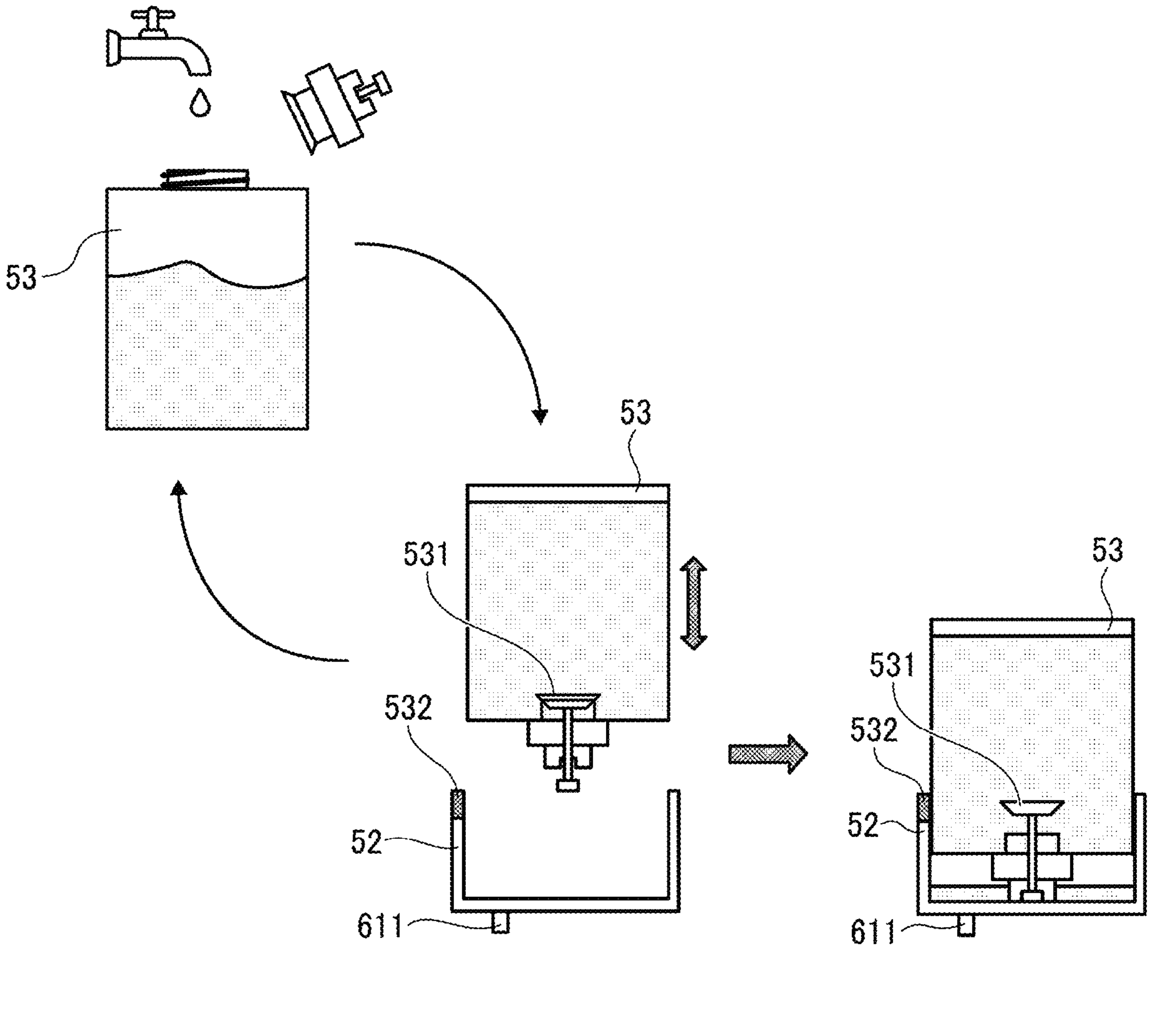
FIG. 6 is a diagram illustrating an attachment and detachment configuration of the second liquid storage of FIGS. 5A and 5B.

Referring now to FIGS. 5A to 6, a description is given of the location and configuration of the second liquid-storage tank 53.

FIGS. 5A and 5B illustrate an example location and configuration of the second liquid-storage tank 53 as a main tank. Specifically, FIG. 5A illustrates the post-processing apparatus 3 with a cover (i.e., a front door 71) opened. FIG. 5B is a cross-sectional side view of the post-processing apparatus 3. FIG. 5B illustrates the post-processing apparatus 3 with the cover (i.e., the front door 71) closed.

As illustrated in FIGS. 5A and 5B, the second liquid-storage tank 53 is located so as to be accessible when the front door 71 of the post-processing apparatus 3 is opened. A main-body side plate 72 of the post-processing apparatus 3 is disposed between where the second liquid-storage tank 53 and the second-liquid-storage-tank fixer 52 are disposed and where the first liquid-storage tank 43 is disposed. The second-liquid-storage-tank fixer 52 is provided with a liquid drain plug 611.

After the liquid remaining in the first liquid-storage tank 43 and the second liquid supplier 54 is reversely fed to the second-liquid-storage-tank fixer 52, the liquid drain plug 611 is opened to discharge the liquid stored in the second-liquid-storage-tank fixer 52 from the inside of the post-processing apparatus 3. Thus, the liquid is prevented from being frozen during maintenance of the post-processing apparatus 3.

FIG. 6 illustrates the second liquid-storage tank 53 attachable to and detachable from the second-liquid-storage-tank fixer 52 and replenished with liquid.

As illustrated in FIG. 6, the second liquid-storage tank 53 is attachable to and detachable from the second-liquid-storage-tank fixer 52 so as to be replenished with liquid. The second-liquid-storage-tank fixer 52 is provided with a set sensor 532 that detects that the second liquid-storage tank 53 is set in second-liquid-storage-tank fixer 52. When the second liquid-storage tank 53 is not set in the second-liquid-storage-tank fixer 52, an outlet of the second liquid-storage tank 53 is closed by a liquid supply valve 531 so that the liquid does not leak. When the second liquid-storage tank 53 is set in the second-liquid-storage-tank fixer 52, the liquid supply valve 531 is pushed up and the liquid stored in the second liquid-storage tank 53 flows to the second-liquid-storage-tank fixer 52, allowing the liquid to be stored in the second-liquid-storage-tank fixer 52.

The second-liquid-storage-tank fixer 52 stores the liquid to be supplied to the first liquid-storage tank 43.

The second-liquid-storage-tank fixer 52 is attached to the main-body side plate 72 of the post-processing apparatus 3 outside the moving range, in the main scanning direction, of the edge binder 25 including the liquid applier 31. The amount of liquid that is stored in the second-liquid-storage-tank fixer 52 is detected by a second liquid-amount sensor 52*a* serving as a second liquid detector.

The second liquid-storage tank 53, which is a liquid bottle, stores the liquid to be supplied to the second-liquid-storage-tank fixer 52. The second liquid-storage tank 53 is attachable to and detachable from the second-liquid-storage-tank fixer 52. When the second liquid-storage tank 53 is attached to the second-liquid-storage-tank fixer 52, the liquid moves from the second liquid-storage tank 53 to the second-liquid-storage-tank fixer 52 until the amount of liquid in the second-liquid-storage-tank fixer 52 reaches an upper-limit value. When the amount of liquid in the second-liquid-storage-tank fixer 52 reaches the upper-limit value, the liquid stops moving from the second liquid-storage tank 53 to the second-liquid-storage-tank fixer 52.

The second liquid supplier 54 couples the second-liquid-storage-tank fixer 52 and the first liquid-storage tank 43 to each other. The second liquid supplier 54 supplies the liquid stored in the second-liquid-storage-tank fixer 52 to the first liquid-storage tank 43. The second liquid supplier 54 is, for example, a hollow member through which liquid can move. The second liquid supplier 54 includes a tubular member such as a pipe or a hose, or a combination thereof. The diameter (inner diameter) of the hollow portion of the second liquid supplier 54 is set such that liquid is supplied from the second-liquid-storage-tank fixer 52 to the first liquid-storage tank 43 at a suitable speed. The speed at which the liquid is supplied from the second-liquid-storage-tank fixer 52 to the first liquid-storage tank 43 is referred to as a second supply speed. For example, the diameter of the hollow portion of the second liquid supplier 54 is set such that the second supply speed is faster than a first supply speed that is a speed at which liquid is supplied from the first liquid-storage tank 43 to the liquid application member 44 through the first liquid supplier 45.

The liquid supply pump 55 is attached to the main-body side plate 72 of the post-processing apparatus 3 together with the second-liquid-storage-tank fixer 52. The liquid supply pump 55 supplies (pumps) the liquid stored in the second-liquid-storage-tank fixer 52 to the first liquid-storage tank 43 through the second liquid supplier 54. The liquid supply pump 55 may be included in a part of the second liquid supplier 54, or may be provided between tubular members included in the second liquid supplier 54.

A description is given of the configuration of the crimper 32.

A detailed description is now given of the crimper 32 (post-processing device) illustrated in FIG. 3.

Figure 7A:
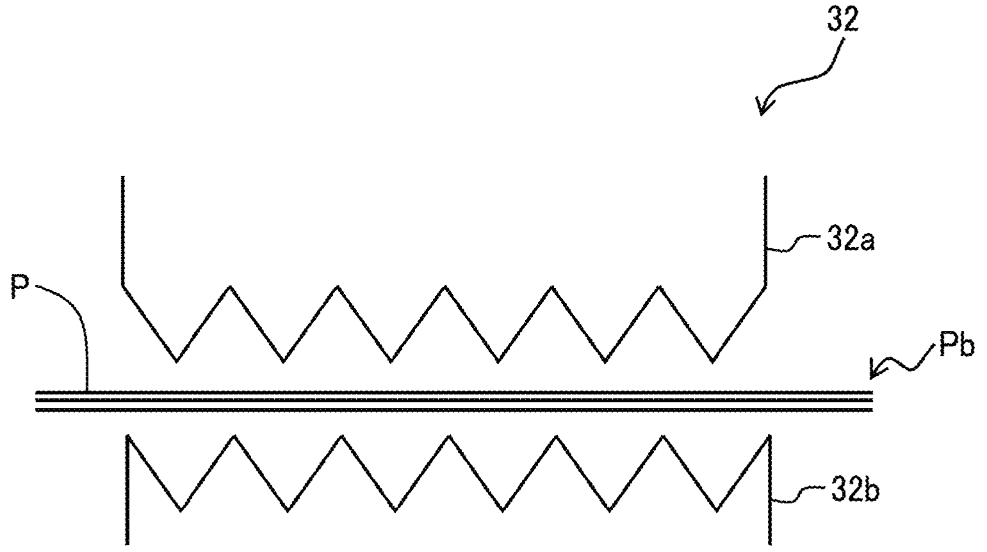
FIGS. 7A and 7B are schematic diagrams illustrating a configuration of a crimper of the edge binder of FIG. 3.
Figure 7B:

The crimper 32 sandwiches, with serrate upper crimping teeth 32*a* and serrate lower crimping teeth 32*b*, at least a part (in other words, the liquid application position) of the sheet bundle Pb to which liquid has been applied by the liquid applier 31 to press and deform at least the part of the sheet bundle Pb. Thus, the crimper 32 binds the sheet bundle Pb. Hereinafter, the binding process and the binding operation based on clamping and application of pressure performed by the upper crimping teeth 32*a* and the lower crimping teeth 32*b* are referred to as "crimp binding". In short, the crimper 32 binds the sheet bundle Pb without binding materials such as staples. The components of the crimper 32 such as the upper crimping teeth 32*a* and the lower crimping teeth 32*b* are disposed on a crimping frame 32*c*. FIGS. 7A and 7B are schematic diagrams illustrating the configuration of the crimper 32.

As illustrated in FIGS. 7A and 7B, the crimper 32 includes a pair of binding teeth (i.e., the upper crimping teeth 32*a* and the lower crimping teeth 32*b*). The upper crimping teeth 32*a* and the lower crimping teeth 32*b* are disposed to face each other in the thickness direction of the sheet bundle Pb to pinch the sheet bundle Pb placed on the internal tray 22. The upper crimping teeth 32*a* and the lower crimping teeth 32*b* have respective serrate faces facing each other. The serrate face of each of the upper crimping teeth 32*a* and the lower crimping teeth 32*b* includes concave portions and convex portions alternately formed. The concave portions and the convex portions of the upper crimping teeth 32*a* are shifted from the concave portions and the convex portions of the lower crimping teeth 32*b* such that the upper crimping teeth 32*a* are engaged with the lower crimping teeth 32*b*. The upper crimping teeth 32*a* and the lower crimping teeth 32*b* are brought into contact with and separated from each other by the driving force of a contact-separation motor 32*d* illustrated in FIG. 13.

In the process of supplying the sheets P of the sheet bundle Pb to the internal tray 22, the upper crimping teeth 32*a* and the lower crimping teeth 32*b* are apart from each other as illustrated in FIG. 7A. When all the sheets P of the sheet bundle Pb are placed on the internal tray 22, the upper crimping teeth 32*a* and the lower crimping teeth 32*b* are engaged with each other to press and deform the sheet bundle Pb in the thickness direction as illustrated in FIG. 7B. As a result, the sheet bundle Pb that has been placed on the internal tray 22 is crimped and bound. The sheet bundle Pb thus crimped and bound is output to the second output tray 26 by the conveyance roller pair 15.

The configuration of the crimper 32 is not limited to the configuration of a moving assembly exemplified in the present embodiment, provided that the upper crimping teeth 32*a* and the lower crimping teeth 32*b* of the crimping assembly are engaged with each other. For example, a link-mechanism type crimping assembly (for example, disclosed in Japanese Patent No. 6057167) that performs crimping and separating operations of the upper crimping teeth 32*a* and the lower crimping teeth 32*b* by using a drive source and a link mechanism that perform only forward rotation or forward and reverse rotation may be used for the crimper 32. Alternatively, a linear-motion type crimping assembly may be used which linearly performs crimping and separating operations of the upper crimping teeth 32*a* and the lower crimping teeth 32*b* by a screw mechanism that converts rotational motion of the drive source in the forward and reverse directions into linear reciprocating motion.

A crimper shaft 561 provided with a drive transmission gear 561*a* is fixed to a bottom face of the crimping frame 32*c* that holds the components of the crimper 32. The crimper shaft 561 and the drive transmission gear 561*a* are held by the base 48 on which the crimping frame 32*c* is disposed, so as to be rotatable in the forward and reverse directions. The drive transmission gear 561*a* meshes with an output gear 56*a* of a crimper pivot motor 56. The crimper 32 can be rotated in the forward and reverse directions about the crimper shaft 561 on the base 48 by a driving force transmitted from the crimper pivot motor 56 to the crimper shaft 561 via the output gear 56*a* and the drive transmission gear 561*a*.

As illustrated in FIG. 3, the edge binder 25 includes an edge-binder movement assembly 47.

Figure 13:
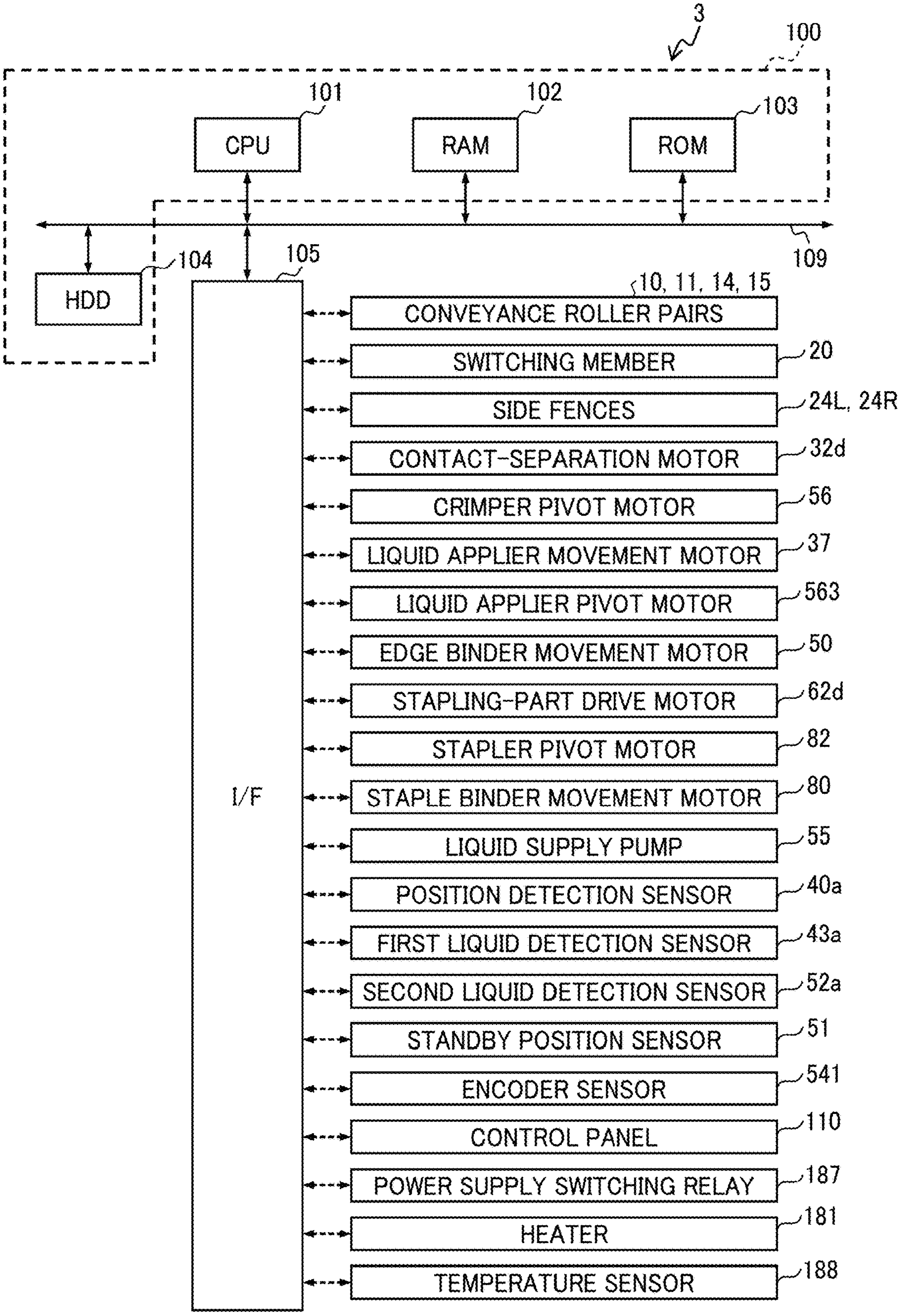
FIG. 13 is a block diagram illustrating a hardware configuration of the post-processing apparatus of FIG. 2 to control the post-processing apparatus.

The edge-binder movement assembly 47 moves the edge binder 25, specifically, the liquid applier 31 and the crimper 32, in the main scanning direction along a downstream end, in the conveyance direction, of the sheet P placed on the internal tray 22. The edge-binder movement assembly 47 includes, for example, the base 48, a guide shaft 49, the edge-binder movement motor 50, a driving force transmission assembly 551, and a standby position sensor 51, which is illustrated in FIG. 13.

The liquid applier 31 and the crimper 32 are attached to the base 48 so as to be adjacent to each other in the main scanning direction. The guide shaft 49 extends in the main scanning direction at a position downstream from the internal tray 22 in the conveyance direction of the sheet P. The guide shaft 49 supports the base 48 such that the base 48 can move in the main scanning direction. The edge-binder movement motor 50 generates a driving force to move the edge binder 25. The driving force transmission assembly 551 transmits the driving force of the edge-binder movement motor 50 to the base 48 via pulleys 551*a* and 551*b* and a timing belt 551*c*.

As a result, the liquid applier 31 and the crimper 32 integrated by the base 48 move in the main scanning direction along the guide shaft 49. The positions of the liquid applier 31 and the crimper 32 may be ascertained with, for example, an encoder sensor 541 illustrated in FIG. 13. The encoder sensor 541 is attached to an output shaft of the edge-binder movement motor 50. The standby position sensor 51, which is illustrated in FIG. 13, detects the arrival of the edge binder 25 at a standby position HP1 illustrated in FIGS. 15A and 15D.

Figure 15A:
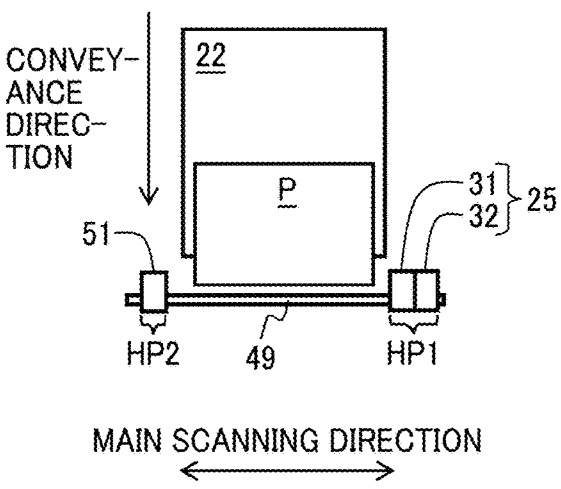
FIGS. 15A, 15B, 15C and 15D are diagrams illustrating the positions of the liquid applier and the crimper during the binding process of FIG. 14.
Figure 15B:
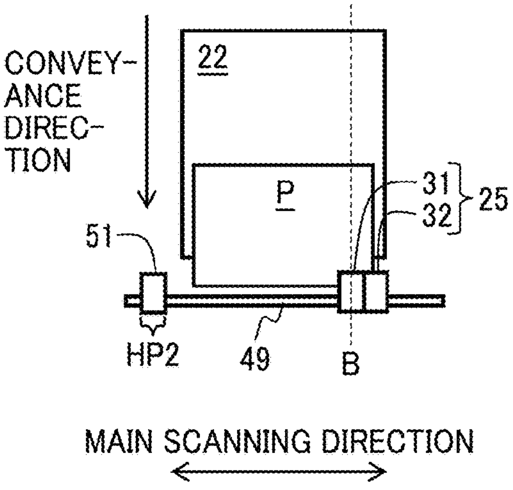
Figure 15C:
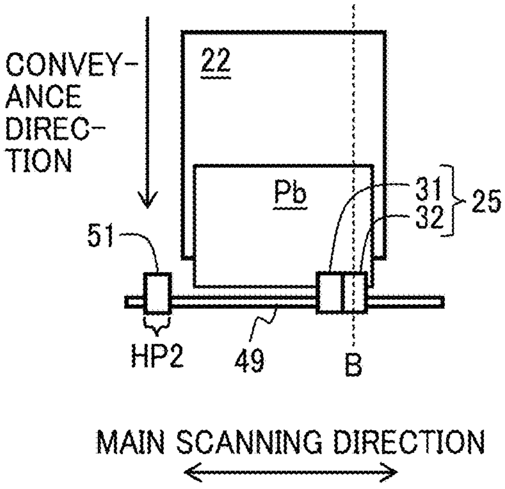
Figure 15D:
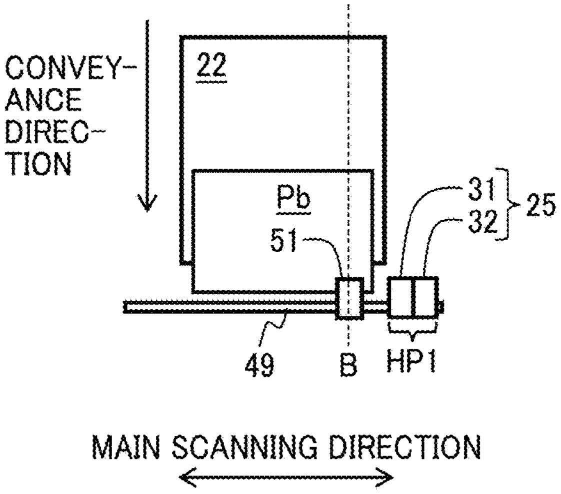

As illustrated in FIGS. 15A and 15D, the standby position HP1 is away in the width direction from the sheet P or the sheet bundle Pb placed on the internal tray 22. As illustrated in FIGS. 15B and 15C, the liquid applier 31 and the crimper 32 are movable along the guide shaft 49 to a position where the liquid applier 31 and the crimper 32 can face a binding position B (liquid application position B) on the sheet bundle Pb placed on the internal tray 22 in the main scanning direction.

A description is now given of a configuration of a modification of the edge binder 25 described above.

Specifically, referring now to FIGS. 8 to 10C, a description is given of an edge binder 25' as a post-processing device and as a modification of the edge binder 25 included in the post-processing apparatus 3.

The edge binder 25' is different from the edge binder 25 described above in that the liquid applier 31 and the crimper 32 are integrated as a single unit. In the following description, components like components of the edge binder 25 described above are denoted by like reference numerals, and redundant descriptions thereof may be omitted unless otherwise required.

Figure 8:
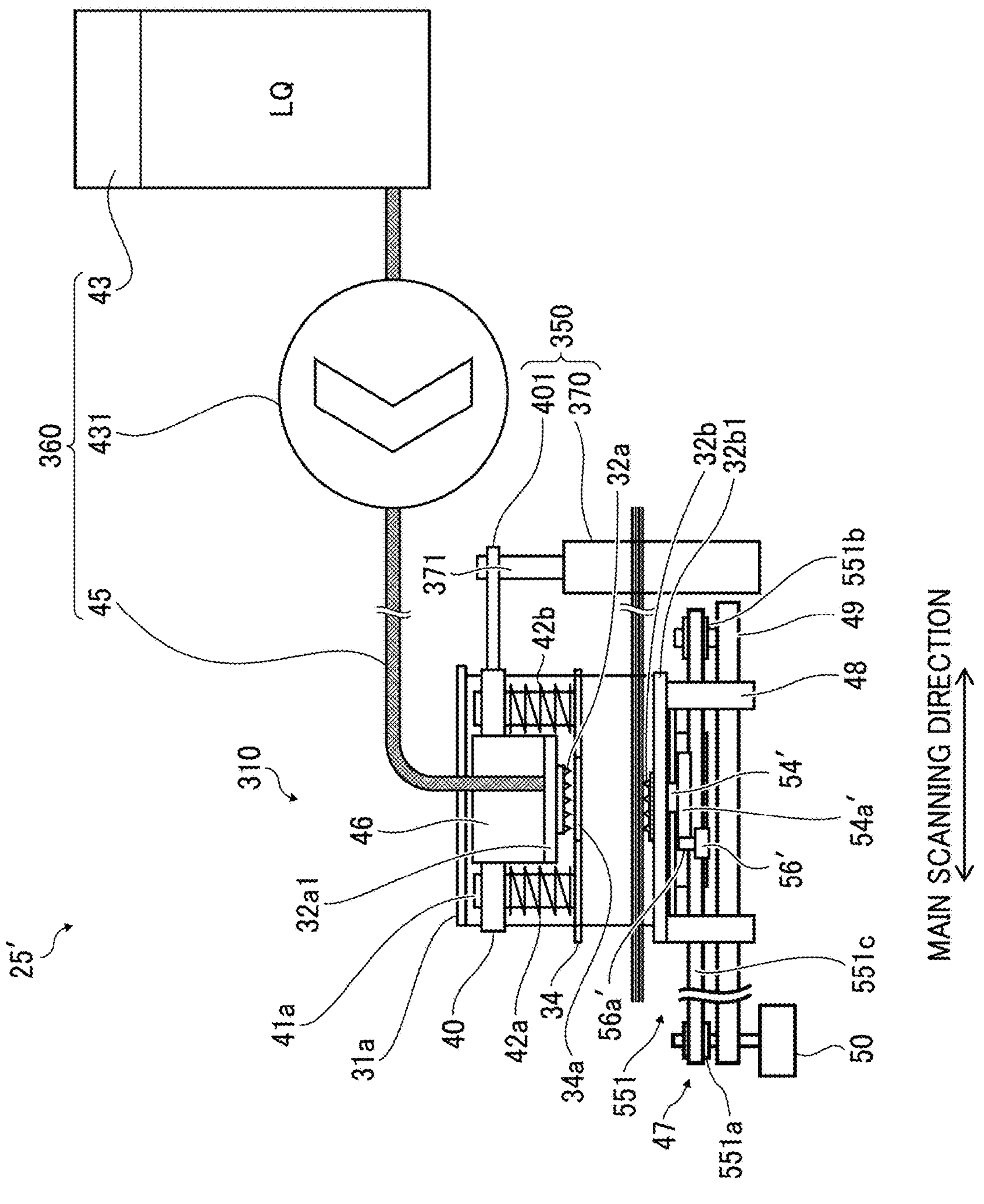
FIG. 8 is a diagram illustrating an edge binder as a modification of the edge binder of FIG. 3.

FIG. 8 is a schematic view of an upstream side of the edge binder 25' in the conveyance direction.

Figure 9A:
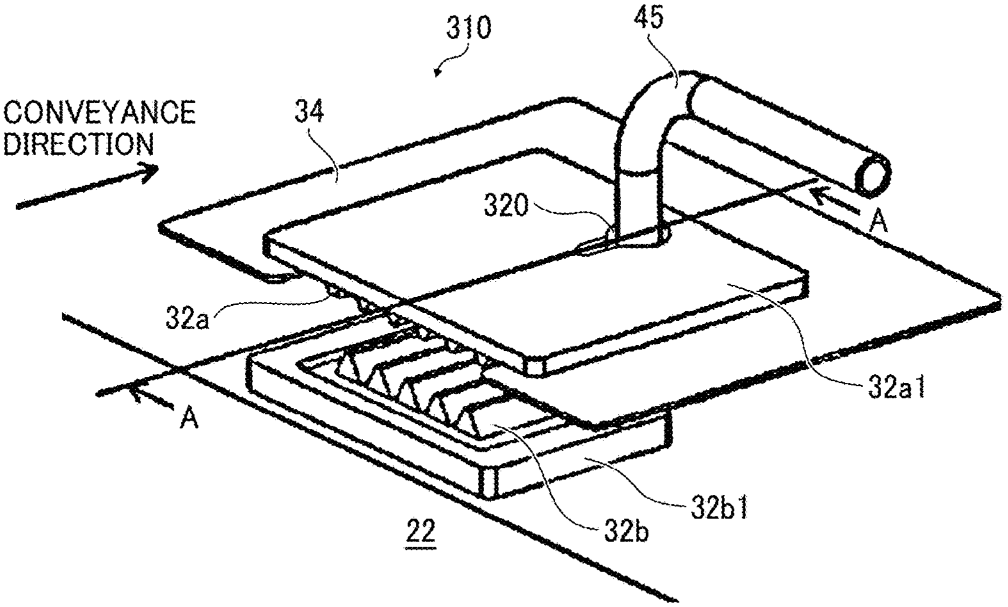
FIGS. 9A, 9B and 9C are diagrams illustrating a liquid application crimper of the edge binder of FIG. 8.

FIG. 9A is a perspective view of a liquid application crimper 310.

Figure 9B:
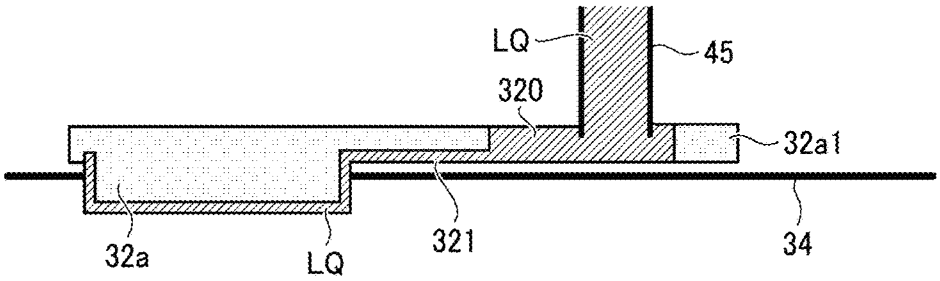

FIG. 9B is a cross-sectional view of the liquid application crimper 310 taken along line A-A in FIG. 9A.

Figure 9C:
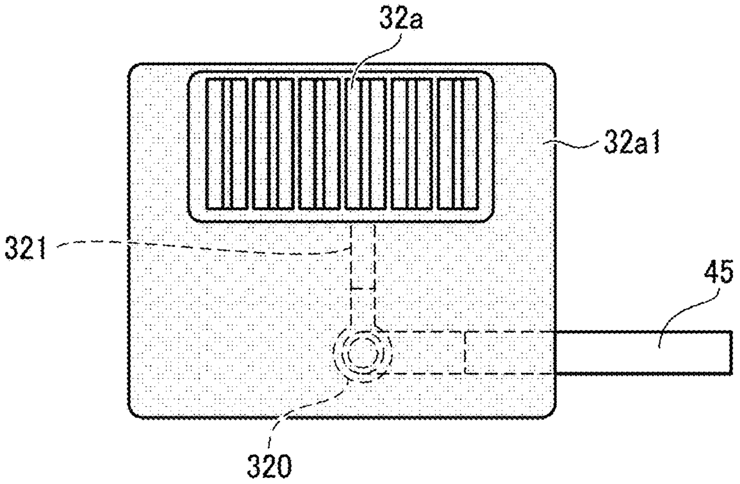

FIG. 9C is a plan view of the upper crimping teeth 32*a* of FIG. 9A as viewed from where the lower crimping teeth 32*b* are disposed.

Figure 10A:
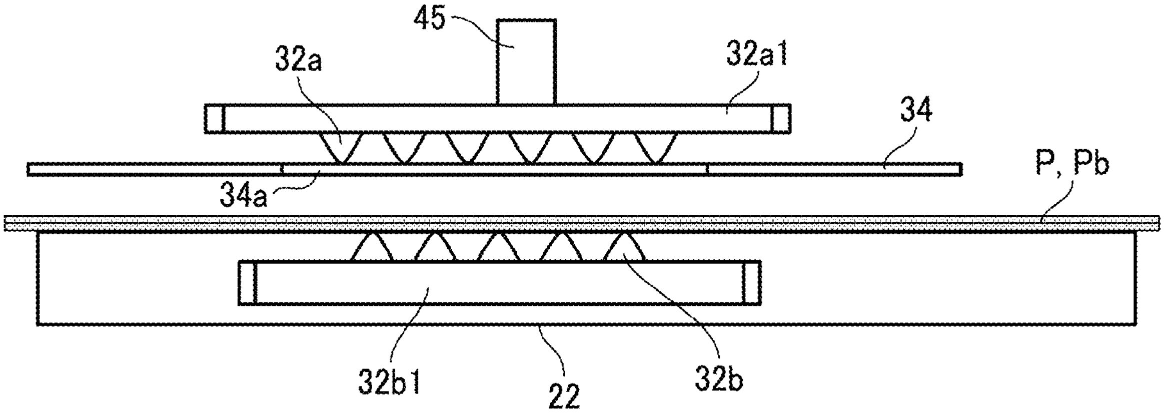
FIGS. 10A, 10B and 10C are diagrams illustrating a liquid applying operation and a crimp binding operation performed by the liquid application crimper of FIGS. 9A, 9B and 9C.
Figure 10B:
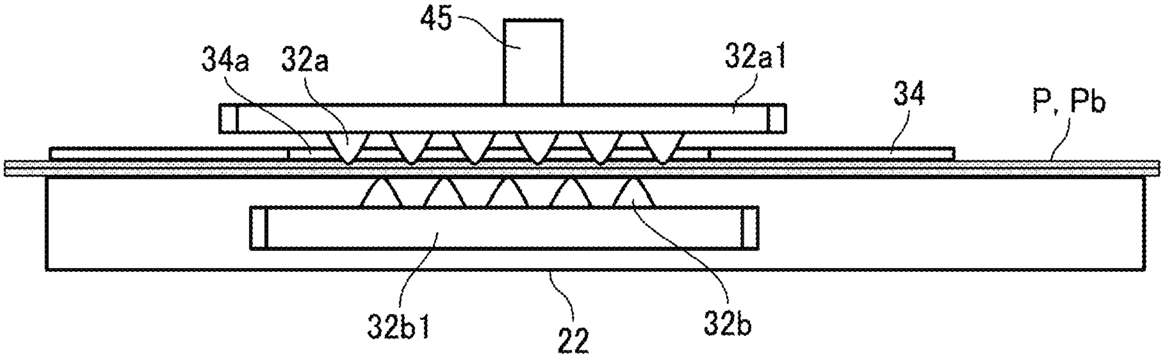
Figure 10C:
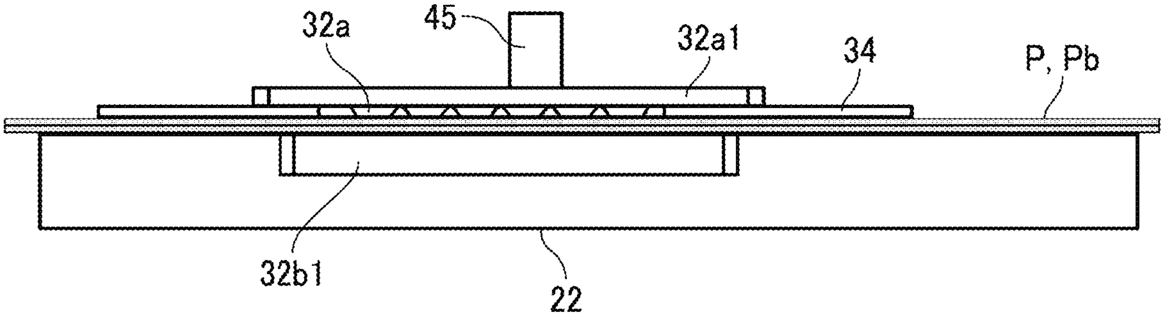

FIGS. 10A, 10B and 10C are diagrams illustrating a liquid applying operation and a crimp binding operation performed by the liquid application crimper 310. In other words, FIGS. 10A, 10B and 10C are schematic views of a downstream side of the liquid application crimper 310 in the conveyance direction.

As illustrated in FIG. 8, the edge binder 25' includes the liquid application crimper 310 in which the liquid applier 31 and the crimper 32 of the edge binder 25 according to the first embodiment are integrated as a single unit. The liquid application crimper 310 is disposed downstream from the internal tray 22 in the conveyance direction.

Constituent elements corresponding to the first liquid-storage tank 43 and the second liquid supplier 54 are omitted from FIGS. 8 to 10C. However, a configuration in which liquid moves from the first liquid-storage tank 43 via the second liquid supplier 54 is also provided for the first liquid-storage tank 43 in the edge binder 25'.

The liquid application crimper 310 applies liquid LQ stored in the first liquid-storage tank 43 to the sheet P or the sheet bundle Pb placed on the internal tray 22. The liquid application crimper 310 can be moved in the main scanning direction by the driving force that is transmitted from the edge-binder movement motor 50 to the base 48 by the driving force transmission assembly 551. The liquid application crimper 310 includes the upper pressure plate 34, the upper crimping teeth 32*a*, the lower crimping teeth 32*b*, a liquid application crimper movement assembly 350, and a liquid supply assembly 360. The components of the liquid application crimper 310 are held by the liquid application frame 31*a* and the base 48. A liquid-application-crimper shaft 54' provided with a drive transmission gear 54*a'* is fixed to the bottom face of the liquid application frame 31*a*. The liquid-application-crimper shaft 54' and the drive transmission gear 54*a'* are held by the base 48 on which the liquid application frame 31*a* is disposed, so as to be rotatable in the forward and reverse directions. The drive transmission gear 54*a'* meshes with an output gear 56*a'* of a liquid-application-crimper pivot motor 56'. The liquid application crimper 310 can be rotated in the forward and reverse directions about the liquid-application-crimper shaft 54' on the base 48 by a driving force transmitted from the liquid-application-crimper pivot motor 56' to the liquid-application-crimper shaft 54' via the output gear 56*a'* and the drive transmission gear 54*a'*.

The liquid application crimper movement assembly 350 moves the upper pressure plate 34, the base plate 40, and the upper crimping teeth 32*a* in cooperation with each other in the thickness direction of the sheet P or the sheet bundle Pb by an electric cylinder 370. The base plate 40 holds an upper-crimping-teeth holder 32*al* and the upper crimping teeth 32*a* via the holder 46. The base plate 40 movably holds the upper pressure plate 34 via the columns 41*a* and 41*b*.

The base plate 40 is attached to an end of a rod 371 of the electric cylinder 370 via a connecter 401.

The columns 41*a* and 41*b* have respective lower ends holding the upper pressure plate 34. The coil springs 42*a* and 42*b* are fitted around the columns 41*a* and 41*b*, respectively, between the base plate 40 and the upper pressure plate 34. The coil springs 42*a* and 42*b* bias the upper pressure plate 34 and the columns 41*a* and 41*b* in a direction away from the base plate 40.

The liquid supply assembly 360 includes the first liquid-storage tank 43, a liquid supply pump 431, and the first liquid supplier 45. The liquid supply pump 431 supplies the liquid LQ via the first liquid supplier 45 to a liquid reservoir 320 of the upper-crimping-teeth holder 32*al* as illustrated in FIG. 9A. The first liquid supplier 45 is an elastic elongated member having a base end (proximal end) coupled to the liquid supply pump 431 and a distal end coupled to the liquid reservoir 320.

As illustrated in FIG. 9B, the upper crimping teeth 32*a* are integrated with the upper-crimping-teeth holder 32*a*1. The upper-crimping-teeth holder 32*al* includes the liquid reservoir 320 and a liquid supply passage 321, and the liquid LQ stored in the liquid reservoir 320 is supplied to the upper crimping teeth 32*a* through the liquid supply passage 321. The surface of the upper crimping teeth 32*a* is subjected to a hydrophilic treatment so that the liquid LQ that is supplied through the liquid supply passage 321 uniformly spreads over the surface of the upper crimping teeth 32*a*. On the other hand, the portion of the upper-crimping-teeth holder 32*al* other than the upper crimping teeth 32*a* is subjected to a hydrophobic treatment so that the liquid LQ efficiently spreads over the surface of the upper crimping teeth 32*a*.

As illustrated in FIG. 8, the lower crimping teeth 32*b* are integrated with a lower-crimping-teeth holder 32*b*1, which is a part of the liquid application frame 31*a*. The lower crimping teeth 32*b* are attached to the base 48 via the lower-crimping-teeth holder 32*b*1.

Referring now to FIGS. 10A to 10C, a description is given of the liquid applying operation and the crimp binding operation performed by the liquid application crimper 310.

In the process of supplying the sheet P to the internal tray 22, the upper crimping teeth 32*a* and the lower crimping teeth 32*b* are apart from each other as illustrated in FIG. 10A. When the sheet P is placed on the internal tray 22, the electric cylinder 370 is contracted to move the upper crimping teeth 32*a* and the upper pressure plate 34 toward the sheet P. Then, as illustrated in FIG. 10B, the upper pressure plate 34 first comes into contact with the sheet P, and then the upper crimping teeth 32*a* pass through the through hole 34*a* of the upper pressure plate 34 and come into contact with the sheet P. At this time, since the liquid LQ is spread over the surfaces of the upper crimping teeth 32*a*, bringing the upper crimping teeth 32*a* into contact with the sheet P allows the liquid to be applied to the liquid application position on the sheet P. When the liquid application to the liquid application position is completed, the electric cylinder 370 is extended to separate the upper crimping teeth 32*a* and the upper pressure plate 34 from the sheet P. The aforementioned contact and separation operation of the upper crimping teeth 32*a* and the upper pressure plate 34 with respect to the sheet P corresponds to the liquid applying operation, which is repeated on the sheets P of the sheet bundle Pb.

In response to the number of the sheets of the sheet bundle Pb placed on the internal tray 22 reaching a predetermined number, the electric cylinder 370 is further contracted to move the upper crimping teeth 32*a* toward the lower crimping teeth 32*b*. As illustrated in FIG. 10C, the upper crimping teeth 32*a* further moves toward the lower crimping teeth 32*b* with the sheet bundle Pb sandwiched between the upper crimping teeth 32*a* and the lower crimping teeth 32*b*. Thus, the upper crimping teeth 32*a* and the lower crimping teeth 32*b* press and deform the sheet bundle Pb to crimp and bind the sheet bundle Pb. In short, the crimp binding operation is performed.

A description is now given of a configuration of the stapling unit 155.

Specifically, a detailed description is now given of the stapling unit 155 having a function of executing a stapling process.

Figure 11:
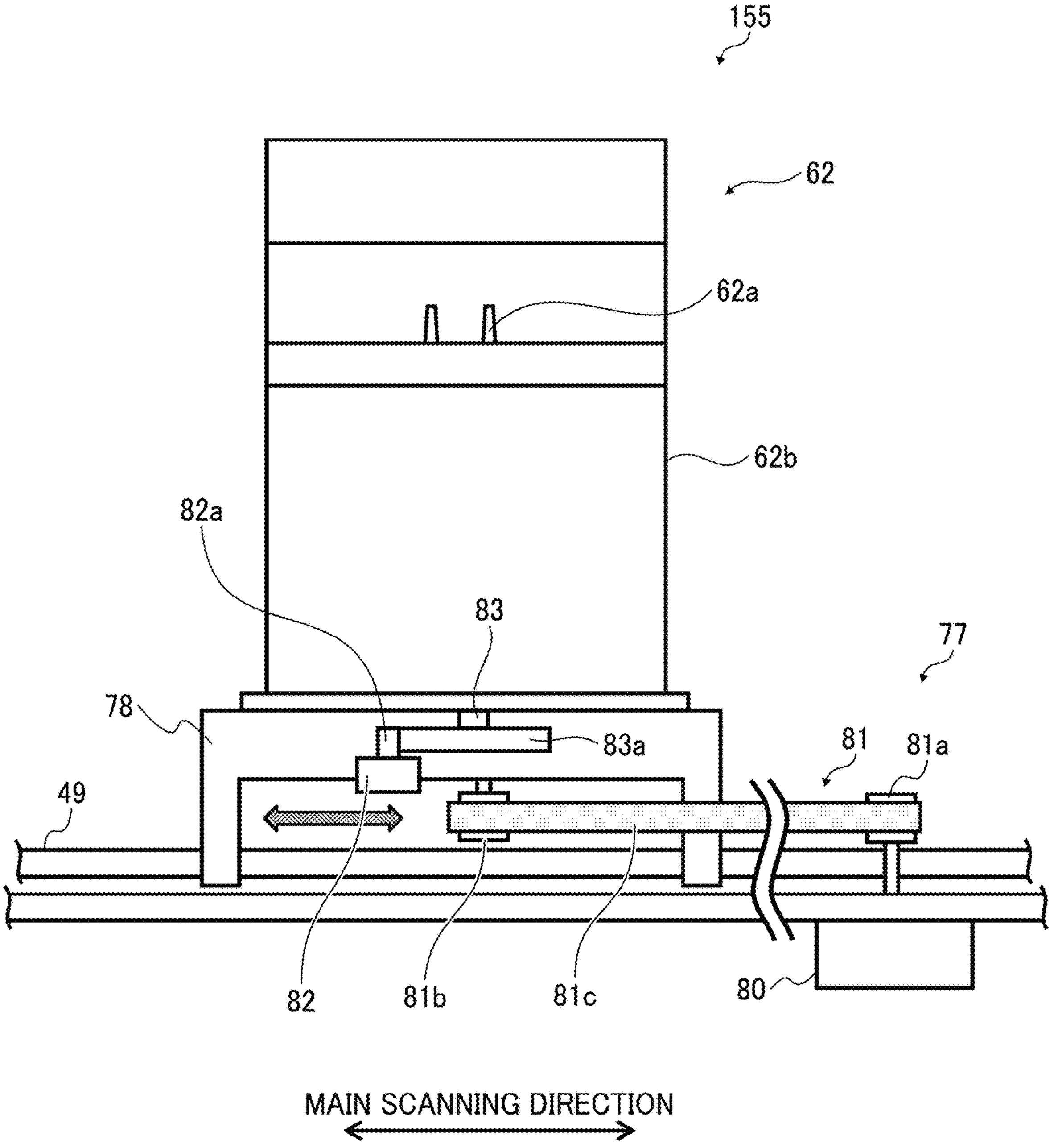
FIG. 11 is a schematic view of an upstream side of a stapling unit of the post-processing apparatus of FIG. 2 in a conveyance direction.

FIG. 11 is a view of an upstream side of the stapling unit 155 in the conveyance direction.

The stapling unit 155 includes a stapler 62 that binds the sheet bundle Pb with staples. The stapler 62 is disposed downstream from the internal tray 22 in the conveyance direction of the sheet P and spaced apart from the edge binder 25 in the main scanning direction.

The stapler 62 serving as a post-processing device has a configuration of performing so-called "stapling" (i.e., stapling process) to bind a sheet bundle Pb with a staple or staples. More specifically, the stapler 62 includes a stapling-part drive motor 62*d* illustrated in FIG. 13. The stapling-part drive motor 62*d* drives a stapling part 62*a*. The driving force of the stapling-part drive motor 62*d* causes a staple loaded in the stapling part 62*a* to penetrate through a sheet bundle Pb, so that the stapling part 62*a* binds the sheet bundle Pb. Since the stapler 62 has a typical configuration, a detailed description of the stapler 62 will be omitted unless otherwise required.

As illustrated in FIG. 11, the stapling unit 155 includes a stapling-unit movement assembly 77. The stapling-unit movement assembly 77 moves the stapling unit 155 in the main scanning direction along the downstream end, in the conveyance direction, of the sheet P or the sheet bundle Pb placed on the internal tray 22. In other words, the stapling unit 155 moves in the main scanning direction along the guide shaft 49 between a standby position HP2 illustrated in FIGS. 15A to 15C and a position where the stapling unit 155 faces the binding position B illustrated in FIG. 15D.

The stapling-unit movement assembly 77 includes, for example, a base 78, the guide shaft 49, a stapling-unit moving motor 80, and a driving force transmission assembly 81. The driving force transmission assembly 81 transmits a driving force of the stapling-unit moving motor 80 to the base 78 via pulleys 81*a* and 81*b* and a timing belt 81*c*. A stapler shaft 83 provided with a drive transmission gear 83*a* is fixed to a bottom face of a stapling frame 62*b* that holds the components of the stapler 62. The stapler shaft 83 and the drive transmission gear 83*a* are held by the base 78 on which the stapling frame 62*b* is disposed, so as to be rotatable in the forward and reverse directions. The drive transmission gear 83*a* meshes with an output gear 82*a* of a stapler pivot motor 82. The stapler 62 is rotatable in the forward and reverse directions about the stapler shaft 83 on the base 78 by a driving force transmitted from the stapler pivot motor 82 to the stapler shaft 83 via the output gear 82*a* and the drive transmission gear 83*a*.

The edge binder 25 and the stapling unit 155 are supported by the common guide shaft 49. The edge-binder movement assembly 47 and the stapling-unit movement assembly 77 move the edge binder 25 and the stapling unit 155 in the main scanning direction along the common guide shaft 49. The edge-binder movement assembly 47 and the stapling-unit movement assembly 77 can independently move the edge binder 25 and the stapling unit 155. A description is now given of a configuration of a modification of the stapling unit 155 described above.

Figure 12:
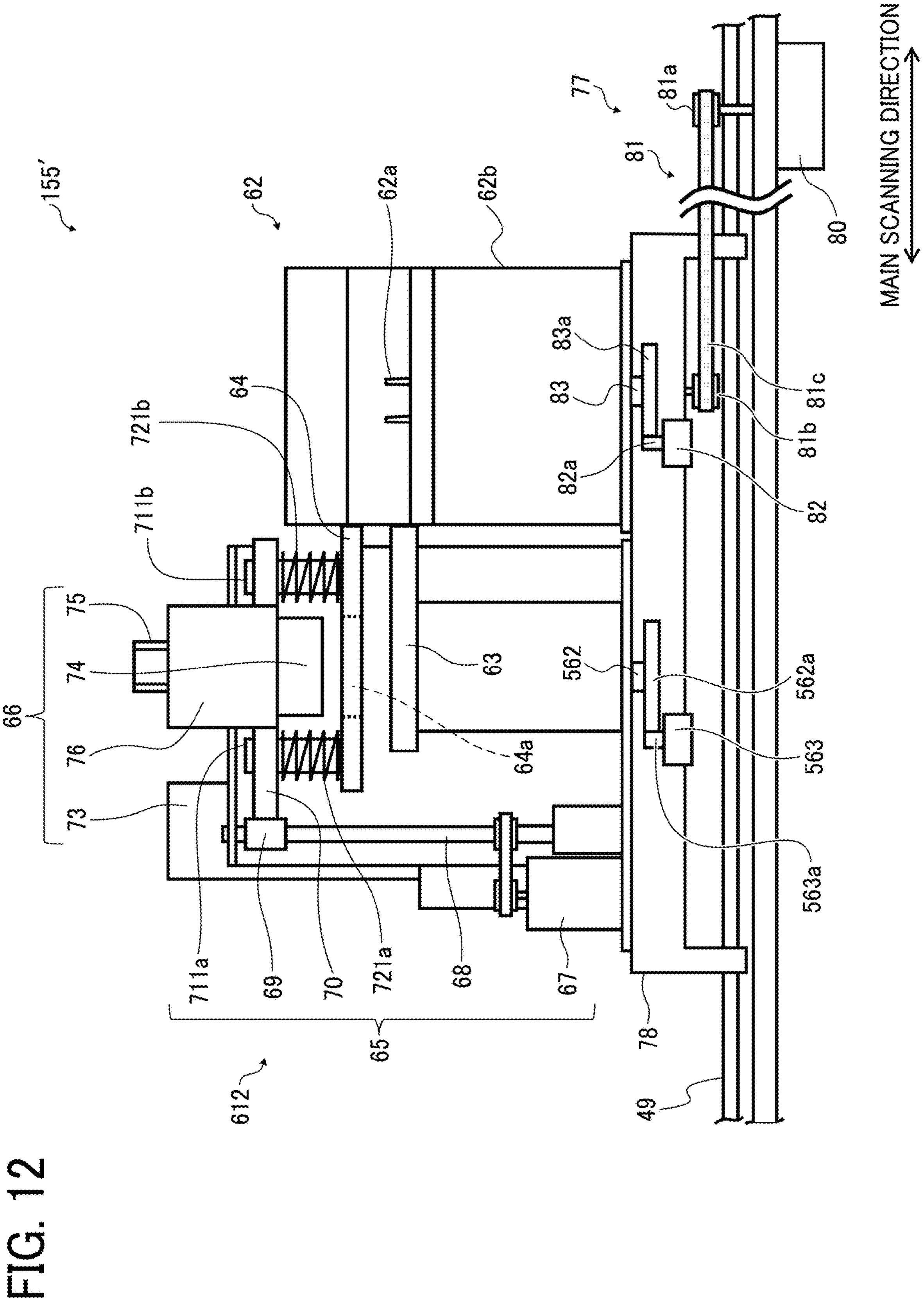
FIG. 12 is a schematic view of an upstream side of a stapling unit as a modification of the stapling unit of FIG. 11 in the conveyance direction.

FIG. 12 illustrates a stapling unit 155' as a modification of the stapling unit 155. Specifically, FIG. 12 is a view of an upstream side of the stapling unit 155' in the conveyance direction.

The stapling unit 155' is different from the stapling unit 155 in that the stapling unit 155' includes a second liquid applier 612 in addition to the stapler 62. As illustrated in FIG. 12, the stapling unit 155' includes the second liquid applier 612 and the stapler 62. The second liquid applier 612 and the stapler 62 are disposed downstream from the internal tray 22 in the conveyance direction and adjacent to each other in the main scanning direction.

The second liquid applier 612 executes "liquid application" of applying liquid stored in a second liquid-storage tank 73 to the sheet P or the sheet bundle Pb placed on the internal tray 22. A given region including a position to which the liquid is applied on the sheet P or the sheet bundle Pb by the second liquid applier 612 corresponds to a binding position to be stapled. As illustrated in FIG. 12, the second liquid applier 612 includes a second lower pressure plate 63, a second upper pressure plate 64 having an opening 64*a*, a second liquid-applier movement assembly 65, and a second liquid application assembly 66. The second liquid-applier movement assembly 65 includes, for example, a second liquid-applier movement motor 67, a second trapezoidal screw 68, a second nut 69, a second base plate 70, second columns 711*a* and 711*b*, and second coil springs 721*a* and 721*b*. The second liquid application assembly 66 includes the second liquid-storage tank 73, a second liquid application member 74, a third liquid supplier 75, and a second joint 76. Since the second liquid application assembly 66 and the liquid application assembly 36 have common configurations, redundant descriptions thereof are omitted below unless otherwise required. Since the configuration of the stapler 62 illustrated in FIG. 12 is similar to the configuration of the stapler 62 illustrated in FIG. 11, a detailed description thereof is omitted below unless otherwise required. Since the second liquid applier 612 and the liquid applier 31 that is illustrated in FIG. 3 have common pivot mechanisms, redundant descriptions thereof will be omitted unless otherwise required.

In the binding process, the stapling unit 155' that is illustrated in FIG. 12 performs the liquid application process on the sheet P to loosen and soften the binding position, allowing the staple to easily pass through the sheet bundle Pb. As a result, the number of sheets to be bound per sheet bundle Pb can be increased as compared with a case where the stapling process is performed without applying the liquid.

Constituent elements corresponding to the first liquid-storage tank 43 and the second liquid supplier 54, which supply liquid to the stapling unit 155', are omitted from FIG. 12. However, a configuration in which liquid is moved to the second liquid applier 612 via the second liquid supplier 54 is also provided for the first liquid-storage tank 43 in the edge binder 25'.

A description is now given of a configuration of a control block of the post-processing apparatus 3.

FIG. 13 is a diagram illustrating a hardware configuration of the post-processing apparatus 3.

As illustrated in FIG. 13, the post-processing apparatus 3 includes a central processing unit (CPU) 101, a random access memory (RAM) 102, a read only memory (ROM) 103, a hard disk drive (HDD) 104, and an interface (I/F) 105. The CPU 101, the RAM 102, the ROM 103, the HDD 104, and the I/F 105 are connected to each other via a common bus 109.

The CPU 101 is an arithmetic unit, and controls the overall operation of the post-processing apparatus 3.

The RAM 102 is a volatile storage medium that allows data to be read and written at high speed. The CPU 101 uses the RAM 102 as a working area for data processing.

The ROM 103 is a read-only non-volatile storage medium that stores programs such as firmware.

The HDD 104 is a non-volatile storage medium that allows data to be read and written and has a relatively large storage capacity. The HDD 104 stores, e.g., an operating system (OS), various control programs, and application programs.

The post-processing apparatus 3 processes, by an arithmetic function of the CPU 101, e.g., a control program stored in the ROM 103 and an information processing program (or application program) loaded into the RAM 102 from a storage medium such as the HDD 104. Such processing configures a software controller including various functional modules of the post-processing apparatus 3. The software controller thus configured cooperates with hardware resources of the post-processing apparatus 3 to construct functional blocks that implement functions of the post-processing apparatus 3. In other words, the CPU 101, the RAM 102, the ROM 103, and the HDD 104 construct a controller 100 that controls the operation of the post-processing apparatus 3.

The I/F 105 is an interface that connects, to the common bus 109, the conveyance roller pairs 10, 11, 14, and 15, the switching claw 20, the side fences 24L and 24R, the contact-separation motor 32*d*, the crimper pivot motor 56, the liquid-applier movement motor 37, the liquid-applier pivot motor 563, the edge-binder movement motor 50, the stapling-part drive motor 62*d*, the stapler pivot motor 82, the stapling-unit moving motor 80, the liquid supply pump 55, the position sensor 40*a*, the first liquid-amount sensor 43*a*, the second liquid-amount sensor 52*a*, the standby position sensor 51, the encoder sensor 541, a control panel 110, a heater 181, a power switching relay 187, and a temperature sensor 188.

The controller 100 controls, via the I/F 105, the operations of the conveyance roller pairs 10, 11, 14, and 15, the switching claw 20, the side fences 24L and 24R, the contact-separation motor 32*d*, the crimper pivot motor 56, the liquid-applier movement motor 37, the liquid-applier pivot motor 563, the edge-binder movement motor 50, the stapling-part drive motor 62*d*, the stapler pivot motor 82, the stapling-unit moving motor 80, the liquid supply pump 55, the heater 181, and the power switching relay 187.

In addition, the controller 100 acquires detection results from the position sensor 40*a*, the first liquid-amount sensor 43*a*, the second liquid-amount sensor 52*a*, the standby position sensor 51, the encoder sensor 541, and the temperature sensor 188, and information input from the control panel.

FIG. 13 illustrates components related to the edge binder 25, which executes edge binding, and the stapling unit 155, but components related to the saddle binder 28 that executes saddle binding are omitted. Meanwhile, components related to the saddle binder 28 that executes saddle binding are also controlled by the controller 100.

As illustrated in FIG. 1, the image forming apparatus 2 includes the control panel 110. The control panel 110 includes an input unit that receives inputs from a user and a display serving as a notifier that notifies the user of information. Thus, the control panel 110 serves as an operation device. The input unit includes, for example, hard keys and a touch panel superimposed on the display. Then, the control panel 110 acquires information, such as information for specifying the operation mode of the post-processing apparatus 3, from the user through the input unit, and provides information to the user through the display. A specific example of the notifier is not limited to the display and may be a light emitting diode (LED) lamp or a speaker. The post-processing apparatus 3 may include a control panel 110 similar to the above-described control panel 110 of the image forming apparatus 2.

As described above, the post-processing apparatus 3 implements a function of performing operation control related to the liquid application by software (control programs) executed by the CPU 101 with hardware resources included in the controller 100.

A description is given of a binding process according to an embodiment of the present disclosure.

A description is given below of the binding process executed by the edge binder 25 included in the post-processing apparatus 3.

Figure 14:
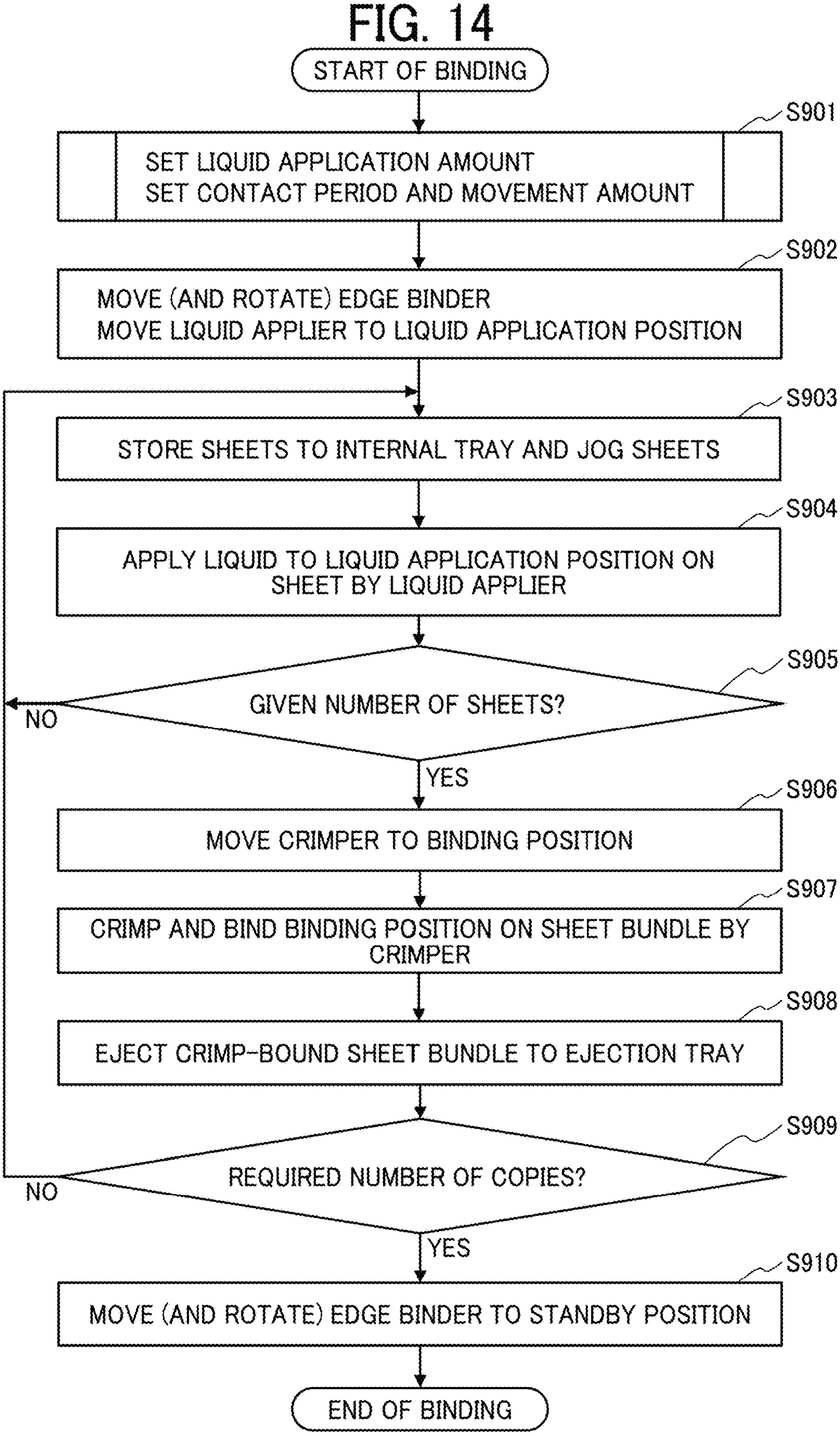
FIG. 14 is a flowchart of a binding process performed by the edge binder of FIG. 3.

FIG. 14 is a flowchart of an example binding process.

FIGS. 15A, 15B, 15C and 15D are diagrams illustrating the positions of the liquid applier 31 and the crimper 32 during the binding process.

Changes in the postures of the liquid applier 31 and the crimper 32 are omitted in FIGS. 15A to 15D. For example, the controller 100 starts the binding process illustrated in FIG. 14 when the controller 100 acquires an instruction to execute the binding process from the image forming apparatus 2. In the following description, the instruction to execute the binding process may be referred to as a "binding command."

The binding command includes the condition for the crimp binding performed by the crimper 32, which may be referred to as "binding condition" in the following description. Examples of the binding condition include, but are not limited to, the type of the sheet P (i.e., information affecting the spread of liquid, such as material and thickness), the number of sheets P of the sheet bundle Pb, the number of sheet bundles Pb to be bound, the binding position B (liquid application position B) in the main scanning direction, the binding posture of the edge binder 25, and an operation mode selected through the control panel 110. In the following description, the number of sheets P of the sheet bundle Pb may be referred to as "given number" whereas the number of sheet bundles Pb to be bound may be referred to as "requested number of copies." The liquid applier 31 and the crimper 32 are in the parallel binding posture and at the standby position HP1 as illustrated in FIG. 15A at the start of the binding process. As illustrated in FIG. 15A, the standby position HP1 is away in the width direction from the sheet P placed on the internal tray 22.

As illustrated in FIG. 14, in step S901, the controller 100 executes a process for setting the amount of liquid to be applied and a process for setting the contact time and the amount of movement. In the process for setting the amount of liquid to be applied, the amount of liquid to be applied to the liquid application position B illustrated in FIG. 15B is set. In the following description, the amount of liquid to be applied may be referred to simply as "liquid application amount." The process for setting the contact time and the amount of movement is a process for setting the time during which the leading end of the liquid application member 44 is in contact with the liquid application position B on the sheet P and the amount by which the liquid application member 44 in contact with the sheet P or the sheet bundle Pb further moves toward the sheet P or the sheet bundle Pb. In the following description, the time during which the leading end of the liquid application member 44 is in contact with the liquid application position B on the sheet P may be referred to simply as the "contact time" whereas the amount by which the liquid application member 44 in contact with the sheet P or the sheet bundle Pb further moves toward the sheet P or the sheet bundle Pb may be referred to simply as the "amount of movement." In a case where the liquid application member 44 is an elastic member, the "amount of movement" may also be ascertained as the amount of deformation of the liquid application member 44.

A detailed description is given later of the process for setting the amount of liquid to be applied with reference to FIG. 17. A detailed description is given later of the process for setting the contact time and the amount of movement with reference to FIG. 18.

When the posture that is specified by the binding command is the "oblique binding posture," in step S902, the controller 100 drives the crimper pivot motor 56 to rotate the liquid applier 31 and the crimper 32 of the edge binder 25 into the oblique binding posture. Alternatively, when the posture specified by the binding command is the "oblique binding posture," only the crimper 32 may be rotated to the oblique binding posture while the liquid applier 31 may not be rotated. In this case, the driving assembly may be simplified as compared with a case where both the liquid applier 31 and the crimper 32 are rotated, and thus effects of cost reduction, downsizing of the apparatus, and reduction of failure of the device are exhibited.

On the other hand, when the posture that is specified by the binding command is the "parallel binding posture," the controller 100 omits the aforementioned operation of rotating the liquid applier 31 and the crimper 32 of the edge binder 25 to the oblique binding posture. In step S902, the controller 100 also drives the edge-binder movement motor 50 to move the edge binder 25 in the main scanning direction so that the liquid applier 31 faces a liquid application position B1 specified by the binding command. Note that the controller 100 executes the operation of step S902 before a first sheet P is conveyed to the internal tray 22 by the conveyance roller pairs 10, 11, 14, and 15.

Subsequently, in step S903, the controller 100 rotates the conveyance roller pairs 10, 11, 14, and 15 to store, in the internal tray 22, the sheet P on which an image has been formed by the image forming apparatus 2. In step S903, the controller 100 also moves the side fences 24L and 24R to align the position, in the main scanning direction, of the sheet P placed on the internal tray 22. In short, the controller 100 performs so-called jogging.

Subsequently, in step S904, the controller 100 causes the liquid applier 31 positioned at the liquid application position B1 to execute the liquid application process on the sheet P, which has been placed on the internal tray 22 in the immediately preceding step S903. In other words, the controller 100 drives the liquid-applier movement motor 37 to bring the liquid application member 44 into contact with the liquid application position B on the sheet P placed on the internal tray 22 as illustrated in FIG. 15B.

Subsequently, in step S905, the controller 100 determines whether the number of sheets P accommodated in the internal tray 22 has reached the given number specified by the binding command. When the controller 100 determines that the number of sheets P accommodated in the internal tray 22 has not reached the given number (NO in step S905), the controller 100 executes the operations of steps S903 and S904 again. In other words, the controller 100 executes the operations of steps S903 and S904 each time the sheet P is conveyed to the internal tray 22 by the conveyance roller pairs 10, 11, 14, and 15. Note that the liquid applier 31 does not need to execute the liquid application process on all the sheets P of the sheet bundle Pb. For another example, the controller 100 may cause the liquid applier 31 to execute the liquid application process on the sheet P at intervals of one in every "n" sheets.

When the controller 100 determines that the number of sheets P accommodated in the internal tray 22 has reached the given number (YES in step S905), in step S906, the controller 100 drives the edge-binder movement motor 50 to move the edge binder 25 in the main scanning direction so that the crimper 32 faces the binding position B as illustrated in FIG. 15C.

Subsequently, in step S907, the controller 100 causes the crimper 32 to perform crimp binding on the sheet bundle Pb accommodated in the internal tray 22. In step S908, the controller 100 causes the conveyance roller pair 15 to output the sheet bundle Pb thus crimped and bound by the crimper 32 to the second output tray 26. Specifically, the controller 100 drives the contact-separation motor 32*d* to cause the upper crimping teeth 32*a* and the lower crimping teeth 32*b* to sandwich the binding position B on the sheet bundle Pb placed on the internal tray 22. The sheet bundle Pb is pressed and deformed between the upper crimping teeth 32*a* and the lower crimping teeth 32*b*. Thus, the crimper 32 crimps and binds the sheet bundle Pb. Thereafter, the controller 100 rotates the conveyance roller pair 15 to output the sheet bundle Pb thus crimped and bound to the second output tray 26.

Subsequently, in step S909, the controller 100 determines whether the number of sheet bundles Pb thus output has reached the requested number of copies specified by the binding command. When the controller 100 determines that the number of sheet bundles Pb thus output has not reached the requested number of copies (NO in step S909), the controller 100 executes the operations of step S903 and the following steps again. In other words, the controller 100 repeatedly performs the operations of steps S903 to S908 until the number of sheet bundles Pb output to the second output tray 26 reaches the requested number of copies (NO in step S909).

When determining that the number of sheet bundles Pb output to the second output tray 26 has reached the requested number of copies (YES in step S909), the controller 100 drives the edge-binder movement motor 50 to move the edge binder 25 to the standby position HP1 in step S910, as illustrated in FIG. 15D. When the posture specified by the binding command is the "oblique binding posture", the controller 100 drives the crimper pivot motor 56 to rotate the liquid applier 31 and the crimper 32 in such a way as to achieve the parallel binding posture in step S910. Meanwhile, when the posture specified by the binding command is the "parallel binding posture", operation of rotating the liquid applier 31 and the crimper 32 to the parallel binding posture is omitted. As a result, the liquid applier 31 and the crimper 32 return to the standby position HP1 in FIG. 15D. In steps S902 and S910, movement of the liquid applier 31 and the crimper 32 in the main scanning direction and rotation of the liquid applier 31 and the crimper 32 in the forward and reverse directions need not be performed in the above-described order, and may be performed in reverse order.

Embodiment of Processing Operation According to Present Disclosure

A description is given of an embodiment of a characteristic processing operation to be performed in the liquid applier 31 included in the post-processing apparatus 3 according to the present disclosure.

Figure 16A:
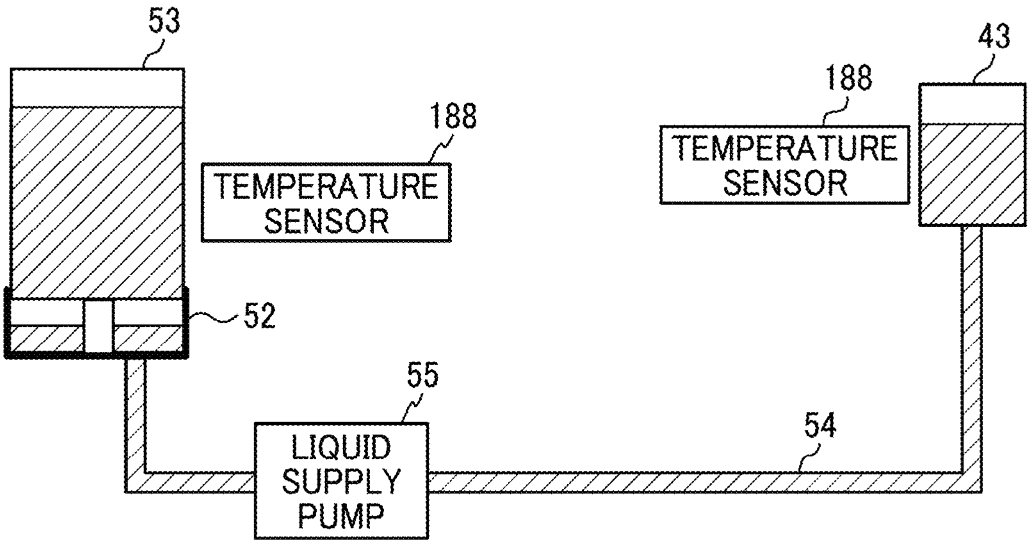
FIGS. 16A and 16B are diagrams for describing how liquid moves in a liquid temperature restricting mode in the post-processing apparatus.
Figure 16B:
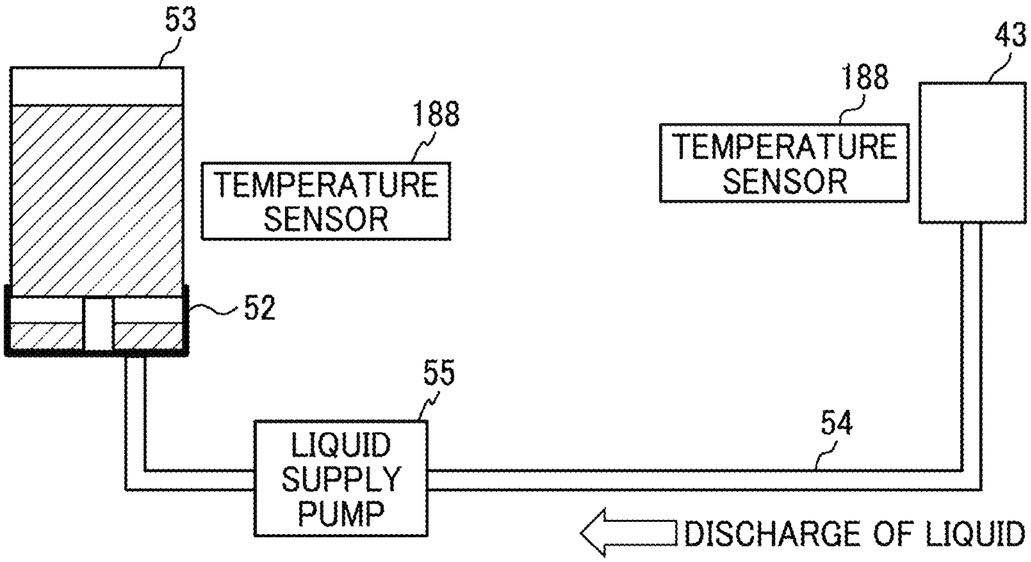

As illustrated in FIGS. 16A and 16B, the first liquid-storage tank 43 and the second liquid-storage tank 53 provided in the liquid applier 31 according to the present embodiment communicate with each other via the second liquid supplier 54. The liquid stored in the second liquid-storage tank 53 is allowed to move to the first liquid-storage tank 43 via the second liquid supplier 54. The movement of the liquid is implemented by the liquid supply pump 55. The movement of the liquid from the second liquid-storage tank 53 to the first liquid-storage tank 43 is defined as "forward feeding", and the movement of the liquid from the first liquid-storage tank 43 to the second liquid-storage tank 53 is defined as "reverse feeding". A controller to be described below controls the operation of the forward feeding or the reverse feeding to be performed by the liquid supply pump 55.

The description given above with reference to FIG. 4 is based on the assumption that the liquid supply pump 55 is attached to the main-body side plate 72 of the post-processing apparatus 3 together with the second-liquid-storage-tank fixer 52. FIGS. 16A and 16B, from which the second-liquid-storage-tank fixer 52 is omitted, illustrate an example in which the second-liquid-storage-tank fixer 52 is disposed in a tube forming the second liquid supplier 54. The position where the liquid supply pump is disposed is not limited as long as the liquid supply pump can move the liquid.

Hereinafter, a description will be given of a "liquid temperature restricting mode" which is one of operation modes of the post-processing apparatus 3. The liquid temperature restricting mode is set when the liquid applier 31 is operated under an environment in which temperature is low enough to cause the liquid to freeze due to the effect of the temperature of the use environment of the post-processing apparatus 3 including the liquid applier 31.

The liquid temperature restricting mode is one of the operation modes of the post-processing apparatus 3. The liquid temperature restricting mode is enabled or disabled by, for example, a user operation on the control panel 110.

As described above, to supply the liquid from the first second liquid storage to the second first liquid storage and from the second first liquid storage to the first second liquid storage, the liquid applier 31 has a configuration for holding liquid such that the liquid is movable between the first liquid-storage tank 43 serving as a main tank and the second liquid-storage tank 53 serving as a sub tank. In a case where it is predicted that the configuration of a temperature restrictor that enables the liquid to move between the first liquid-storage tank 43 and the second liquid-storage tank 53 may cause a decrease in liquid temperature due to the effect of use environment temperature, a liquid temperature decrease coping process is performed in the liquid temperature restricting mode so that the liquid temperature does not decrease to freezing temperature.

The liquid applier 31 according to the present embodiment controls the temperature restrictor including the first liquid-storage tank 43, the second liquid-storage tank 53, the second liquid supplier 54, and the liquid supply pump 55 so as to cope with a disadvantage to be caused by a decrease in the temperature of the liquid to be applied. Thus, the process of maintaining the state of the liquid can be implemented. In other words, as a result of controlling the operation based on the above configuration, the process of shifting the liquid can be implemented to a state (position) where freezing of the liquid is prevented. In other words, as a result of controlling the operation of the liquid supply pump 55, a liquid movement process corresponding to a process for coping with a decrease in liquid temperature is implemented as a process to be implemented by a controller to be described below.

Hereinafter, an example of the liquid temperature decrease coping process to be performed in the liquid applier 31 in which the liquid temperature restricting mode has been enabled will be described with reference to the drawings.

FIGS. 16A and 16B are diagrams illustrating an example of a process to be performed when the liquid temperature restricting mode is active.

First, a description is given of a process of moving liquid remaining in the first liquid-storage tank 43, the second liquid-storage tank 53, and the second liquid supplier 54 under a low-temperature environment where the liquid may be frozen.

As described above, when liquid application is performed in the binding process, the liquid applier 31 is used. At this time, liquid stored in the second liquid-storage tank 53 is fed (supplied) to the first liquid-storage tank 43, and the liquid is applied from the first liquid-storage tank 43 to a binding region. The amount of liquid (liquid amount) to be consumed for applying the liquid in a single binding operation is very small.

In other words, it is assumed that liquid supplied at the start of a binding operation often remains in the first liquid-storage tank 43 at the end of a series of binding operations. In this case, in order to prevent freezing of the liquid remaining in the first liquid-storage tank 43 when the environmental temperature in the installation environment (use environment) of the post-processing apparatus 3 is low, it is desirable to empty the first liquid-storage tank 43. For this purpose, it is desirable to move the residual liquid in the first liquid-storage tank 43 to the second liquid-storage tank 53. In other words, it is desirable to discharge the residual liquid in the first liquid-storage tank 43 toward the second liquid-storage tank 53.

In addition, when the temperature of the use environment of the post-processing apparatus 3 including the liquid applier 31 is expected to decrease to the freezing temperature of the liquid, it is necessary to discharge not only the residual liquid in the first liquid-storage tank 43 but also liquid remaining in the second liquid supplier 54. This is because the second liquid supplier 54 extends in an elongated range inside the post-processing apparatus 3 and thus, the liquid remaining in the second liquid supplier 54 is considered to be more likely to freeze than the residual liquid in the first liquid-storage tank 43.

In a case where the liquid remaining in the second liquid supplier 54 freezes, the liquid cannot be fed. In addition, there may be a risk of breakage or damage of the second liquid supplier 54. Damage of the second liquid supplier 54 may cause liquid leakage on a liquid feeding path, leading to a failure in the binding process involving liquid application. Furthermore, liquid leakage from the second liquid supplier 54 due to freezing may also cause a failure due to an electrical short circuit of electronic components included in the post-processing apparatus 3. Thus, such liquid leakage needs to be avoided as much as possible.

For this reason, when there is a possibility that the residual liquid may be frozen at the time when the binding operation involving liquid application ends or during the interval between the end of the binding operation and the start of the next binding operation, it is desirable to prevent the freezing by operating the liquid supply pump 55 to discharge the residual liquid. In other words, in a case where the liquid temperature restricting mode is active, liquid is discharged so that the liquid remains in neither the second liquid-storage tank 53 nor the second liquid supplier 54 extending from the second liquid-storage tank 53 to the first liquid-storage tank 43 when the binding operation involving liquid application ends or when the binding operation involving liquid application is not resumed even after the elapse of a predetermined period of time from the end of the binding operation. In this way, the risk of freezing of the residual liquid under the low-temperature environment can be reduced.

In addition to reduction of the risk of freezing, this also achieves reduction of power consumption by limiting the range of heating performed by the heater 181 to be described below.

The movement of liquid from the first liquid-storage tank 43 to the second liquid-storage tank 53, in other words, a discharge process of discharging the liquid from the second liquid-storage tank 53 and the second liquid supplier 54 may be performed at a plurality of timings. The flows of the discharge process to be performed at the plurality of timings will be described below with reference to flowcharts illustrated in FIGS. 17 to 19.

Figure 17:
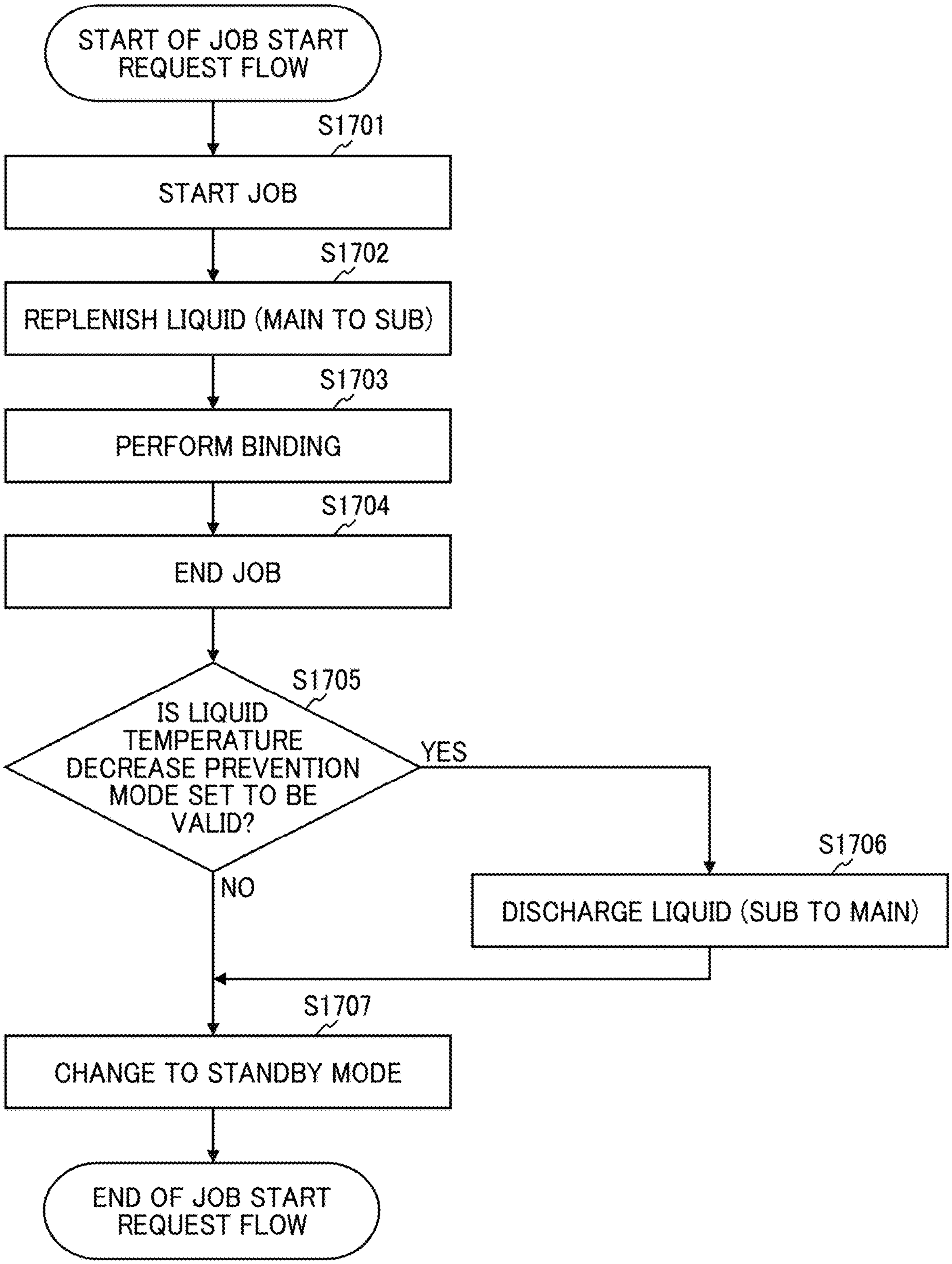
FIG. 17 is a flowchart of a first processing example in the liquid temperature restricting mode.

FIG. 17 is a flowchart for describing the discharge process of discharging residual liquid at the time of completion of crimp binding for the sheet bundle Pb when the liquid temperature restricting mode is active. Since the operations of steps S1701 to S1704 is similar to the binding process described with reference to FIG. 14 (steps S901 to S910), a description thereof is omitted.

After the end of the job of the binding process involving liquid application in step S1704, it is determined, in step S1705, whether the "liquid temperature restricting mode" has been enabled as the operation mode. When the liquid temperature restricting mode is inactive (NO in step S1705), the post-processing apparatus 3 shifts to a standby state in step S1707. When the liquid temperature restricting mode is active (YES in step S1705), the liquid discharge process of moving liquid from the first liquid-storage tank 43, which is the sub tank, to the second liquid-storage tank 53, which is the main tank, is performed in step S1706.

The controller 100 operates the liquid supply pump 55 to reversely feed the liquid. Thus, step S1706 is performed.

Discharging the liquid from the second liquid-storage tank 53 every time the job of the binding process is finished will minimize a period during which the liquid remains in the first liquid-storage tank 43. Meanwhile, it is necessary to resume supply of the liquid to the first liquid-storage tank 43 with no residual liquid therein every time the job of the binding process involving liquid application is started. Thus, waiting time until the start of the job increases.

Figure 18:
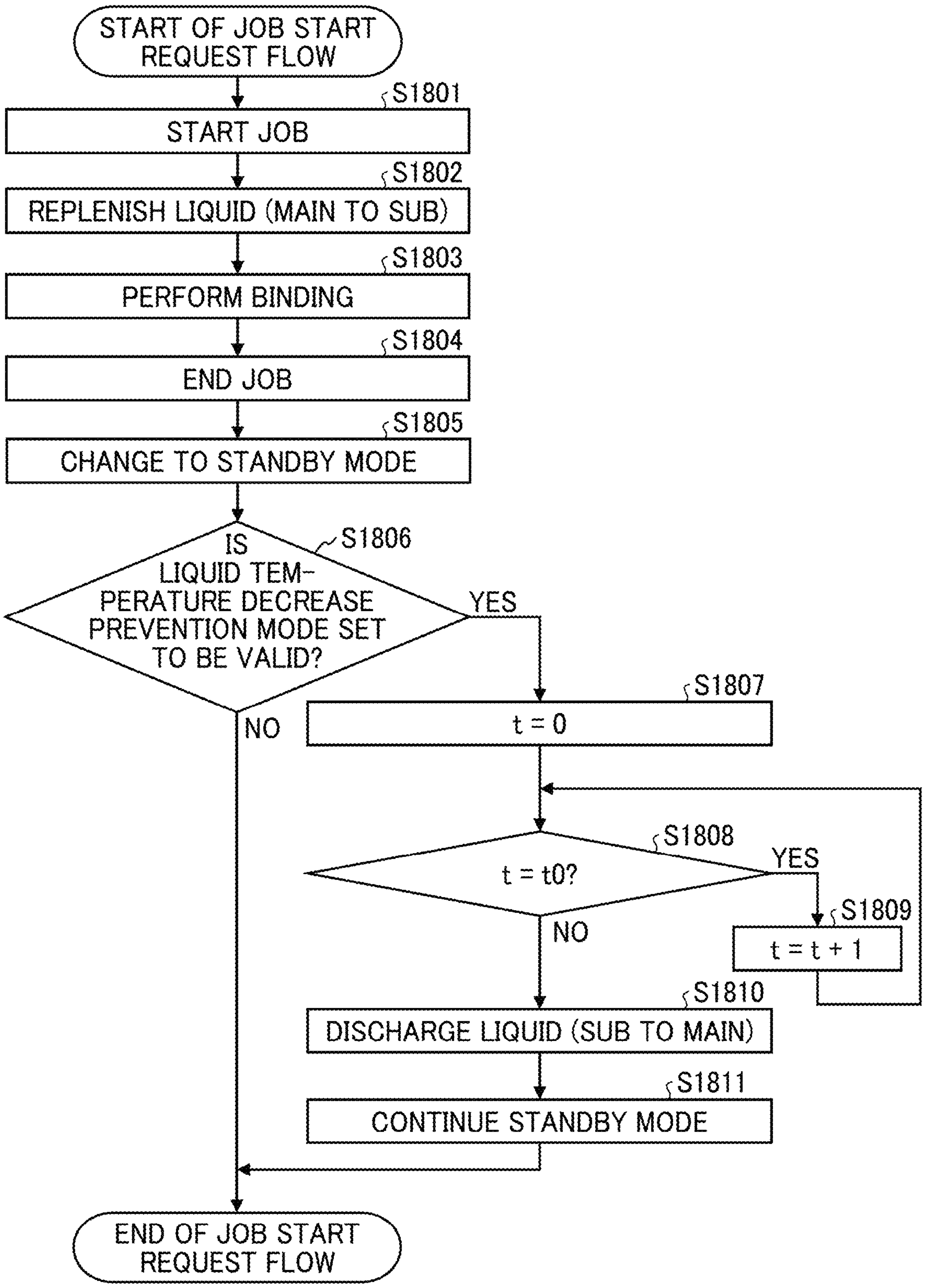
FIG. 18 is a flowchart of a second processing example in the liquid temperature restricting mode.

With reference to FIG. 18, a description is given of a residual liquid discharge process that is performed when a certain period of time elapses after the post-processing apparatus 3 enters the standby state after the end of crimp binding for the sheet bundle Pb while the liquid temperature restricting mode is active.

First, a job involving liquid application is started in step S1801. Next, the liquid is supplied from the second liquid-storage tank 53 to the first liquid-storage tank 43 in step S1802. Subsequently, binding operation involving liquid application is performed in step S1803, and when a predetermined binding operation ends in step S1804, the post-processing apparatus 3 shifts to a standby state in step S1805.

After shifting to the standby state, it is determined, in step S1806, whether the "liquid temperature restricting mode" has been enabled as the operation mode. When the liquid temperature restricting mode is inactive (NO in step S1806), the liquid movement process ends which is performed when start of the job is requested after the end of the crimp binding.

When the liquid temperature restricting mode is active (YES in step S1806), a timer (t) for measuring a standby time is initialized and measurement is started in step S1807. In step S1808, it is determined whether the timer (t) is greater than or equal to a predetermined threshold time (t0). When the timer (t) is not greater than or equal to the threshold time (t0) (NO in step S1808), the standby state continues and the timer (t) is updated in step S1809.

When the timer (t) is greater than or equal to the predetermined threshold time (t0) (YES in step S1808), a liquid discharge process of discharging residual liquid in the first liquid-storage tank 43 to the second liquid-storage tank 53 is performed in step S1810.

The controller 100 operates the liquid supply pump 55 to reversely feed the liquid. Thus, step S1810 is performed.

After completion of the liquid discharge process, the standby state is continued, and the liquid movement process ends which is performed when start of the job is requested after the end of the crimp binding.

In a case where the standby time after the end of the binding process job does not exceed the threshold time (t0), the discharge process of discharging the residual liquid from the first liquid-storage tank 43 is not performed. Thus, there is a trade-off between the effect of taking measures related to liquid temperature and increase in the waiting time during execution of the binding process job. Therefore, automatic switching may be performed on the basis of user designation made from an operation unit of the control panel 110 or a result of detection by a temperature sensor.

Then, with reference to FIG. 19, a residual liquid discharge process will be described which is performed when a stop request is issued to the post-processing apparatus 3 while the liquid temperature restricting mode is active.

In a case where the controller 100 complies with the stop request when the liquid temperature restricting mode is active (YES in step S1901), the liquid discharge process of discharging the residual liquid in the first liquid-storage tank 43 to the second liquid-storage tank 53 is performed in step S1902.

When the liquid temperature restricting mode is inactive (NO in step S1901), the stop request is met in step S1903 without execution of the liquid discharge process of discharging the residual liquid in the first liquid-storage tank 43 to the second liquid-storage tank 53. The post-processing apparatus 3 shifts to a nonoperating state or an energy saving mode in step S1904. The stop request corresponds to a request for a shutdown for stopping the operation of the post-processing apparatus 3 or a request for shifting to the energy saving mode.

When the stop request is made, whether the liquid temperature restricting mode is active or inactive is determined to perform the discharge process of discharging the residual liquid from the first liquid-storage tank 43. However, the discharge process is not performed while the post-processing apparatus 3 is in operation. Thus, the discharge process is a process that is performed in a limited manner in a time zone in which the post-processing apparatus 3 is not used, such as at night.

Example of Installation of Heater

A description is now given of an example of installation of the heater 181 that maintains the temperature of liquid held in the liquid applier 31, with reference to FIGS. 20A to 21C as a countermeasure against low liquid temperature (freezing prevention measure).

Figure 20A:
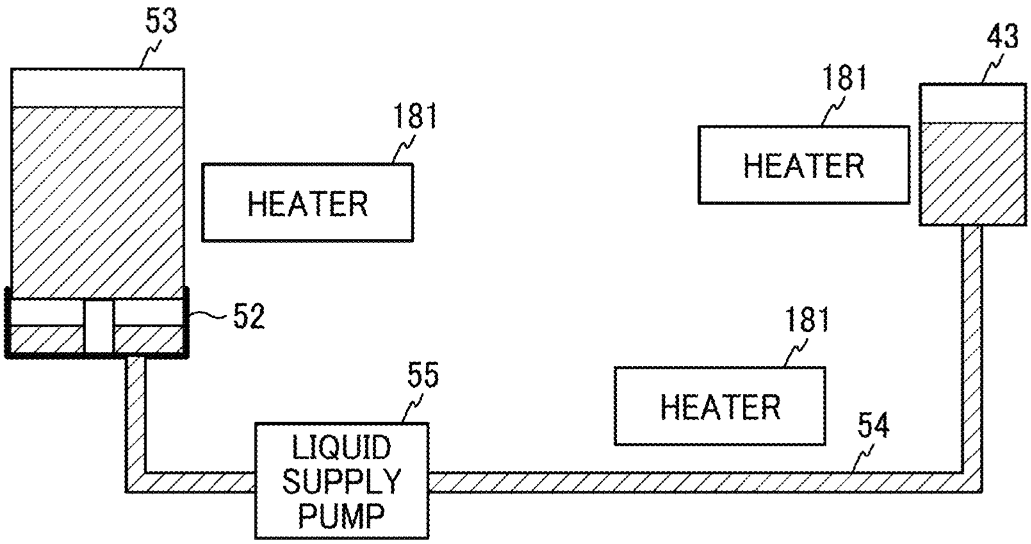
FIGS. 20A and 20B are diagrams for describing the mode of installation of a heater in the post-processing apparatus.
Figure 20B:
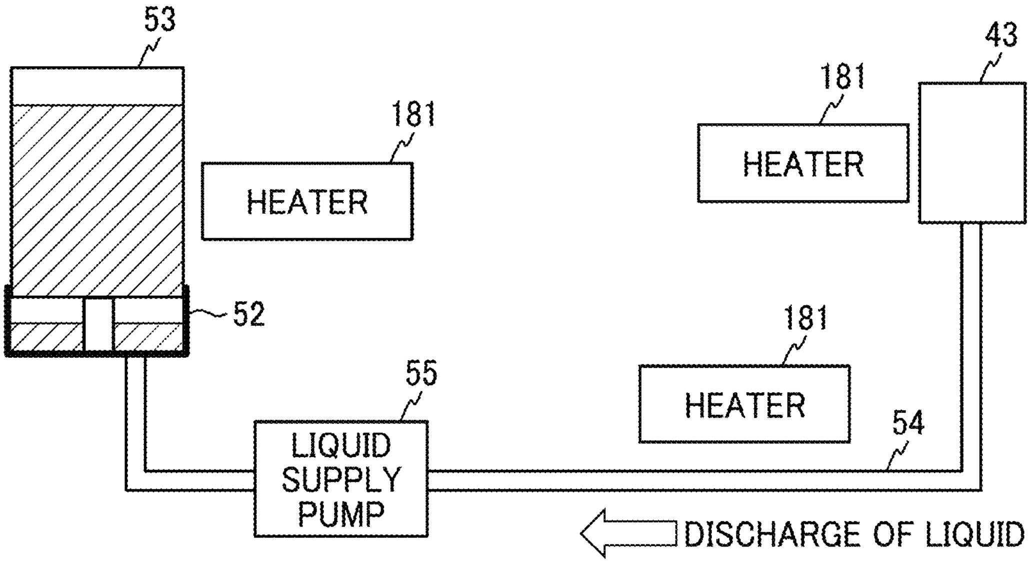
Figure 21A:
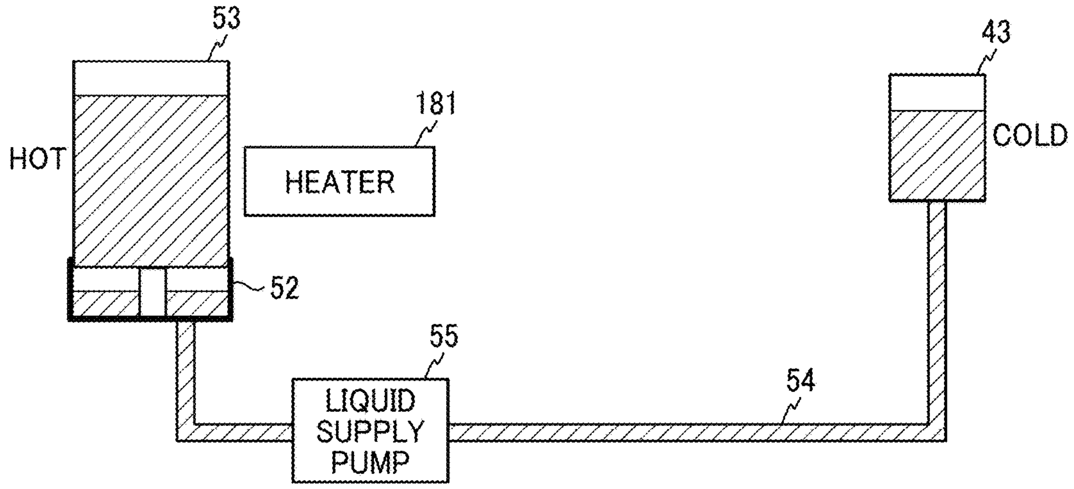
FIGS. 21A, 21B and 21C are diagrams for describing how liquid circulation is controlled in the liquid temperature restricting mode.
Figure 21B:
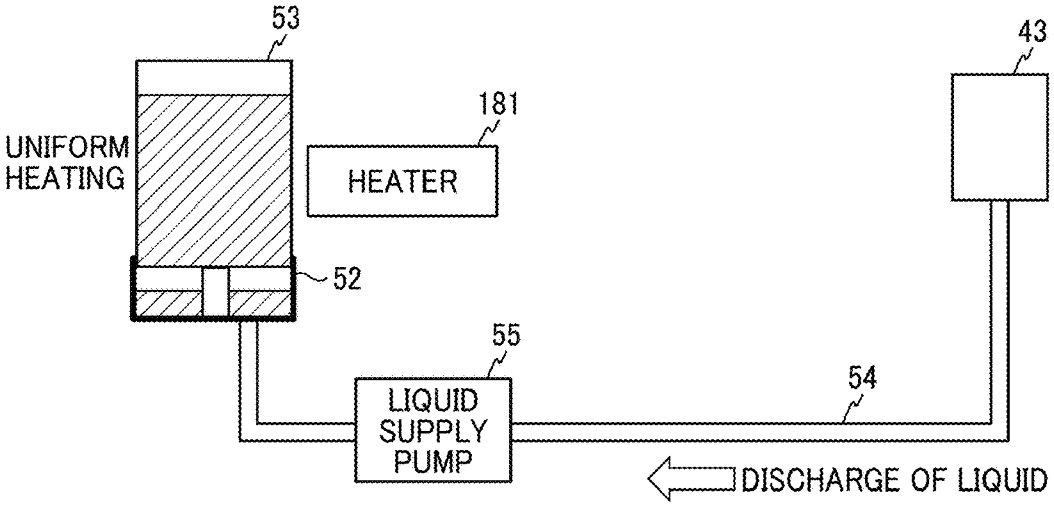
Figure 21C:
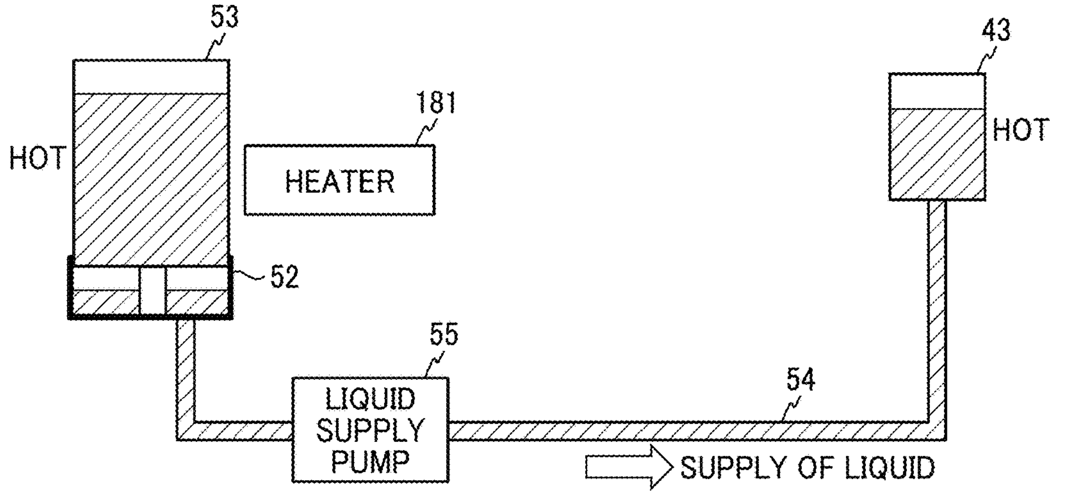

For example, as illustrated in FIGS. 20A and 20B, the heater 181 is installed for both the first liquid-storage tank 43 and the second liquid-storage tank 53, and is also installed for the second liquid supplier 54. Alternatively, as illustrated in FIGS. 21A, 21B and 21C, the heater 181 is installed only for the second liquid-storage tank 53 from which liquid is discharged.

As already described, the second liquid-storage tank 53 is installed near the surface of the post-processing apparatus 3 so as to allow the user to remove the second liquid-storage tank 53 and replenish the second liquid-storage tank 53 with liquid. The first liquid-storage tank 43 is installed inside the post-processing apparatus 3 so as to supply liquid to the liquid applier 31.

The second liquid supplier 54 is installed so as to cover a wide range such that the second liquid-storage tank 53 and the first liquid-storage tank 43 communicate with each other. Therefore, in a case where the heater 181 is also installed for the second liquid supplier 54, it is necessary to install the heater in such a way as to cover the installation range of the second liquid supplier 54. Thus, there is a concern that the installation range of the heater 181 is also widened.

Figure 19:
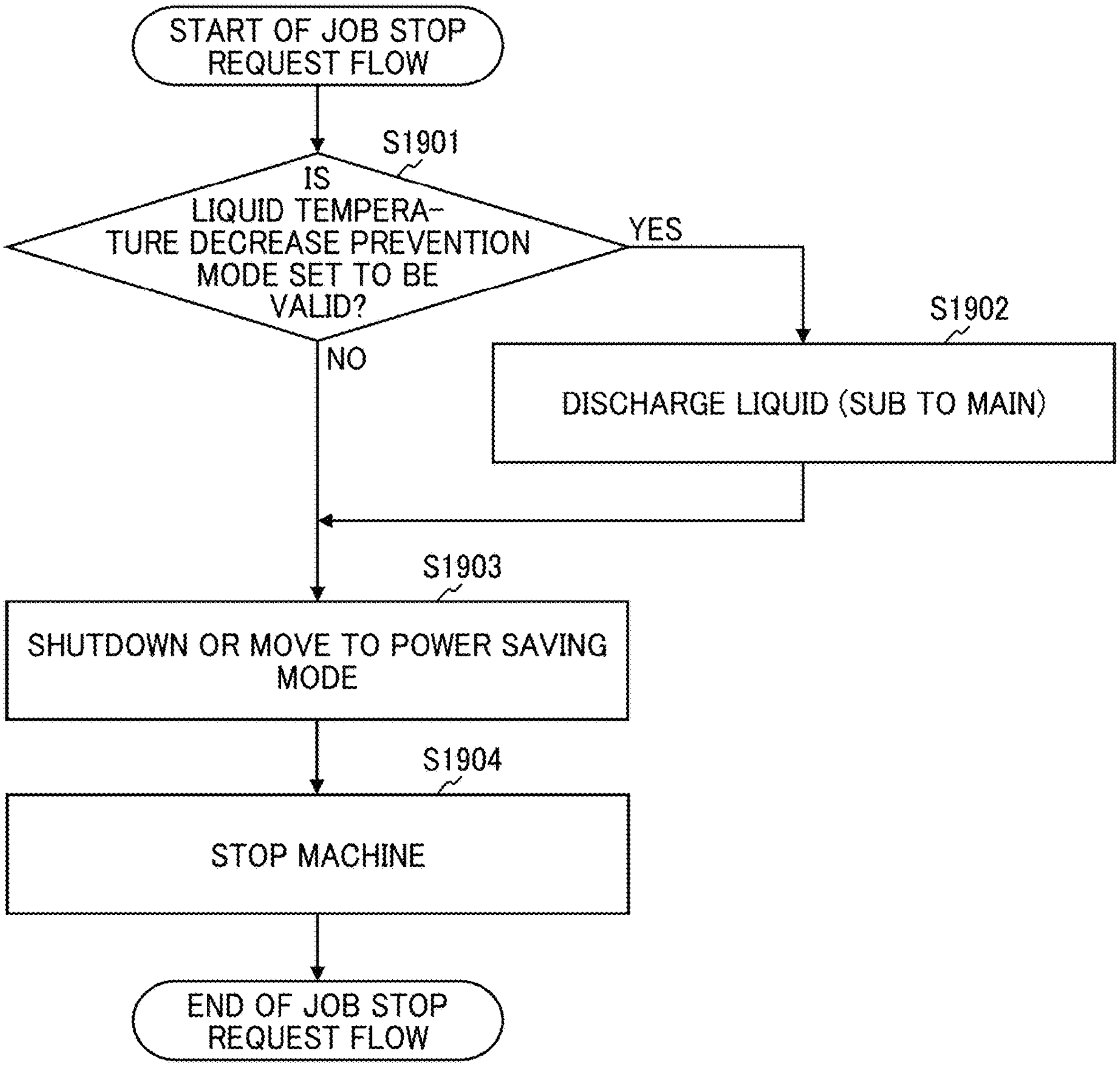
FIG. 19 is a flowchart of a third processing example in the liquid temperature restricting mode.

In a case where the liquid discharge process (the process of discharging the residual liquid in the first liquid-storage tank 43 to the second liquid-storage tank 53) described with reference to FIGS. 17 to 19 is performed, there is no residual liquid in the first liquid-storage tank 43 and the second liquid supplier 54 except for a limited period such as a period in which the binding process is performed. Therefore, the heater 181 for preventing the freezing of residual liquid is installed in the vicinity of the second liquid-storage tank 53 so as to cover a range of the liquid to be heated.

In other words, by limiting the installation position of the heater 181 to the vicinity of the second liquid-storage tank 53, the number of heaters 181 to be installed can be reduced, and the installation space, installation cost, and power consumption can be reduced.

If the number of heaters 181 to be installed is increased so as to include the first liquid-storage tank 43 and the second liquid supplier 54 in the heating range of the heater 181, the power consumption can be reduced by separately controlling the turning on of the heaters 181. This is significantly effective in a case where it is necessary to constantly heat liquid so as to prevent the liquid from being frozen at night.

Circulation Control of Residual Liquid

A description is now given of a control process of causing residual liquid to move between the first liquid-storage tank 43 and the second liquid-storage tank 53 to maintain (heat) the temperature of the liquid in the first liquid-storage tank 43, with reference to FIGS. 21A, 21B and 21C.

As illustrated in FIG. 21A, in a case where the heater 181 is installed only in the vicinity of the second liquid-storage tank 53, there is a concern that when the temperature of the use environment of the post-processing apparatus 3 is low (when it is cold), the temperature of liquid in the second liquid supplier 54 or the first liquid-storage tank 43 may decrease during the job operation of the binding process involving liquid application. In particular, there is a concern about decrease in liquid temperature immediately after the power is turned on in the morning.

For this reason, when execution of the binding process involving liquid application continues for a certain period of time, in other words, when, for example, many copies are generated in the binding process and thus, a job is performed in which the liquid applier 31 continues to operate for a long time, the job is temporarily stopped after the elapse of a certain period of time, and the liquid is returned from the first liquid-storage tank 43 to the second liquid-storage tank 53 as illustrated in FIG. 21B. Thus, the liquid is mixed with liquid heated by the heater 181 installed in the vicinity of the second liquid-storage tank 53. Thereafter, as illustrated in FIG. 21C, the liquid is supplied from the second liquid-storage tank 53 to the first liquid-storage tank 43. As a result, the temperature of the liquid in the first liquid-storage tank 43 can be raised.

For example, the temperature of the liquid stored in the first liquid-storage tank 43 is measured by use of the temperature sensor 188 as illustrated in FIGS. 16A and 16B, and the controller 100 determines whether the liquid temperature is suitable for applying the liquid. Thus, the above-described control can be performed.

The temperature sensor 188 may be installed for both the first liquid-storage tank 43 and the second liquid-storage tank 53, or may be installed only for the second liquid-storage tank 53.

For example, even in a case where the temperature sensor 188 is installed only for the second liquid-storage tank 53, a process of circulating and mixing liquid heated in the second liquid-storage tank 53 and low-temperature liquid in the first liquid-storage tank 43 is performed at regular intervals when the temperature of the liquid in the first liquid-storage tank 43 is lower than a predetermined temperature. Therefore, it is only necessary to measure the temperature of liquid in the second liquid-storage tank 53.

Operation Control for Heater

Figure 22:
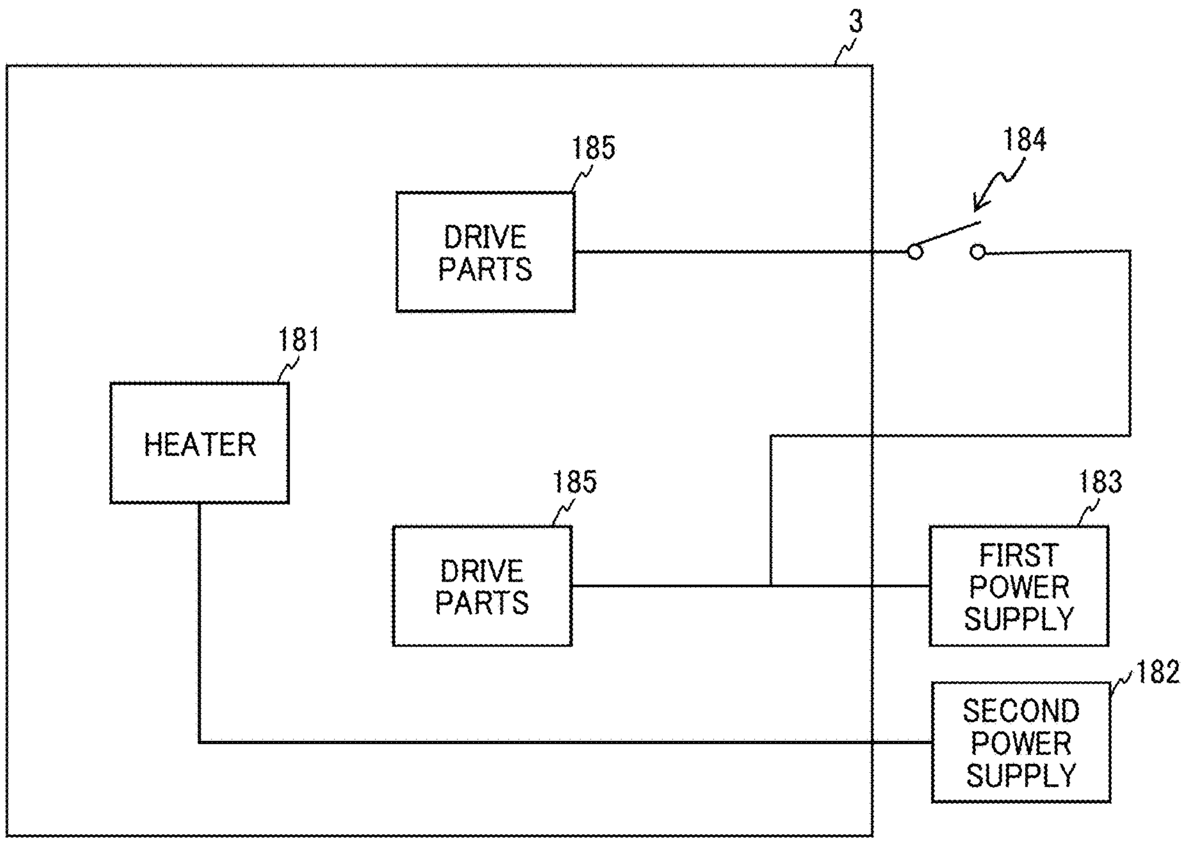
FIG. 22 is a diagram illustrating an exemplary configuration of power supply to the heater in the post-processing apparatus.

A description is now given of an embodiment of a power supply configuration for controlling a heating process performed by the heater 181, with reference to FIG. 22.

When there is a concern about freezing of liquid in a low-temperature environment, freezing is most likely to occur at night. In particular, freezing is considered to be most likely to occur while the power to the post-processing apparatus 3 is shut off (in an OFF state).

In order to cause the heater 181 to function as an anti-freezing heater, it is necessary to enable the heater 181 to perform heating when the post-processing apparatus 3 is not used. Therefore, a power supply to the heater 181 is desirably provided as a second power supply 182 connected to a power line different from the power line of a device main power supply 183 serving as a power supply to a drive component 185 and the like.

In addition, in a case where an interlocking mechanism 184 is provided which is interlocked with the opening and closing of a part of a housing (device cover) of the post-processing apparatus 3, the second power supply 182 is preferably a power supply connected to a power line also different from a power line to the interlocking mechanism 184 so as to enable heating when work such as device maintenance for fixing paper jam is performed while the interlocking mechanism 184 is in an open state or when the interlocking mechanism 184 is unintentionally put in the open state while the device main power supply is off.

Accordingly, the second power supply 182 is not electrically interrupted by turning on and off of the device main power supply 183 or opening and closing of the part of the housing (device cover) of the post-processing apparatus 3.

Figure 23A:
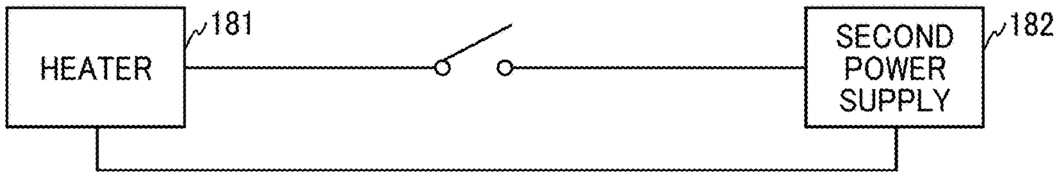
FIGS. 23A and 23B are diagrams illustrating another exemplary configuration of power supply to the heater in the post-processing apparatus.
Figure 23B:
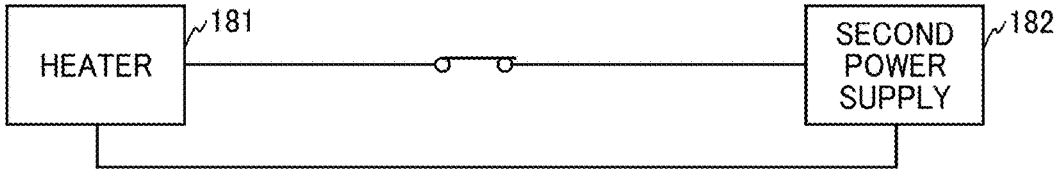

In addition, as illustrated in FIG. 22, in a case where the power is supplied to the heater 181 by the second power supply 182 connected to the power line different from the power line of the device main power supply 183, it is desirable that the user can forcibly turn off the power supply when it can be determined that the power supply to the heater 181 is not necessary. Therefore, a physical switch 186 may be provided in a power supply path to the heater 181 as illustrated in FIGS. 23A and 23B.

For example, when the post-processing apparatus 3 is in operation, the heater 181 is turned on for use due to concerns about a decrease in binding force to be caused by a decrease in liquid temperature. Meanwhile, the heater 181 is turned off when the heater 181 does not need to constantly be in an ON state while the post-processing apparatus 3 is not in operation since nighttime temperature is not low enough to cause liquid to freeze, or when the user does not frequently use the post-processing apparatus 3 and thus, a period of cessation of operation is long. As a result, while reducing unnecessary power consumption, the control of the heater 181 suitable for a surrounding environment and a state in which the post-processing apparatus 3 is used by the user can be selected.

Figure 24:
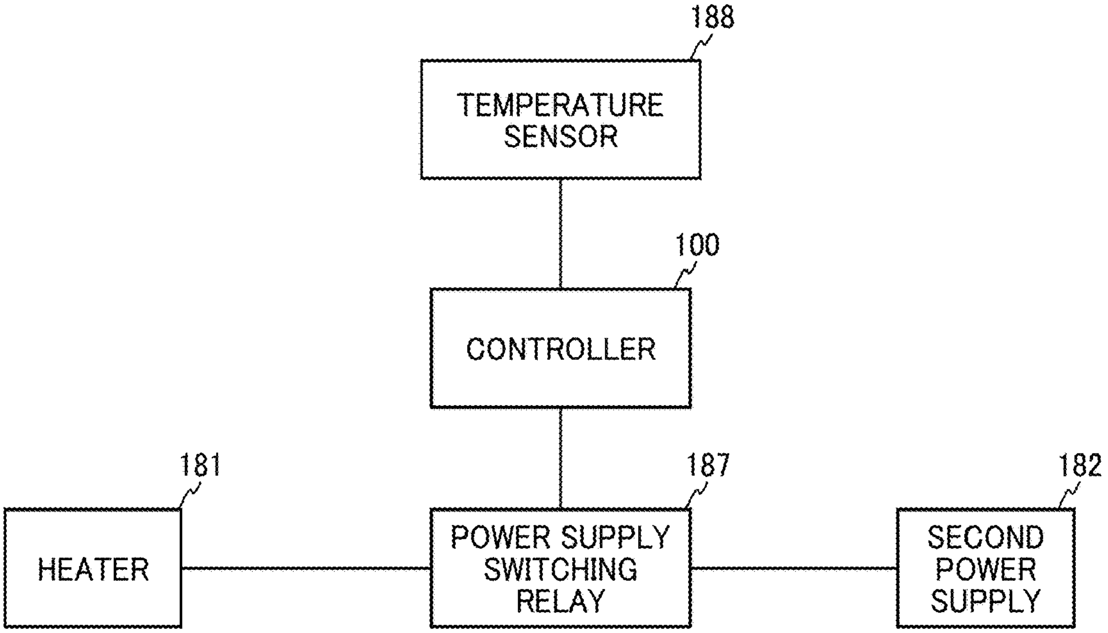
FIG. 24 is a diagram illustrating still another exemplary configuration of power supply to the heater in the post-processing apparatus.

The controller 100 may control the turn-on operation of the heater 181. For example, as illustrated in FIG. 24, the controller 100 determines the operating state of the post-processing apparatus 3, and controls the operation of the power switching relay 187 in the liquid temperature restricting mode based on information on a temperature detected by a temperature detection sensor (temperature sensor 188). The power switching relay 187 serving as a switching mechanism performs on-off control of power supply to the heater 181 from the second power supply 182 (performs control as to whether to supply power) in accordance with at least one of the application state of the liquid temperature restricting mode and a result of a temperature detection of the heater 181 by the temperature sensor 188. In this manner, the operation of the heater 181 can be controlled according to the application state of the liquid temperature restricting mode and the temperature of the use environment.

For example, even when the liquid temperature restricting mode is ON in a period where there is a concern about the freezing of liquid, such as at night, power supply from the second power supply 182 is turned off in a case where it can be determined that heating by the heater 181 is not necessary since the room temperature is sufficiently controlled by air conditioning or the like during the operation of the post-processing apparatus 3 and thus, there is no need for concern about the freezing of liquid. In addition, in a case where the heater 181 is also installed in the vicinity of the first liquid-storage tank 43, the power supply from the second power supply 182 is also turned off after completion of the job including the binding process and discharge of the liquid from the first liquid-storage tank 43. As described above, the operation of the power switching relay 187 is controlled to cut off power supply to the heater 181 at the timing when the power supply from the second power supply 182 to the heater 181 becomes unnecessary. Thus, unnecessary power consumption can be reduced.

Examples of the control of the heater 181 include the following control.

First Control Example

When the liquid temperature restricting mode is OFF, the heater 181 is turned off.

Second Control Example

The heater turn-on duty of the heater 181 is changed depending on whether the temperature inside the post-processing apparatus 3 (the temperature of liquid in the tank or the ambient temperature thereof) is equal to or higher than n2° C. or lower than n2° C. The threshold n2° C. is 0° C. or a temperature close thereto. In a state where liquid has not been frozen (heating for prevention of freezing), the output of the heater 181 may be lowered to slightly heat liquid.

The threshold n2° C. for changing the heater turn-on duty may be a single threshold. Alternatively, a plurality of thresholds may be provided as the threshold n2° C. For example, when the temperature is 10° C. or higher, the heater is turned off, and when the temperature is between 10° C. and 5° C., the heater turn-on duty is set to 30%. In addition, the heater turn-on duty is set to 50% at a temperature between 5° C. and 0° C. When the temperature is lower than 0° C., the heater turn-on duty is set to 100%. In this manner, temperature ranges may be provided so as to adjust overheating effect and power consumption.

Third Control Example

The heater 181 is turned off when the internal temperature of the post-processing apparatus 3 is equal to or lower than a certain value and the following two conditions are satisfied: "operation of water supply-discharge from the first liquid-storage tank 43 has been completed within a certain period of time" (first condition) and "the external temperature is higher than the internal temperature by n1° C. or more" (second condition). This is because the external temperature is high and thus, there is no possibility that the internal temperature further decreases from the current temperature to cause freezing.

First Embodiment of Heater Turn-on Control

Next, a description will be given of the flow of a heater turn-on control process to be performed in a case where two temperature thresholds are provided in the "first control example" and the "second control example" described above.

Figure 25:
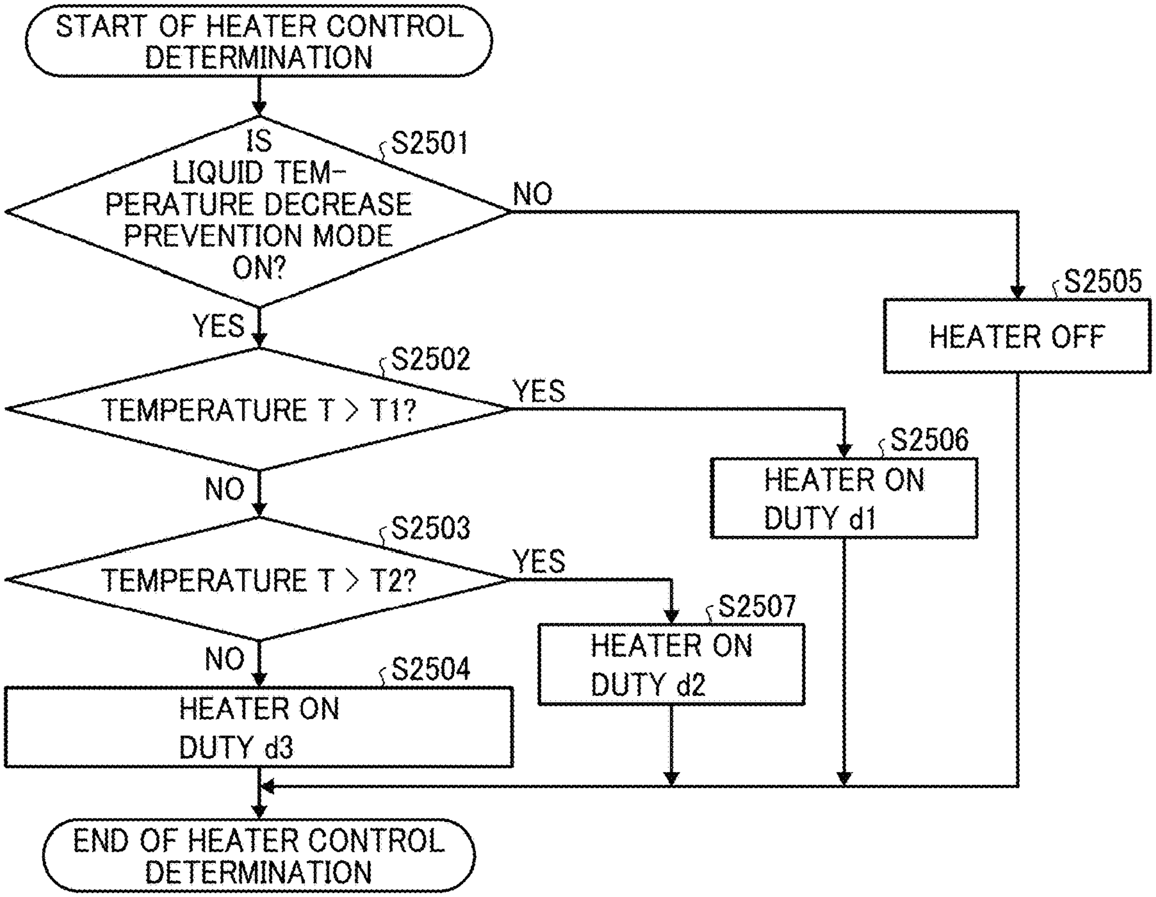
FIG. 25 is a flowchart of an example of a heater control process in the liquid temperature restricting mode.

For example, as illustrated in FIG. 25, when the "liquid temperature restricting mode" is inactive (NO in step S2501), the heater 181 is not turned on, and the process ends in step S2505.

When the "liquid temperature restricting mode" is active (YES in step S2501), it is determined whether an ambient temperature T in the use environment of the post-processing apparatus 3 is higher than a predetermined first temperature threshold T1 in step S2502. When the ambient temperature T is higher than the first temperature threshold T1 (YES in step S2502), the controller 100 turns on the heater 181 in step S2506. The heater turn-on duty is "d1" at this time.

When the "liquid temperature restricting mode" is active (YES in step S2501) and the ambient temperature T is not higher than the first temperature threshold T1 (NO in step S2502), it is determined whether the ambient temperature is higher than a second temperature threshold T2 in step S2503. When the ambient temperature is higher than the second temperature threshold T2 (YES in step S2503), the controller 100 turns on the heater 181 in step S2507. The heater turn-on duty is "d2" at this time.

When the "liquid temperature restricting mode" is active (YES in step S2501), the ambient temperature T is not higher than the first temperature threshold T1 (NO in step S2502), and the ambient temperature is not higher than the second temperature threshold T2 (NO in step S2503), the controller 100 turns on the heater 181 in step S2504. The heater turn-on duty is "d3" at this time.

As described above, in the liquid temperature restricting mode, the heater turn-on duty is changed to turn on the heater 181 based on a comparison between the ambient temperature of the post-processing apparatus 3 and the predetermined threshold temperatures. As a result, the power consumption can be reduced while maintaining the temperature of the liquid according to the ambient temperature.

In the description of the above process, the following holds: first temperature threshold T1>second temperature threshold T2. The following holds for the heater turn-on duty: "d1<d2<d3". In other words, the heater turn-on duty is set higher as the ambient temperature is lower.

In a case where the control of "turning off the heater 181 when the temperature is 10° C. or higher" is applied to the second control example, the first temperature threshold T1 corresponds to "10° C.", and "d1" corresponds to 0%. Therefore, strictly speaking, T≥T1 may be satisfied instead of T>T1 in the determination to be made in, for example, step S2502.

Second Embodiment of Heater Turn-on Control

A description is now given of the flow of the heater turn-on control process to be performed in the "first control example" and the "second control example" described above.

Figure 26:
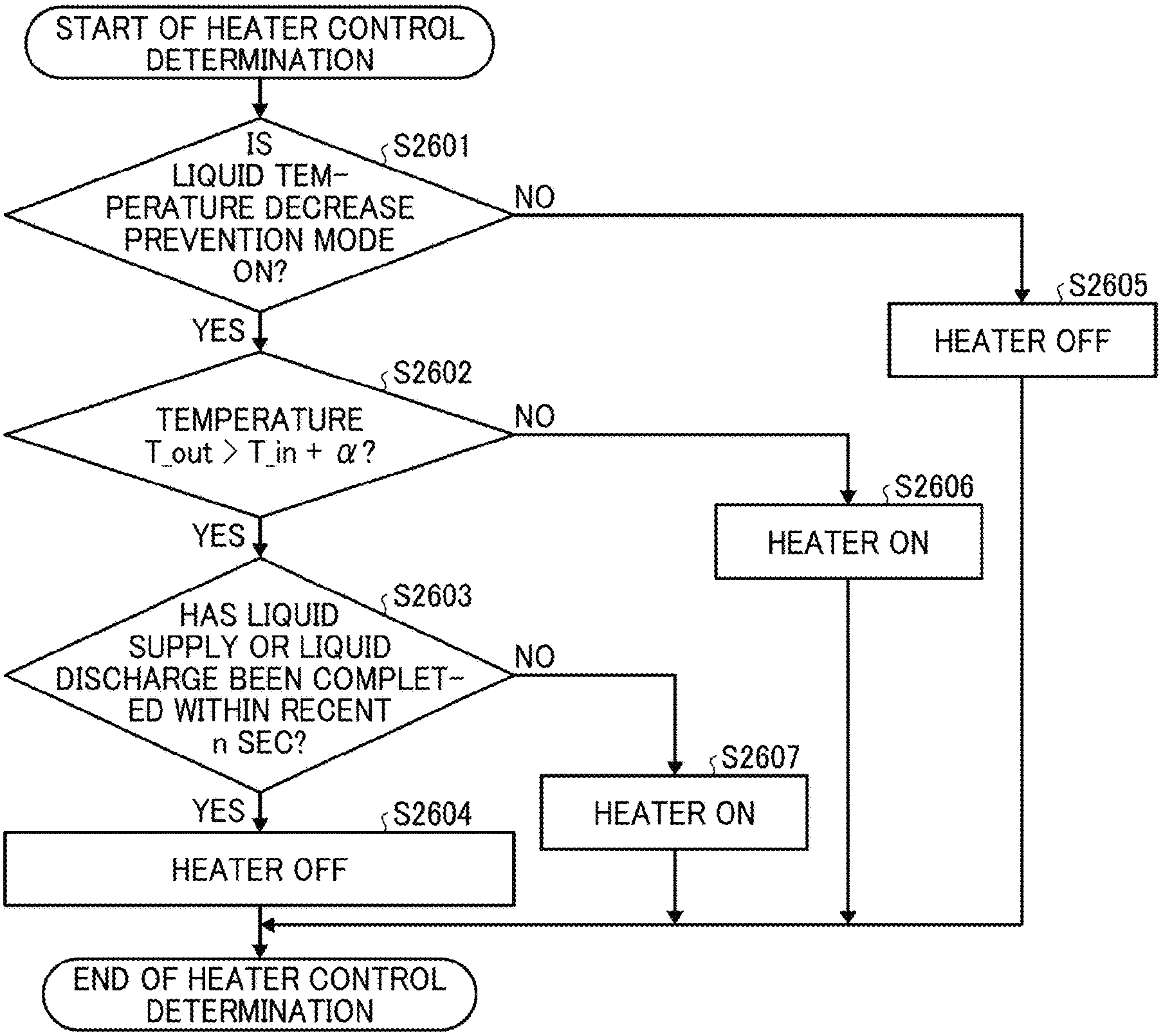
FIG. 26 is a flowchart of another example of the heater control process in the liquid temperature restricting mode.

For example, as illustrated in FIG. 26, when the "liquid temperature restricting mode" is inactive (NO in step S2601), the heater 181 is not turned on, and the process ends in step S2605.

When the "liquid temperature restricting mode" is active (YES in step S2601), it is determined in step S2602 whether an external temperature T_out as the use environment of the post-processing apparatus 3 is larger than a value obtained by addition of the coefficient "α" to an internal temperature T_in. When the external temperature T_out is higher than a temperature "T_in (internal temperature)+α" (YES in step S2602), the controller 100 turns on the heater 181 in step S2506. Note that the coefficient "α" is a threshold for determining a difference between the internal temperature and the external temperature.

When the "liquid temperature restricting mode" is active (YES in step S2601) and the external temperature T_out is not higher than the temperature "T_in (internal temperature)+α" (NO in step S2602), it is determined whether "the liquid supply or liquid discharge operation has been completed within last n seconds" in step S2603. When "the liquid supply or liquid discharge operation has not been completed within the last n seconds" (NO in step S2603), the controller 100 turns on the heater 181 in step S2607.

When "the liquid supply or liquid discharge operation has been completed within the last "n" seconds" (YES in step S2603), the controller 100 does not turn on the heater 181 in step S2604.

As described above, the heater 181 is turned on when the difference between the temperature outside the post-processing apparatus 3 and the temperature inside the post-processing apparatus 3 is within a predetermined range in the liquid temperature restricting mode. Even if the difference is not within the predetermined range, the heater 181 is turned on when the liquid supply operation or discharge operation has been completed most recently.

In a case where the external temperature T_out is higher than the internal temperature T_in by α° C. or more (the coefficient "α" does not need to be an excessively large value, and thus may be about 5° C.), it is considered that the internal temperature T_in and the liquid temperature tend to increase. Therefore, when the liquid supply operation or liquid discharge operation has been completed within the last n seconds, in other words, when the liquid has not been frozen, it can be determined that there is no risk of freezing even if the heater 181 is turned off.

As described above, in the liquid temperature restricting mode, the heater 181 is turned off based on determination of the difference between the external temperature T_out and the internal temperature T_in of the post-processing apparatus 3 and determination that the most recent liquid supply operation or liquid discharge operation has been completed. Therefore, the power consumption can be reduced while maintaining the state of liquid according to the temperature.

Second Embodiment of Post-Processing Apparatus

A description is now given of a post-processing apparatus 3A according to a second embodiment, with reference to FIGS. 27 to 35.

Components common to the post-processing apparatus 3A according to the second embodiment and the post-processing apparatus 3 according to the first embodiment are denoted by the same reference numerals, and detailed descriptions thereof may be omitted.

An edge binder 251 of the post-processing apparatus 3A according to the second embodiment includes a crimper 32', and a liquid applier 131 is provided on the upstream side of a conveyance passage. In this respect, the edge binder 251 is different from the edge binder 25 of the post-processing apparatus 3 according to the first embodiment in which the liquid applier 31 and the crimper 32 are provided together. As a result, this configuration can press and tack a given number of sheets P after a liquid application process and convey the sheets P to the crimper 32' of the edge binder 251' provided on the downstream side. Thus, the productivity of a binding process to be performed in the crimper 32' can be enhanced.

Since the direction in which the conveyance roller pairs 10, 11, and 14 convey the sheet P is opposite to the "conveyance direction" defined above, the direction in which the conveyance roller pairs 10, 11, and 14 convey the sheet P is defined as an "opposite conveyance direction" in the following description. A direction that is orthogonal to both the opposite conveyance direction and the thickness direction of the sheet P is defined as the "main scanning direction" or the "width direction of the sheet P." A liquid application position at which liquid is applied on the sheet P or the sheet bundle Pb by the liquid applier 131 corresponds to a binding position on the sheet bundle Pb to be crimped and bound by the crimper 32'. For this reason, in the following description, the liquid application position and the binding position are denoted by the same reference sign.

Figure 27:
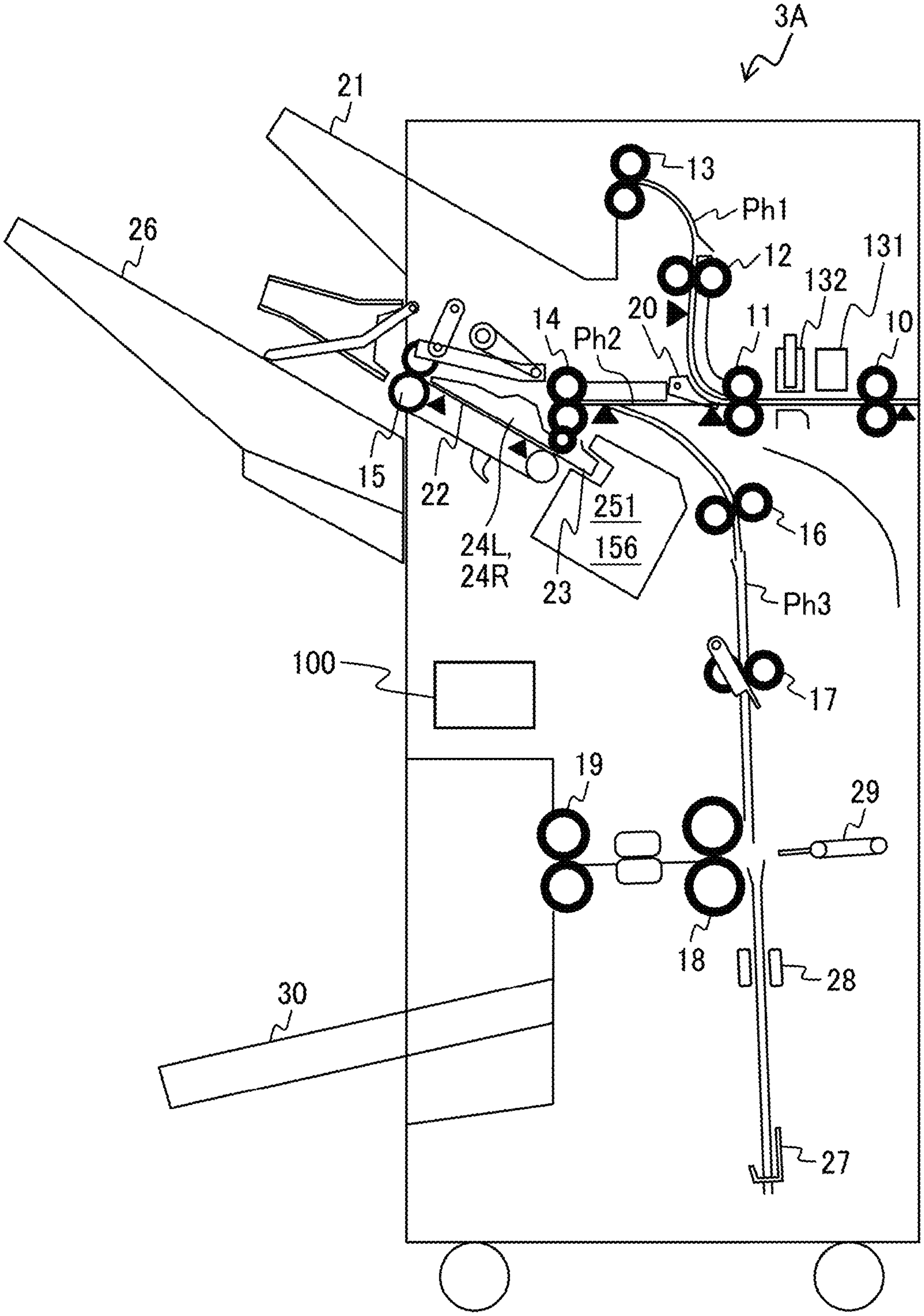
FIG. 27 is a diagram illustrating an internal configuration of a post-processing apparatus according to a second embodiment.

FIG. 27 is a diagram illustrating an internal configuration of the post-processing apparatus 3A according to the second embodiment of the present disclosure.

Figure 28A:
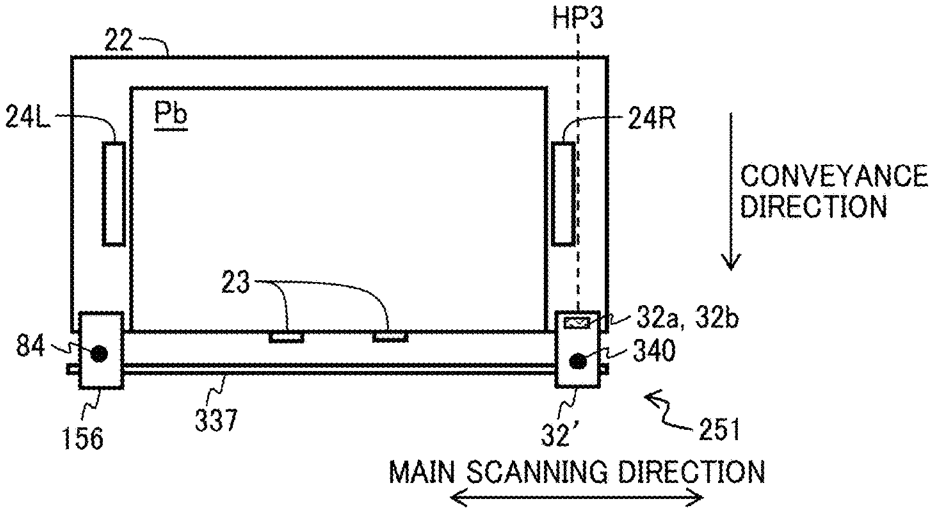
FIGS. 28A, 28B and 28C are schematic views of an internal tray of the post-processing apparatus according to the second embodiment, viewed from a thickness direction of a sheet.
Figure 28B:
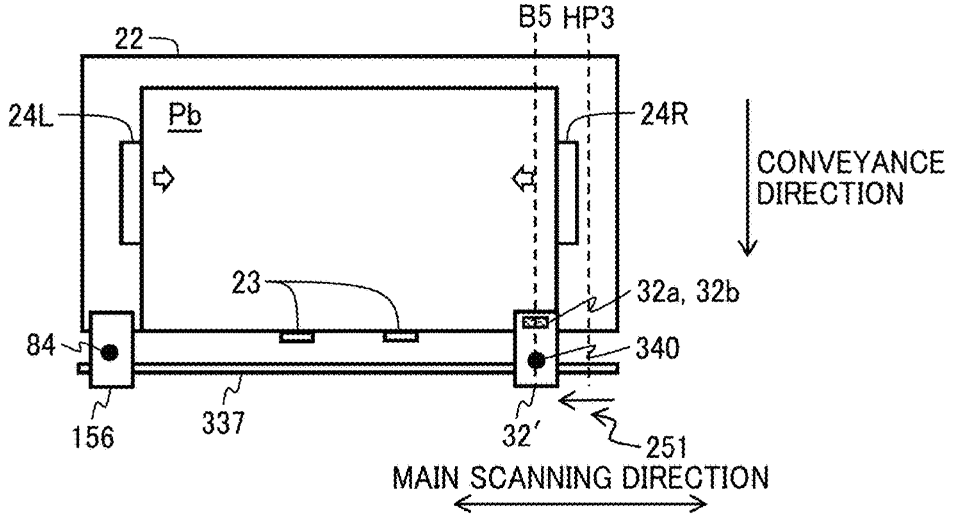
Figure 28C:
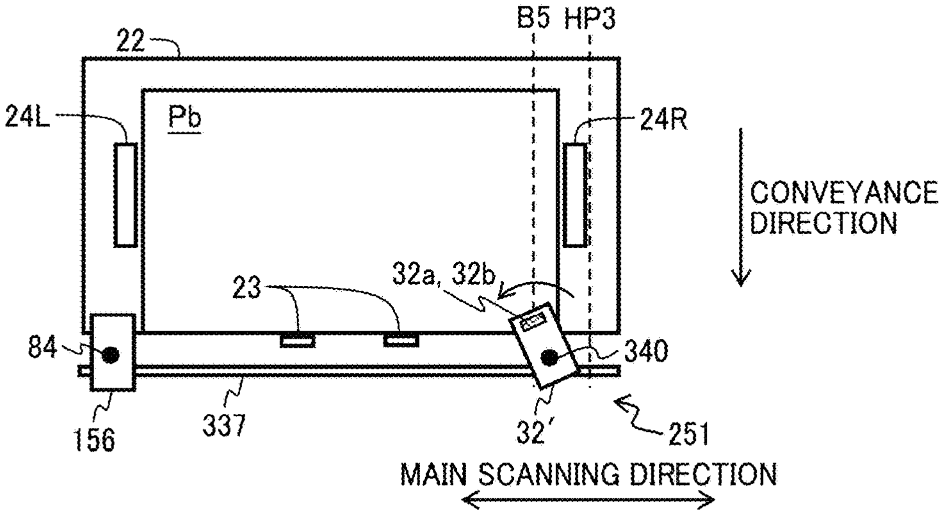

As illustrated in FIGS. 28A, 28B and 28C, the edge binder 251 includes the crimper 32'. As illustrated in FIGS. 28A to 28C, the crimper 32' and a stapling unit 156 are disposed downstream from the internal tray 22 in the conveyance direction. In addition, the crimper 32' and the stapling unit 156 are located to face a downstream end, in the conveyance direction, of the sheet bundle Pb placed on the internal tray 22, and are movable in the main scanning direction. Furthermore, the crimper 32' and the stapling unit 156 are respectively rotatable in the forward and reverse directions about a crimper shaft 340 and a stapler shaft 84 both extending in the thickness direction of the sheet bundle Pb placed on the internal tray 22. In other words, the crimper 32' and the stapling unit 156 can bind the sheet bundle Pb placed on the internal tray 22 at a desired angle and at a desired position in the main scanning direction and perform, for example, corner oblique binding, parallel one-point binding, or parallel two-point binding.

The crimper 32' presses and deforms the sheet bundle Pb with the serrate upper crimping teeth 32*a* and the serrate lower crimping teeth 32*b* to bind the sheet bundle Pb. In the following description, such a binding way may be referred to as "crimp binding." In other words, the crimper 32' crimps and binds the sheet bundle Pb or performs the crimp binding on the sheet bundle Pb. On the other hand, the stapling unit 156 passes a staple through a binding position on the sheet bundle Pb placed on the internal tray 22 to staple the sheet bundle Pb.

Each of FIGS. 28A, 28B and 28C is a schematic view of the internal tray 22 in the thickness direction of the sheet bundle Pb.

Figure 29:
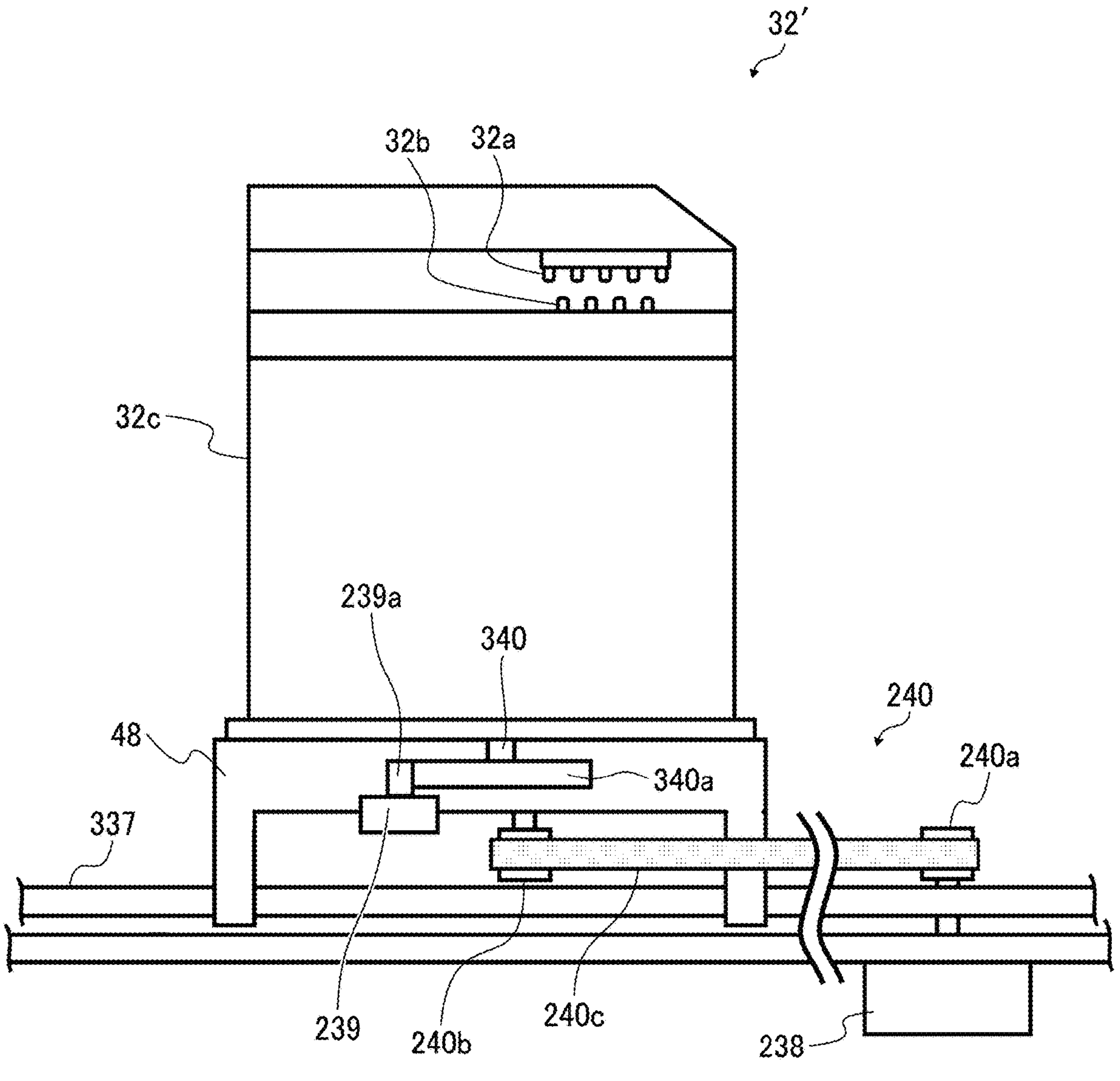
FIG. 29 is a schematic view of a downstream side of a crimper of the post-processing apparatus according to the second embodiment in a conveyance direction.

FIG. 29 is a schematic diagram illustrating a downstream side of the crimper 32' in the conveyance direction.

As illustrated in FIGS. 28A to 28C, the crimper 32' and the stapling unit 156 are disposed downstream from the internal tray 22 in the conveyance direction. The crimper 32' is movable in the main scanning direction along the surface of the sheet bundle Pb placed on the internal tray 22. The crimper 32' is also rotatable in the forward and reverse directions about the crimper shaft 340 extending in the thickness direction of the sheet bundle Pb placed on the internal tray 22. Similarly, the stapling unit 156 is movable in the main scanning direction of the sheet bundle Pb and is rotatable in the forward and reverse directions about the stapler shaft 84 extending in the thickness direction of the sheet bundle Pb. The other components of the stapling unit 156 are similar to, even if not the same as, components of the stapling unit 155 (see FIG. 11) of the post-processing apparatus 3 according to the first embodiment. For this reason, a detailed description thereof is omitted.

As illustrated in FIG. 29, the crimper 32' includes a guide rail 337 extending in the main scanning direction at a position downstream from the internal tray 22 in the conveyance direction. The crimper 32' is moved in the main scanning direction along the surface of the sheet bundle Pb placed on the internal tray 22, in other words, along the guide rail 337, by a driving force that is transmitted from a crimper movement motor 238 by a drive transmission assembly 240 including pulleys 240*a* and 240*b* and a timing belt 240*c*. The crimper shaft 340 provided with a drive transmission gear 340*a* is fixed to a bottom face of the crimping frame 32*c* that holds the components of the crimper 32'. The crimper shaft 340 and the drive transmission gear 340*a* are held by the base 48 on which the crimping frame 32*c* is disposed, so as to be rotatable in the forward and reverse directions. The drive transmission gear 340*a* meshes with an output gear 239*a* of a crimper pivot motor 239. The crimper 32' is rotated in the forward and reverse directions on the base 48 about the crimper shaft 340 extending in the thickness direction of the sheet P placed on the internal tray 22, by a driving force transmitted from the crimper pivot motor 239 to the crimper shaft 340 via the output gear 239*a* and the drive transmission gear 340*a*. The guide rail 337, the crimper movement motor 238, the crimper pivot motor 239, the crimper shaft 340, and the drive transmission assembly 240 constitute at least part of a driving assembly of the crimper 32' according to the present embodiment.

The crimper 32' is movable between a standby position HP3 illustrated in FIG. 28A and a position where the crimper 32' faces a binding position B5 illustrated in FIGS. 28B and 28C. The standby position HP3 is away in the main scanning direction from the sheet bundle Pb placed on the internal tray 22. For example, the standby position HP3 is located on the right side of the sheet bundle Pb in FIGS. 28A to 28C.

The binding position B5 is a position on the sheet bundle Pb placed on the internal tray 22. However, the specific position of the binding position B5 is not limited to the position illustrated in FIGS. 28A to 28C. The binding position B5 may be one or more positions along the main scanning direction at the downstream end, in the conveyance direction, of the sheet P.

The posture of the crimper 32' changes between the parallel binding posture illustrated in FIG. 28B and the oblique binding posture illustrated in FIG. 28C. In other words, the crimper 32' is rotatable in the forward and reverse directions about the crimper shaft 340. The parallel binding posture is a posture of the crimper 32' in which the long sides of the upper crimping teeth 32*a* and the lower crimping teeth 32*b* (in other words, the long side of a rectangular crimp binding trace) are along the main scanning direction. The oblique binding posture is a posture of the crimper 32' in which the long sides of the upper crimping teeth 32*a* and the lower crimping teeth 32*b* (in other words, the long side of the rectangular crimp binding trace) are inclined with respect to the main scanning direction.

The rotational angle, which is an angle of the upper crimping teeth 32*a* and the lower crimping teeth 32*b* with respect to the main scanning direction, in the oblique binding posture is not limited to the angle illustrated in FIG. 28C. The rotational angle in the oblique binding posture may be any angle provided that the upper crimping teeth 32*a* and the lower crimping teeth 32*b* face the sheet bundle Pb placed on the internal tray 22.

Figure 35:
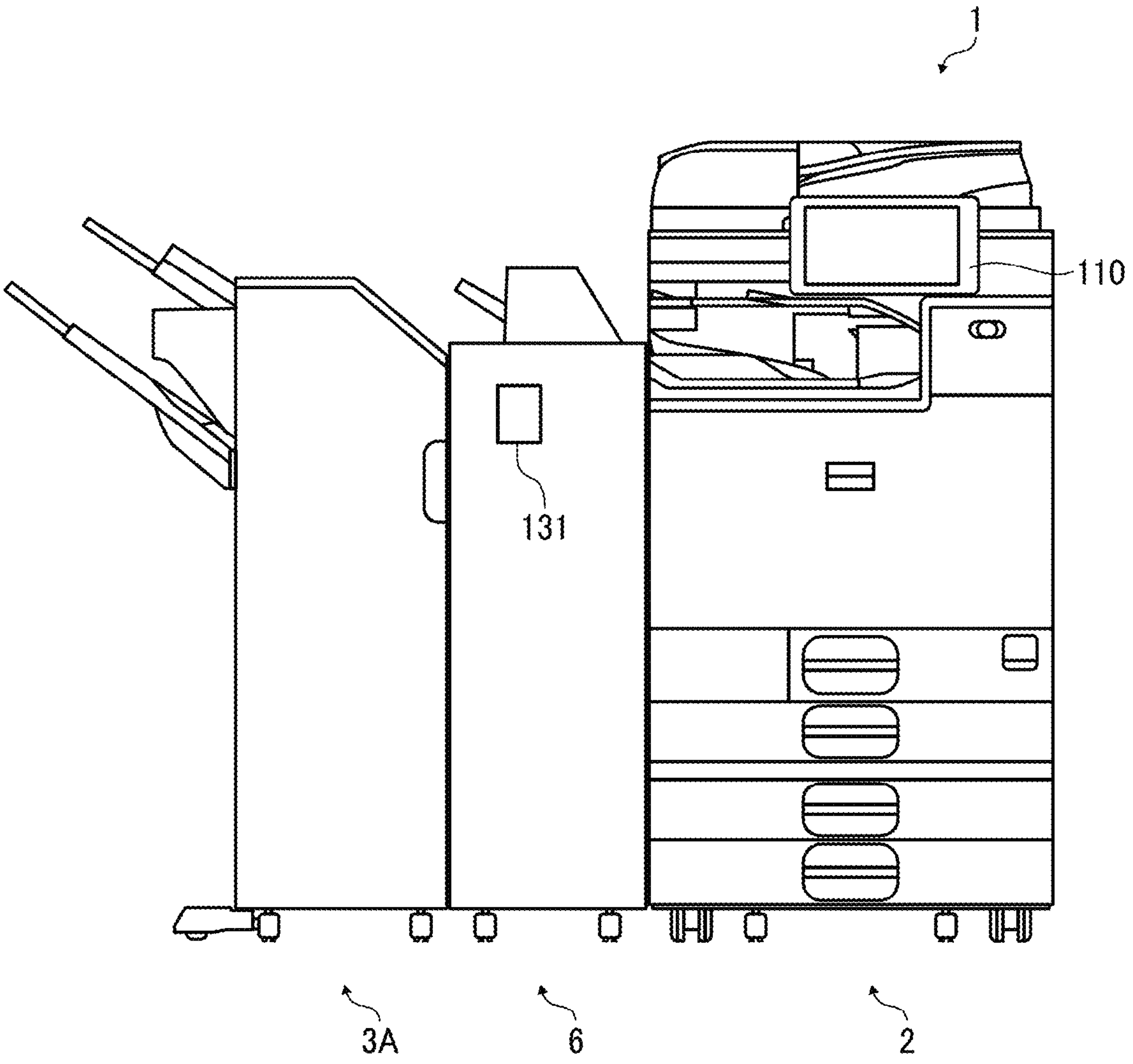
FIG. 35 is a diagram illustrating the overall configuration of an image forming system according to a modification of the embodiment illustrated in FIG. 1.

The post-processing apparatus 3A includes the liquid applier 131 and a hole punch 132 serving as a processing device. The liquid applier 131 and the hole punch 132 are disposed upstream from the internal tray 22 in the opposite conveyance direction. In addition, the liquid applier 131 and the hole punch 132 are disposed at different positions in the opposite conveyance direction to simultaneously face one sheet P that is conveyed by the conveyance roller pairs 10 to 19. The liquid applier 131 and the hole punch 132 according to the present embodiment are disposed between the conveyance roller pairs 10 and 11. However, the arrangement of the liquid applier 131 and the hole punch 132 is not limited to the arrangement illustrated in FIG. 27. For example, in a case where an inserter 6 is disposed between the image forming apparatus 2 and the post-processing apparatus 3A as illustrated in FIG. 35, the liquid applier 131 may be disposed inside the inserter 6 located upstream from the post-processing apparatus 3A in a direction in which the sheet P is conveyed from the image forming apparatus 2 to the post-processing apparatus 3A. Examples of the inserter 6 include, but are not limited to, an apparatus that allows a pre-printed medium, which is to be conveyed to the post-processing apparatus 3A together with the sheet P conveyed from the image forming apparatus 2, to be fed as a cover sheet, an insertion sheet, or a partition sheet without passing through the image forming apparatus 2.

Figure 30A:
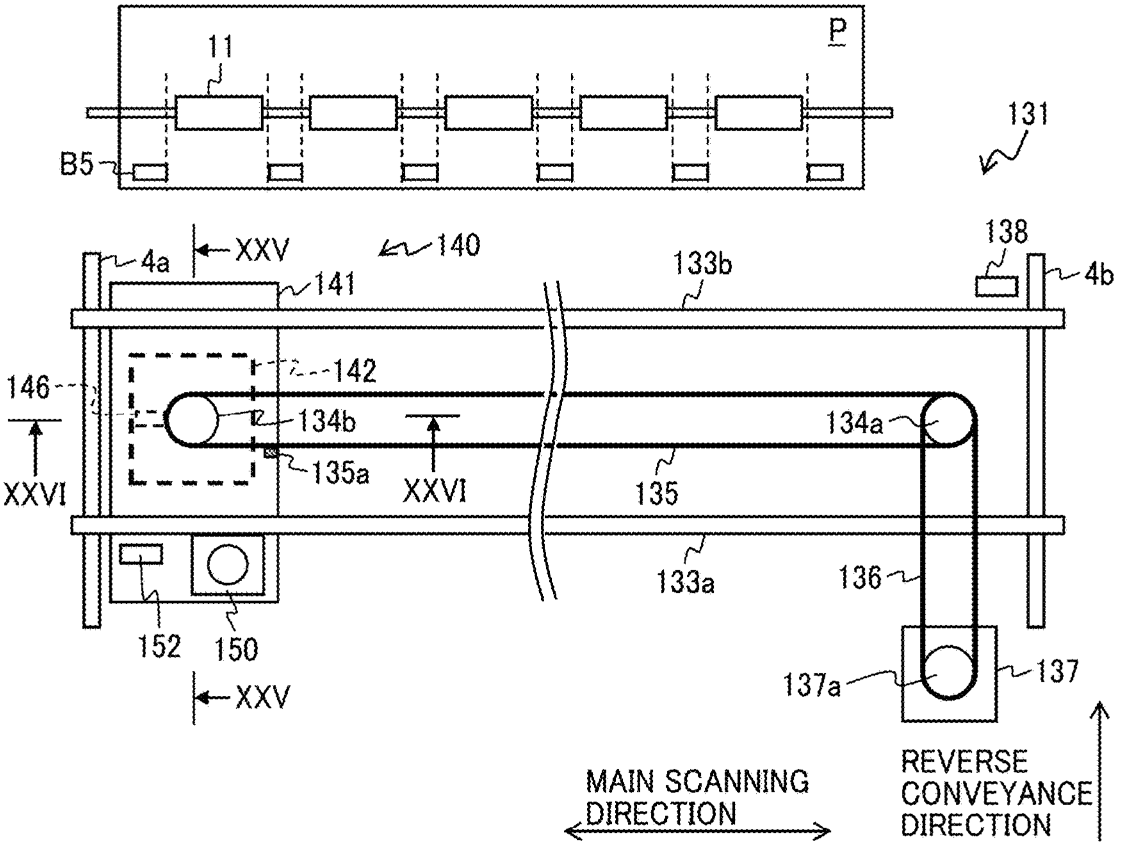
FIGS. 30A and 30B are schematic views of a liquid applier of the post-processing apparatus according to the second embodiment, viewed from the thickness direction of the sheet.

As illustrated in FIG. 30A, the conveyance roller pair 11 is located so as not to overlap, in the main scanning direction, a liquid application position B5 on the sheet P to which the liquid is applied by a liquid application head 146 of the liquid applier 131. This is to prevent the amount of liquid at the liquid application position B5 from decreasing due to the plurality of roller pairs brought into contact with the liquid application position B5 when the conveyance roller pair 11 conveys the sheet P. As a result, when the sheet P reaches the crimper 32' disposed downstream from the liquid applier 131 in the opposite conveyance direction, the amount of liquid at the liquid application position B5 is sufficient to maintain the binding strength. Accordingly, the binding strength of the sheet bundle Pb is prevented from decreasing due to a decrease in the amount of liquid at the liquid application position B5 (corresponding to the binding position B5) while the sheet P is conveyed.

In addition, the plurality of roller pairs of the conveyance roller pair 11 that is located so as not to overlap the liquid application position B5 on the sheet P in the main scanning direction prevents the conveying performance of the sheet P from being worse due to the adhesion of liquid to the plurality of roller pairs and further prevents a conveyance jam that may be caused by the worsened conveying performance of the sheet P.

Although only the conveyance roller pair 11 has been described above, the plurality of roller pairs of the conveyance roller pairs 14 and 15 is preferably located so as not to overlap the liquid application position B5 on the sheet P in the main scanning direction, as with the plurality of roller pairs of the conveyance roller pair 11.

The liquid applier 131 applies liquid to the sheet P that is conveyed by the conveyance roller pairs 10 and 11. In the following description, the application of liquid may be referred to as "liquid application." The hole punch 132 punches a hole in the sheet P that is conveyed by the conveyance roller pairs 10 and 11 such that the hole penetrates the sheet P in the thickness direction of the sheet P. The processing device disposed near the liquid applier 131 is not limited to the hole punch 132. Alternatively, the processing device may be an inclination corrector that corrects an inclination or skew of the sheet P that is conveyed by the conveyance roller pairs 10 and 11.

Figure 30B:
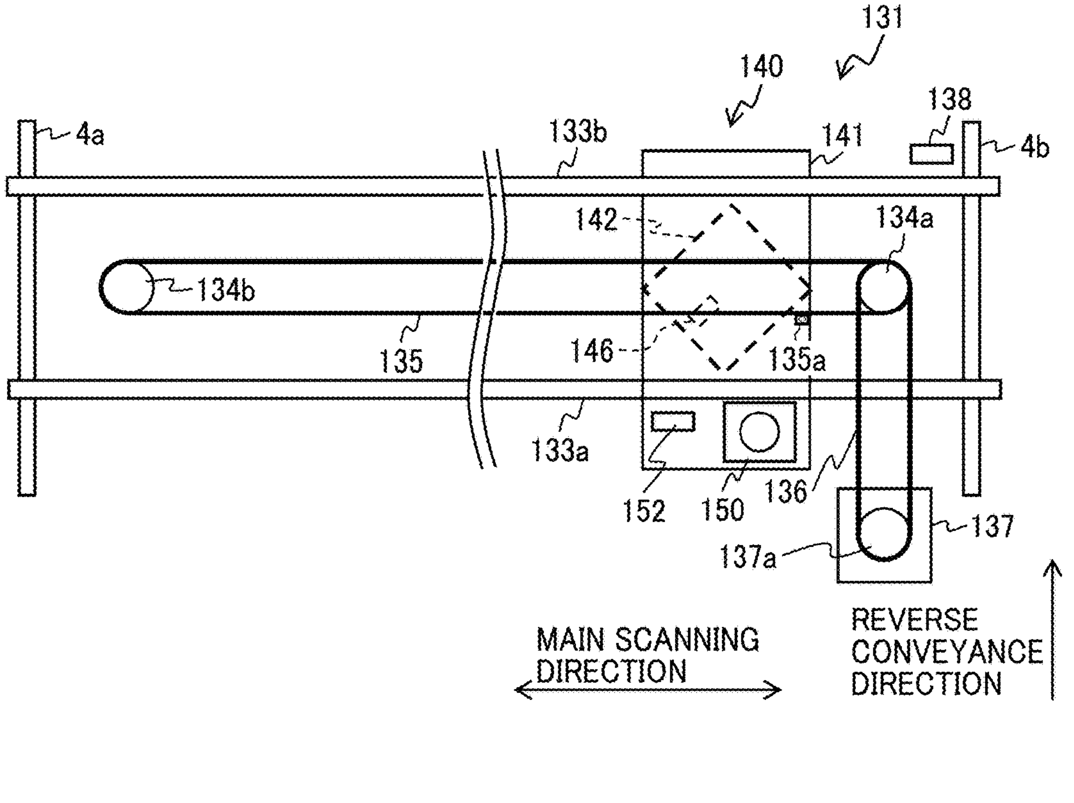

FIGS. 30A and 30B are views of the liquid applier 131 in the thickness direction of the sheet P, according to the second embodiment of the present disclosure.

Figure 31C:
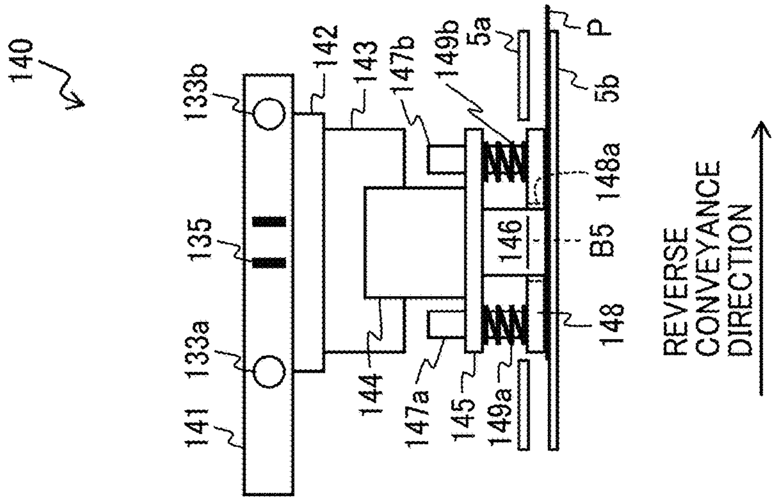
FIGS. 31A, 31B and 31C are cross-sectional views of the liquid applier taken along line XXV-XXV of FIG. 30A.
Figure 31B:
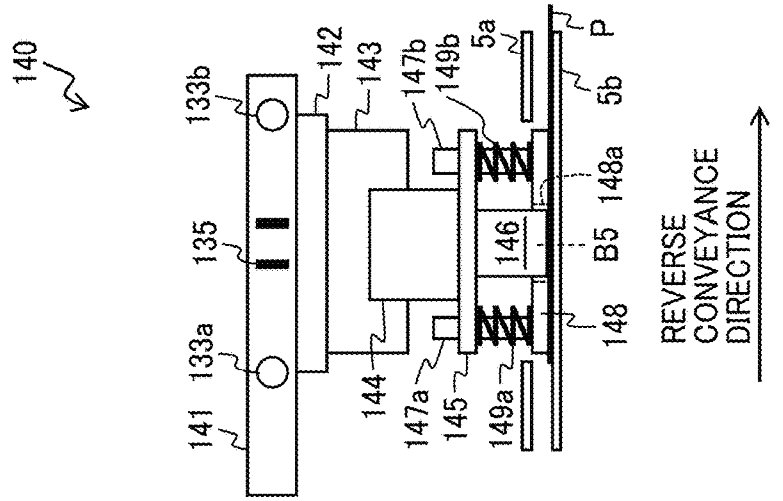
Figure 31A:
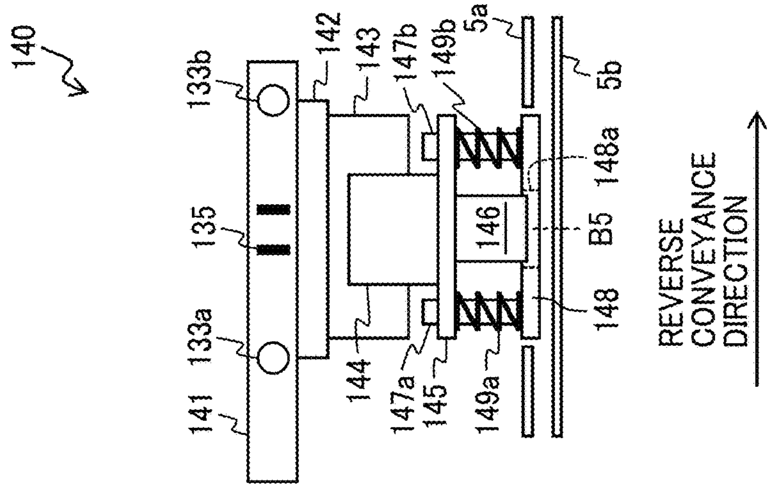

FIGS. 31A, 31B and 31C are cross-sectional views of a liquid application unit 140 of the liquid applier 131 taken through XXV-XXV of FIG. 30A.

Figure 32A:
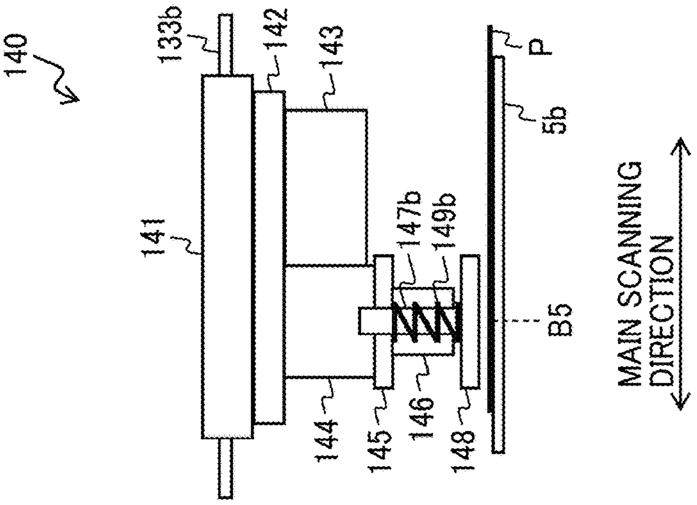
FIGS. 32A, 32B and 32C are cross-sectional views of the liquid applier taken along line XXVI-XXVI of FIG. 30A.
Figure 32B:
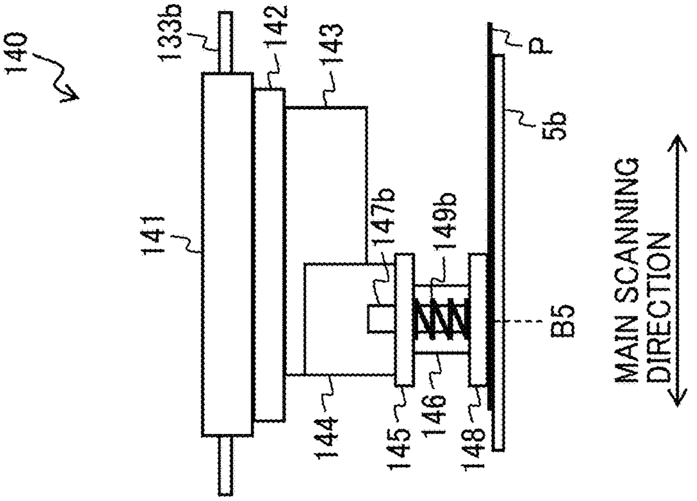
Figure 32C:
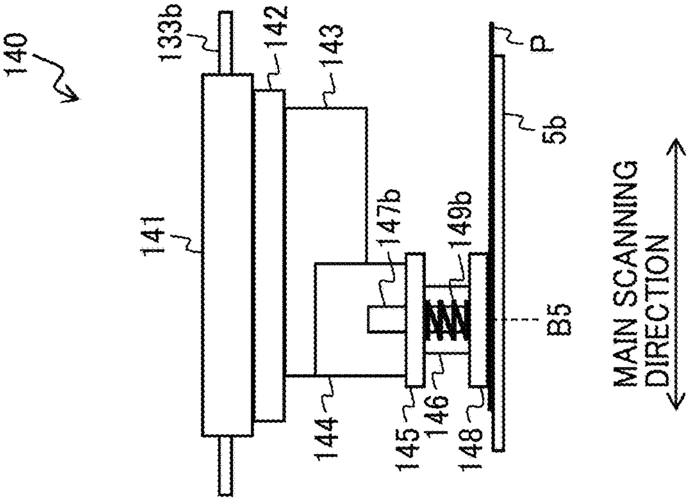

FIGS. 32A, 32B and 32C are cross-sectional views of the liquid application unit 140 of the liquid applier 131 taken through XXVI-XXVI of FIG. 30A.

As illustrated in FIGS. 30A to 32C, the liquid applier 131 includes a pair of guide shafts 133*a* and 133*b*, a pair of pulleys 134*a* and 134*b*, endless annular belts 135 and 136, a liquid-applier movement motor 137, a standby position sensor 138, which is also illustrated in FIG. 29, and the liquid application unit 140.

The guide shafts 133*a* and 133*b*, each extending in the main scanning direction, are spaced apart from each other in the opposite conveyance direction. The pair of guide shafts 133*a* and 133*b* is supported by a pair of side plates 4*a* and 4*b* of the post-processing apparatus 3A. The pair of guide shafts 133a and 133b supports the liquid application unit 140 such that the liquid application unit 140 can move in the main scanning direction.

The pair of pulleys 134a and 134b is disposed between the pair of guide shafts 133a and 133b in the opposite conveyance direction. The pulleys 134a and 134b are spaced apart from each other in the main scanning direction. The pair of pulleys 134a and 134b is supported by a frame of the post-processing apparatus 3A so as to be rotatable in the forward and reverse directions about the respective shafts extending in the thickness direction of the sheet P.

The endless annular belt 135 is looped around the pair of pulleys 134a and 134b. The endless annular belt 135 is coupled to the liquid application unit 140 by a connection 135a. The endless annular belt 136 is looped around the pulley 134a and a driving pulley 137a that is fixed to an output shaft of the liquid-applier movement motor 137. The liquid-applier movement motor 137 generates a driving force to move the liquid application unit 140 in the main scanning direction.

As the liquid-applier movement motor 137 rotates, the endless annular belt 136 circulates around the pulley 134a and the driving pulley 137a to rotate the pulley 134a. As the pulley 134a rotates, the endless annular belt 135 circulates around the pair of pulleys 134a and 134b. As a result, the liquid application unit 140 moves in the main scanning direction along the pair of guide shafts 133a and 133b. The liquid application unit 140 reciprocates in the main scanning direction in response to the rotation direction of the liquid-applier movement motor 137 being switched.

The standby position sensor 138 detects the arrival of the liquid application unit 140 at a standby position in the main scanning direction. The standby position sensor 138 then outputs a standby position signal indicating the detection result to the controller 100 serving as a controller, which will be described below with reference to FIG. 33. The standby position sensor 138 is, for example, an optical sensor including a light emitter and a light receiver. The liquid application unit 140 at the standby position blocks an optical path between the light emitter and the light receiver. The standby position sensor 138 outputs the standby position signal in response to the light output from the light emitter not being received by the light receiver. The specific configuration of the standby position sensor 138 is not limited to the configuration described above.

As illustrated in FIGS. 31A to 31C, the conveyance passage inside the post-processing apparatus 3A is defined by an upper guide plate 5a and a lower guide plate 5b, which are apart from each other in the thickness direction of the sheet P. The liquid application unit 140 is located to face an opening of the upper guide plate 5a. In other words, the liquid application unit 140 is disposed to face the conveyance passage (a position at which the liquid application unit 140 is to face the sheet P conveyed along the conveyance passage) through the opening of the upper guide plate 5a.

As illustrated in FIGS. 30A to 32C, the liquid application unit 140 includes a base 141, a rotary bracket 142, a liquid-storage tank 143, a mover 144, a holder 145, the liquid application head 146, columns 147a and 147b, a pressure plate 148, coil springs 149a and 149b, an application-head pivot motor 150, an application-head movement motor 151 illustrated in FIG. 29, and a standby angle sensor 152 illustrated in FIGS. 30A and 30B.

The base 141 is supported by the pair of guide shafts 133a and 133b so as to be slidable in the main scanning direction. The base 141 is coupled to the endless annular belt 135 by the connection 135a. The base 141 supports the components of the liquid application unit 140 such as the rotary bracket 142, the liquid-storage tank 143, the mover 144, the holder 145, the liquid application head 146, the columns 147a and 147b, the pressure plate 148, the coil springs 149a and 149b, the application-head pivot motor 150, the application-head movement motor 151, and the standby angle sensor 152.

The rotary bracket 142 is attached to the lower face of the base 141 so as to be rotatable in the forward and reverse directions about a shaft extending in the thickness direction of the sheet P. The rotary bracket 142 is rotated in the forward and reverse directions with respect to the base 141 by a driving force transmitted from the application-head pivot motor 150. On the other hand, the rotary bracket 142 holds the liquid-storage tank 143, the mover 144, the holder 145, the liquid application head 146, the columns 147a and 147b, the pressure plate 148, and the coil springs 149a and 149b.

Figure 33:
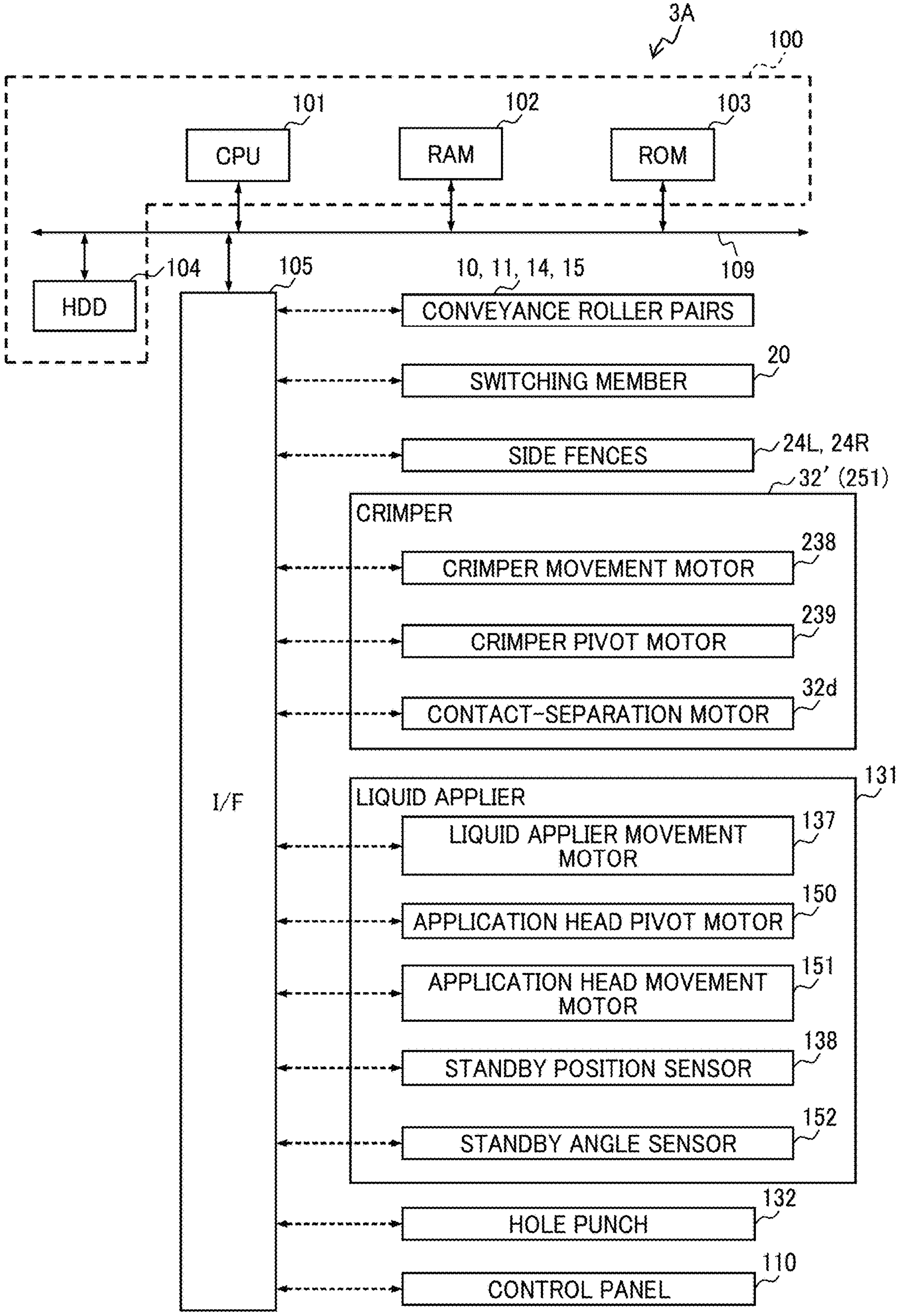
FIG. 33 is a control block diagram illustrating a hardware configuration of the post-processing apparatus according to the second embodiment.

The standby angle sensor 152, which is illustrated in FIG. 33, detects that the rotary bracket 142 has reached a standby angle. The standby angle sensor 152 then outputs a standby angle signal indicating the detection result to the controller 100. The standby angle is, for example, an angle for the parallel binding. The standby angle sensor 152 is, for example, an optical sensor including a light emitter and a light receiver. The rotary bracket 142 at the standby angle blocks an optical path between the light emitter and the light receiver. The standby angle sensor 152 outputs the standby angle signal in response to the light output from the light emitter not being received by the light receiver. The specific configuration of the standby angle sensor 152 is not limited to the configuration described above.

FIG. 30A illustrates the rotary bracket 142 in a position for the parallel binding that is performed by the crimper 32' disposed downstream from the liquid applier 131. FIG. 30B illustrates the rotary bracket 142 in a position for the oblique binding (i.e., corner binding) that is performed by the crimper 32' disposed downstream from the liquid applier 131.

The liquid-storage tank 143 stores liquid to be applied to the sheet P. The mover 144 is attached to the liquid-storage tank 143 so as to be movable (for example, up and down) in the thickness direction of the sheet P. The mover 144 is moved with respect to the liquid-storage tank 143 by a driving force transmitted from the application-head movement motor 151. The holder 145 is attached to a lower end of the mover 144. The liquid application head 146 projects from the holder 145 toward the conveyance passage (downward in the present embodiment). The liquid that is stored in the liquid-storage tank 143 is supplied to the liquid application head 146. The liquid application head 146 is made of a material having a relatively high liquid absorption (e.g., sponge or fiber).

The columns 147a and 147b project downward from the holder 145 around the liquid application head 146. The columns 147a and 147b are movable relative to the holder 145 in the thickness direction. The columns 147a and 147b have respective lower ends holding the pressure plate 148. The pressure plate 148 has a through hole 148a at a position where the through hole 148a faces the liquid application head 146. The coil springs 149a and 149b are fitted around the columns 147a and 147b, respectively, between the holder 145 and the pressure plate 148. The coil springs 149a and 149b bias the columns 147a and 147b and the pressure plate 148 in a direction away from the holder 145.

As illustrated in FIGS. 31A and 32A, before the sheet P is conveyed to the position where the sheet P faces the opening of the upper guide plate 5a, the pressure plate 148 is positioned at or above the opening. Subsequently, when the sheet P that is conveyed by the conveyance roller pairs 10 and 11 stops at a position where the liquid application position B5 on the sheet P faces the opening, the application-head movement motor 151 is rotated in a first direction. As a result, the mover 144, the holder 145, the liquid application head 146, the columns 147*a* and 147*b*, the pressure plate 148, and the coil springs 149*a* and 149*b* are moved down together to bring the pressure plate 148 into contact with the sheet P. Note that the liquid application position B5 corresponds to the binding position B5 to be crimped and bound by the edge binder 251, specifically, the crimper 32'.

As the application-head movement motor 151 keeps rotating in the first direction after the pressure plate 148 is brought into contact with the sheet P, the coil springs 149*a* and 149*b* are compressed to further move down the mover 144, the holder 145, the liquid application head 146, and the columns 147*a* and 147*b*. Thus, as illustrated in FIGS. 31B and 32B, a lower face of the liquid application head 146 comes into contact with the sheet P through the through hole 148*a*. As a result, the liquid contained in the liquid application head 146 is applied to the sheet P.

Further rotation of the application-head movement motor 151 in the first direction more strongly presses the liquid application head 146 against the sheet P as illustrated in FIGS. 31C and 32C. Accordingly, the amount of liquid to be applied to the sheet P increases. In other words, the liquid applier 131 changes the pressing force of the liquid application head 146 against the sheet P to adjust the amount of liquid to be applied to the sheet P.

On the other hand, the rotation of the application-head movement motor 151 in a second direction opposite to the first direction moves up the mover 144, the holder 145, the liquid application head 146, the columns 147*a* and 147*b*, the pressure plate 148, and the coil springs 149*a* and 149*b* together. As a result, as illustrated in FIGS. 31A and 32A, the liquid application head 146 and the pressure plate 148 are separated from the sheet P. In other words, the liquid applier 131 includes the liquid application head 146 that can be separated from the sheet P.

FIG. 33 is a block diagram illustrating a hardware configuration of the post-processing apparatus 3A to control the operation of the post-processing apparatus 3A according to the second embodiment of the present disclosure.

As illustrated in FIG. 33, the post-processing apparatus 3A includes the CPU 101, the RAM 102, the ROM 103, the HDD 104, and the I/F 105. The CPU 101, the RAM 102, the ROM 103, the HDD 104, and the I/F 105 are connected to each other via the common bus 109.

The CPU 101 is an arithmetic unit, and controls the overall operation of the post-processing apparatus 3A. The RAM 102 is a volatile storage medium that allows data to be read and written at high speed. The CPU 101 uses the RAM 102 as a working area for data processing. The ROM 103 is a read-only non-volatile storage medium that stores programs such as firmware. The HDD 104 is a non-volatile storage medium that allows data to be read and written and has a relatively large storage capacity. The HDD 104 stores, e.g., an operating system (OS), various control programs, and application programs.

By an arithmetic function of the CPU 101, the post-processing apparatus 3A processes, for example, a control program stored in the ROM 103 and an information processing program (application program) loaded into the RAM 102 from a storage medium such as the HDD 104. Such processing configures a software controller including various functional modules of the post-processing apparatus 3A. The software controller that is thus configured cooperates with hardware resources of the post-processing apparatus 3A to construct functional blocks that implement functions of the post-processing apparatus 3A. In other words, the CPU 101, the RAM 102, the ROM 103, and the HDD 104 construct the controller 100 that controls the operation of the post-processing apparatus 3A.

The I/F 105 is an interface that connects, to the common bus 109, the conveyance roller pairs 10, 11, 14, and 15, the switching claw 20, the side fences 24L and 24R, the crimper movement motor 238, the crimper pivot motor 239, the contact-separation motor 32*d*, the liquid-applier movement motor 137, the application-head pivot motor 150, the application-head movement motor 151, the standby position sensor 138, the standby angle sensor 152, the hole punch 132, and the control panel 110. The controller 100 controls, via the I/F 105, the operations of the conveyance roller pairs 10, 11, 14, and 15, the switching claw 20, the side fences 24L and 24R, the crimper movement motor 238, the crimper pivot motor 239, the contact-separation motor 32*d*, the liquid-applier movement motor 137, the application-head pivot motor 150, the application-head movement motor 151, and the hole punch 132.

On the other hand, the controller 100 acquires, via the I/F 105, detection results from the standby position sensor 138 and the standby angle sensor 152. Although FIG. 33 mainly illustrates the components of the liquid applier 131 and the edge binder 251 (the crimper 32') that executes the edge binding, the components of the saddle binder 28 that executes the saddle binding are controlled by the controller 100 as with the components of the liquid applier 131 and the edge binder 251 (the crimper 32').

The control panel 110 includes an operation unit that receives instructions input by a user and a display serving as a notifier that notifies the user of information. The operation unit includes, for example, physical input buttons and a touch screen overlaid on a display. The control panel 110 acquires information from the user through the operation unit, and provides information to the user through the display.

Figure 34:
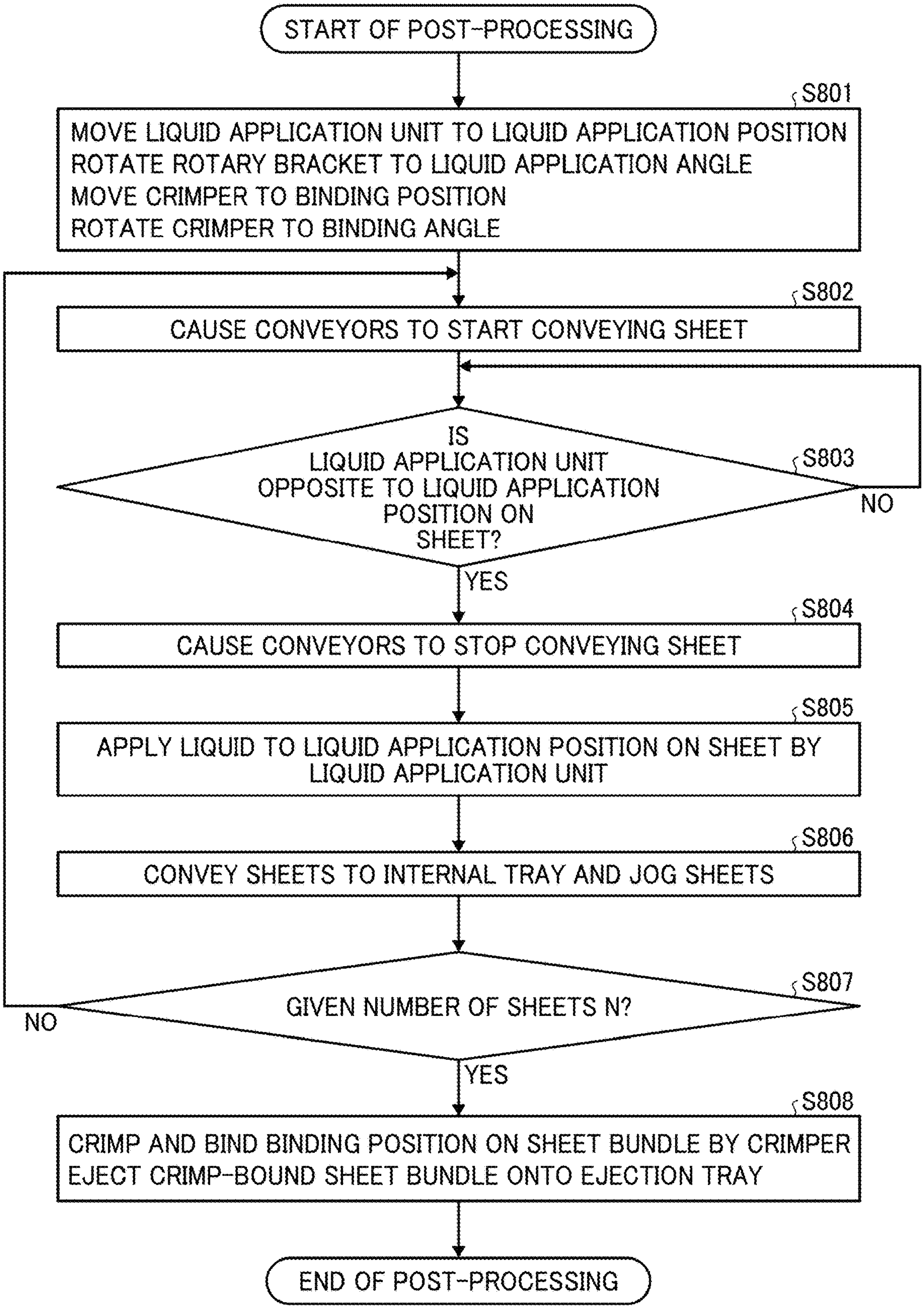
FIG. 34 is a flowchart of post-processing performed by the post-processing apparatus according to the second embodiment.

FIG. 34 is a flowchart of post-processing performed by the post-processing apparatus 3A according to the second embodiment.

For example, the controller 100 executes the post-processing illustrated in FIG. 34 when the controller 100 acquires an instruction to execute the post-processing from the image forming apparatus 2. In the following description, the instruction to execute the post-processing may be referred to as a "post-processing command." The post-processing command includes, for example, the number of sheets P of the sheet bundle Pb, the number of sheet bundles Pb to be bound, the binding position B5 (corresponding to the liquid application position B5), the angle at the binding position B5 (corresponding to an angle at the liquid application position B5), the type of binding (for example, the parallel binding or the oblique binding), and the process that is executed in parallel with the liquid application process (i.e., the punching of a hole in the present embodiment). In the following description, the number of sheets P of the sheet bundle Pb may be referred to as "given number N" whereas the number of sheet bundles Pb to be bound may be referred to as "requested number of copies." Note that, at the start of the post-processing, the liquid application unit 140 is at the standby position HP3 (corresponding to the standby position HP3 illustrated in FIGS. 28A to 28C) whereas the rotary bracket 142 is held at the standby angle (corresponding to the "parallel binding posture").

First, in step S801, the controller 100 drives the liquid-applier movement motor 137 to move the liquid application unit 140 (corresponding to the liquid applier) in the main scanning direction such that the liquid application head 146 moves from the standby position HP3 to a position where the liquid application head 146 can face the liquid application position B5 (corresponding to the binding position B5 illustrated in FIGS. 28B and 28C). When the type of binding that is specified by the post-processing command is the "oblique binding," in step S801, the controller 100 also drives the application-head pivot motor 150 to rotate the rotary bracket 142 such that the liquid application head 146 rotates from the standby angle to a liquid application angle corresponding to the "oblique binding posture." It is ascertained based on a pulse signal output from a rotary encoder of the liquid-applier movement motor 137 that the liquid application head 146 has reached the position where the liquid application head 146 can face the liquid application position B5. Similarly, it is ascertained based on a pulse signal output from a rotary encoder of the application-head pivot motor 150 that the liquid application head 146 has reached the liquid application angle. When the type of binding specified by the post-processing command is the "parallel binding," the controller 100 omits the aforementioned operation of rotating the rotary bracket 142. In other words, the liquid application unit 140 moves in the main scanning direction while holding the rotary bracket 142 at the standby angle.

In step S801, the controller 100 also drives the crimper movement motor 238 to move the crimper 32' from the standby position HP3 to the position where the crimper 32' can face the binding position B5 as illustrated in FIGS. 28A and 28B. When the type of binding that is specified by the post-processing command is the "oblique binding," in step S801, the controller 100 also drives the crimper pivot motor 239 to rotate the crimper 32' from the standby angle to a crimp binding angle corresponding to the "oblique binding posture." It is ascertained based on a pulse signal output from a rotary encoder of the crimper movement motor 238 that the crimper 32' has reached the position where the crimper 32' can face the binding position B5. Similarly, it is ascertained based on a pulse signal output from a rotary encoder of the crimper pivot motor 239 that the crimper 32' has reached the crimp binding angle. When the type of binding specified by the post-processing command is the "parallel binding," the controller 100 omits the aforementioned operation of rotating the crimper 32'. In other words, the crimper 32' moves in the main scanning direction while maintaining the standby angle.

Subsequently, in step S802, the controller 100 drives the conveyance roller pairs 10 and 11 to start conveying the sheet P on which an image has been formed by the image forming apparatus 2. In step S803, the controller 100 determines whether the liquid application position B5 on the sheet P has faced the liquid application unit 140 (more specifically, the liquid application head 146). In other words, the controller 100 determines whether the liquid application unit 140 has faced the liquid application position B5 on the sheet P. When the liquid application position B5 on the sheet P has not faced the liquid application head 146 (NO in step S803), the controller 100 repeats the determination in step S803. In other words, the controller 100 continues driving the conveyance roller pairs 10 and 11 until the liquid application position B5 on the sheet P faces the liquid application head 146. When the liquid application position B5 on the sheet P has faced the liquid application head 146 (YES in step S803), the controller 100 stops the conveyance roller pairs 10 and 11 in step S804. It is ascertained based on a pulse signal output from a rotary encoder of a motor that drives the conveyance roller pairs 10 and 11 that the liquid application position B5 on the sheet P has faced the liquid application head 146.

In step S805, the controller 100 causes the liquid application unit 140 to execute the process to apply liquid to the liquid application position B5 on the sheet P. More specifically, the controller 100 rotates the application-head movement motor 151 in the first direction to bring the liquid application head 146 into contact with the liquid application position B5 on the sheet P. The controller 100 changes the pressing force of the liquid application head 146 (in other words, the amount of rotation of the application-head movement motor 151) depending on the amount of liquid to be applied to the sheet P.

The amount of liquid to be applied to the sheet P may be the same for all the sheets P of the sheet bundle Pb or may be different for each sheet P. For example, the controller 100 may apply a decreased amount of liquid to the sheet P conveyed later. The amount of rotation of the application-head movement motor 151 may be ascertained based on a pulse signal output from a rotary encoder of the application-head movement motor 151.

In step S806, the controller 100 drives the conveyance roller pairs 10, 11, 14, and 15 to place the sheet P on the internal tray 22. In step S806, the controller 100 also moves the side fences 24L and 24R to align the position, in the main scanning direction, of the sheet P or the sheet bundle Pb placed on the internal tray 22. In short, the controller 100 performs so-called jogging.

Subsequently, in step S807, the controller 100 determines whether the number of sheets P placed on the internal tray 22 has reached the given number N specified by the post-processing command. When the controller 100 determines that the number of sheets P placed on the internal tray 22 has not reached the given number N (NO in step S807), the controller 100 executes the operations of steps S802 to S806 again.

When the controller 100 determines that the number of sheets P placed on the internal tray 22 has reached the given number N (YES in step S807), in step S808, the controller 100 causes the crimper 32' to crimp and bind the binding position B5 (corresponding to the liquid application position B5) on the sheet bundle Pb to which the liquid has been applied by the liquid application unit 140. In step S808, the controller 100 also rotates the conveyance roller pair 15 to output the sheet bundle Pb thus crimped and bound to the second output tray 26.

Then, the controller 100 drives the liquid-applier movement motor 137 to move the liquid application unit 140 to the standby position HP3 and drives the crimper movement motor 238 to move the crimper 32' to the standby position HP3.

When the post-processing command includes an instruction to form a plurality of sheet bundles Pb (i.e., the requested number of copies), the controller 100 determines whether the number of sheet bundles Pb output to the second output tray 26 has reached the requested number of copies as in step S909 in FIG. 14. When the controller 100 determines that the number of the sheet bundles Pb output to the second output tray 26 has not reached the requested number of copies, the controller 100 repeats the operations of steps S802 to S808. When the controller 100 determines that the number of sheet bundles Pb output to the second output tray 26 has reached the requested number of copies, the controller 100 moves the liquid application unit 140 and the crimper 32' to the standby position HP3 as described above.

The embodiments of the present disclosure are applied to the edge binder 25 that executes the edge binding as described above. However, the embodiments of the present disclosure may be applied to the saddle binder 28 that executes the saddle binding.

With regard to controlling operation of the component that performs liquid application, the post-processing apparatus 3 according to the present embodiment described above enables liquid to be maintained in a suitable state so as not to impair the effect of liquid application in a low-temperature environment. In other words, the post-processing apparatus 3 has the liquid temperature restricting mode that allows prevention of freezing of the liquid in a low-temperature environment and prevention of unnecessary supply of the liquid.

When the user performs mode setting based on determination that the temperature of the use environment may decrease to a temperature that may cause the freezing of the liquid, the post-processing apparatus 3 according to the present embodiment operating in the liquid temperature restricting mode enters a state in which freezing of the liquid can be prevented at a specific timing, based on detection by the temperature sensor. More specifically, in order to prevent freezing of liquid, liquid to be used for liquid application is discharged at a specific timing from the sub tank that stores the liquid. Alternatively, the liquid is heated to prevent freezing. With these control measures, this configuration can perform binding process operation involving liquid application even in a low-temperature environment. Thus, an effect of preventing occurrence of a binding failure due to insufficient binding force can be achieved.

In addition, there is a risk of breakage due to occurrence of freezing also in a supply configuration in which liquid is supplied from the main tank to the sub tank. In order to address this risk, the post-processing apparatus 3 according to the present embodiment enables liquid to move between the main tank and the sub tank in the liquid temperature restricting mode. As a result, this configuration can achieve cost reduction, space saving, and power saving due to reduction in the number of heaters (heaters 181).

The control method described above may be implemented by, for example, a program. In other words, the control method may be executed by causing an arithmetic device, a storage device, an input device, an output device, and a control device to operate in cooperation with each other based on a program. In addition, the program may be written in, for example, a storage device or a storage medium and distributed, or may be distributed through, for example, an electric communication line.

The present disclosure is not limited to specific embodiments described above, and numerous additional modifications and variations are possible in light of the teachings within the technical scope of the appended claims. The above-described embodiments and modifications are some examples, and various modifications and variations can be practiced from such examples by those skilled in the art. Such embodiments and variations thereof are included in the scope and gist of the embodiments of the present disclosure and are included in the embodiments described in claims and the equivalent scope thereof.

A description is now given below of several aspects of the present disclosure.

Aspect 1

In Aspect 1, a medium processing apparatus includes a liquid applier, a post-processing device, a first liquid storage, a second liquid storage, a liquid supplier, a temperature restrictor, and circuitry. The liquid applier applies liquid to a part of a medium. The post-processing device binds a media bundle including the medium to which liquid is applied by the liquid applier. The first liquid storage is included in the liquid applier to store liquid. The second liquid storage supplies the liquid to the first liquid storage. The liquid supplier supplies the liquid between the first liquid storage and the second liquid storage. The temperature restrictor restricts a reduction in temperature of the liquid. The circuitry is to control the temperature restrictor in a liquid temperature restricting mode that is a mode to prevent the reduction in temperature of the liquid.

Aspect 2

In Aspect 2, the medium processing apparatus according to Aspect 1 further includes an operator through which a selection of whether the liquid temperature restricting mode is on or off is input.

Aspect 3

In Aspect 3, the medium processing apparatus according to Aspect 1 or Aspect 2 further includes a temperature sensor to detect a temperature of an inside or an outside of the medium processing apparatus. The circuitry is to perform an automatic selection to set whether the liquid temperature restricting mode is on or off, based on a result of detection by the temperature sensor.

Aspect 4

In Aspect 4, in the medium processing apparatus according to any one of Aspects 1 to 3, the circuitry is to control a moving process of liquid from the first liquid storage to the second liquid storage when at a timing, when the liquid temperature restricting mode is on.

Aspect 5

In Aspect 5, the medium processing apparatus according to any one of Aspects 1 to 4 further includes a heater to heat an area near the second liquid storage. The circuitry is to control a heating process by the heater, with the liquid temperature restricting mode on.

Aspect 6

In Aspect 6, in the medium processing apparatus according to Aspect 3, the temperature detector detects a temperature of liquid stored in the second liquid storage.

Aspect 7

In Aspect 7, in the medium processing apparatus according to Aspect 4, the circuitry is to perform, with the liquid temperature restricting mode on, a discharging process of liquid from the first liquid storage to the second liquid storage when a binding process by the post-processing device is completed or when a given period of a standby time has elapsed after the completion of the binding process.

Aspect 8

In Aspect 8, in the medium processing apparatus according to Aspect 4, the circuitry is to perform, with the liquid temperature restricting mode on, an ejection process of liquid from the first liquid storage to the second liquid storage when the medium processing apparatus shifts to a nonoperating state or an energy saving mode.

Aspect 9

In Aspect 9, in the medium processing apparatus according to Aspect 5, the circuitry is, with the liquid temperature restricting mode on, when a given period of a serial operation of a binding process by the post-processing device has elapsed, to cause the moving process of liquid to be repeatedly performed between the first liquid storage and the second liquid storage, and cause the heater to heat the liquid.

Aspect 10

In Aspect 10, in the medium processing apparatus according to Aspect 5, a power is supplied to the heater from a circuit that is not electrically interrupted by opening and closing of a device main power supply or a device cover.

Aspect 11

In Aspect 11, the medium processing apparatus according to Aspect 5 or 10 further includes a physical switch in a power supply path for the heater. The physical switch is used to cut off a power supply to the heater.

Aspect 12

In Aspect 12, the medium processing apparatus according to Aspect 5, 10, or 11 further includes a switcher switchable of whether a power supply to the heater is on or off, and a temperature detector to detect a temperature of an inside or an outside of the medium processing apparatus. The circuitry is to control whether the power supply to the heater is on or off in accordance with a state of the liquid temperature restricting mode and a result of detection of the temperature detector.

Aspect 13

In Aspect 13, an image forming system includes an image forming apparatus and the medium processing apparatus according to any one of Aspects 1 to 12. The image forming apparatus forms an image on each medium of multiple media. The medium processing apparatus binds the multiple media on which images are formed by the image forming apparatus.

Aspect 14

In Aspect 14, a medium processing apparatus including a liquid applier, a post-processing device, and circuitry. The liquid applier applies liquid to a part of a medium. The liquid applier includes a liquid storage to store the liquid to be applied to the part of the medium. The post-processing device binds a media bundle including the medium to which the liquid has been applied by the liquid applier. The circuitry is to restrict a temperature decrease of the liquid in a liquid temperature restricting mode.

Aspect 15

In Aspect 15, in the medium processing apparatus according to Aspect 14 further includes another liquid storage and a liquid supplier. Said another liquid storage is coupled to the liquid storage to store the liquid to be supplied to the liquid storage. The liquid supplier supplies the liquid from said another liquid storage to the liquid storage and from the liquid storage to said another liquid storage. The circuitry is to control the liquid supplier to restrict the temperature decrease of the liquid in the liquid temperature restricting mode.

Aspect 16

In Aspect 16, the medium processing apparatus according to Aspect 15 further includes an operation unit to which a selection to enable or disable the liquid temperature restricting mode is inputtable.

Aspect 17

In Aspect 17, the medium processing apparatus according to Aspect 15 or 16 further includes a temperature detector to detect a temperature of an interior or an exterior of the medium processing apparatus. The circuitry is further to automatically select whether to enable or disable the liquid temperature restricting mode based on a temperature detection of the temperature detector.

Aspect 18

In Aspect 18, in the medium processing apparatus according to any one of Aspects 15 to 17, the temperature detector detects the temperature of the liquid stored in said another liquid storage.

Aspect 19

In Aspect 19, in the medium processing apparatus according to any one of Aspects 15 to 18, the circuitry is further to control the liquid supplier to supply the liquid from the liquid storage to said another liquid storage at a prescribed timing when the liquid temperature restricting mode is enabled.

Aspect 20

In Aspect 20, in the medium processing apparatus according to Aspect 19, the circuitry is further to control the liquid supplier to supply the liquid from the liquid storage to said another liquid storage, when the liquid temperature restricting mode is enabled and a binding process by the post-processing device is completed, or when the liquid temperature restricting mode is enabled and a given period of a standby time has elapsed after the completion of the binding process.

Aspect 21

In Aspect 21, in the medium processing apparatus according to Aspect 19, the circuitry is further to control the liquid supplier to supply the liquid from the liquid storage to said another liquid storage, when the liquid temperature restricting mode is enabled and the medium processing apparatus shifts to a nonoperating state, or when the liquid temperature restricting mode is enabled and the medium processing apparatus shifts to an energy saving mode.

Aspect 22

In Aspect 22, the medium processing apparatus according to Aspect 15 further includes a heater to heat in a vicinity of said another liquid storage. The circuitry is further to control the heater to heat the liquid in said another liquid storage when the liquid temperature restricting mode is enabled.

Aspect 23

In Aspect 23, in the medium processing apparatus according to Aspect 22, the circuitry is further to control the liquid supplier to repeatedly supply the liquid from the liquid storage to said another liquid storage and from said another liquid storage to the liquid storage, and control the heater to heat the liquid, when the liquid temperature restricting mode is enabled, and when a given period of a serial operation of a binding process by the post-processing device has elapsed.

Aspect 24

In Aspect 24, the medium processing apparatus according to Aspect 22 further includes a circuit to supply power to the heater. The circuit is not electrically interrupted by turning on and off of a device main power supply or opening and closing of a device cover.

Aspect 25

In Aspect 25, the medium processing apparatus according to Aspect 19 or 24 further includes a power supply path and a physical switch. The power supply path supplies power to the heater. The physical switch in the power supply path cuts off a power supply to the heater.

Aspect 26

In Aspect 26, the medium processing apparatus according to any one of Aspects 19, 24, or 25 further includes a switcher and a temperature detector. The switcher is switchable a power supply to the heater. The temperature detector detects a temperature of an interior or an exterior of the medium processing apparatus. The circuitry is further to control whether to supply the power to the heater in accordance with at least one of an application state of the liquid temperature restricting mode and a result of a temperature detection of the heater by the temperature detector.

Aspect 27

In Aspect 27, an image forming system includes an image forming apparatus and the medium processing apparatus according to any one of Aspects 14 to 26. The image forming apparatus forms an image on each medium of multiple media. The medium processing apparatus binds the multiple media on which images are formed by the image forming apparatus.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A medium processing apparatus comprising:
- a liquid applier to apply liquid to a part of a medium, the liquid applier including a liquid storage to store the liquid to be applied to the part of the medium;
- a post-processing device to bind a media bundle including the medium to which the liquid has been applied by the liquid applier; and
- circuitry configured to restrict a temperature decrease of the liquid in a liquid temperature restricting mode.

2. The medium processing apparatus according to claim 1, further comprising:
- another liquid storage coupled to the liquid storage to store the liquid to be supplied to the liquid storage; and
- a liquid supplier to supply the liquid from said another liquid storage to the liquid storage and from the liquid storage to said another liquid storage,
- wherein the circuitry is configured to control the liquid supplier to restrict the temperature decrease of the liquid in the liquid temperature restricting mode.

3. The medium processing apparatus according to claim 2, further comprising an operation unit to which a selection to enable or disable the liquid temperature restricting mode is inputtable.

4. The medium processing apparatus according to claim 2, further comprising a temperature detector to detect a temperature of an interior or an exterior of the medium processing apparatus,
- wherein the circuitry is further configured to automatically select whether to enable or disable the liquid temperature restricting mode based on a temperature detection of the temperature detector.

5. The medium processing apparatus according to claim 4,
- wherein the temperature detector detects the temperature of the liquid stored in said another liquid storage.

6. The medium processing apparatus according to claim 2,
- wherein the circuitry is further configured to control the liquid supplier to supply the liquid from the liquid storage to said another liquid storage at a prescribed timing when the liquid temperature restricting mode is enabled.

7. The medium processing apparatus according to claim 6,
- wherein the circuitry is further configured to control the liquid supplier to supply the liquid from the liquid storage to said another liquid storage,
- when the liquid temperature restricting mode is enabled and a binding process by the post-processing device is completed; or
- when the liquid temperature restricting mode is enabled and a given period of a standby time has elapsed after the completion of the binding process.

8. The medium processing apparatus according to claim 6,
- wherein the circuitry is further configured to control the liquid supplier to supply the liquid from the liquid storage to said another liquid storage,
- when the liquid temperature restricting mode is enabled and the medium processing apparatus shifts to a non-operating state; or
- when the liquid temperature restricting mode is enabled and the medium processing apparatus shifts to an energy saving mode.

9. The medium processing apparatus according to claim 2, further comprising a heater to heat in a vicinity of said another liquid storage,
- wherein the circuitry is further configured to control the heater to heat the liquid in said another liquid storage when the liquid temperature restricting mode is enabled.

10. The medium processing apparatus according to claim 9,
- wherein the circuitry is further configured to control the liquid supplier to repeatedly supply the liquid from the liquid storage to said another liquid storage and from said another liquid storage to the liquid storage; and
- control the heater to heat the liquid,
- when the liquid temperature restricting mode is enabled; and
- when a given period of a serial operation of a binding process by the post-processing device has elapsed.

11. The medium processing apparatus according to claim 9, further comprising a circuit to supply power to the heater,
- wherein the circuit is not electrically interrupted by turning on and off of a device main power supply or opening and closing of a device cover.

12. The medium processing apparatus according to claim 9, further comprising:
- a power supply path to supply power to the heater; and
- a physical switch in the power supply path to cut off a power supply to the heater.

13. The medium processing apparatus according to claim 9, further comprising:

a switcher switchable a power supply to the heater; and a temperature detector to detect a temperature of an interior or an exterior of the medium processing apparatus, wherein the circuitry is further configured to control whether to supply power to the heater in accordance with at least one of:

an application state of the liquid temperature restricting mode; and a result of a temperature detection of the heater by the temperature detector.

14. An image forming system comprising:

an image forming apparatus to form an image on each medium of multiple media; and the medium processing apparatus according to claim 1 to bind the multiple media.

* * * * *